United States Patent [19]

Bezviner et al.

[11] Patent Number: 5,613,148

[45] Date of Patent: Mar. 18, 1997

[54] METHOD AND APPARATUS FOR ACTIVATING AND EXECUTING REMOTE OBJECTS

[75] Inventors: Dawn E. Bezviner; Michael H. Conner; Kevin J. Greene; Scott Danforth; Erin E. Shepler; Marc G. Smith, all of Austin, Tex.

[73] Assignee: International Business Machines Corporation, Armonk, N.Y.

[21] Appl. No.: 545,369

[22] Filed: Oct. 19, 1995

Related U.S. Application Data

[63] Continuation of Ser. No. 77,221, Jun. 14, 1993, abandoned.

[51] Int. Cl.$^6$ ..................................................... G06F 9/40
[52] U.S. Cl. ................... 395/800; 395/701; 395/651; 364/DIG. 1; 364/280; 364/284; 364/281.3
[58] Field of Search .................................... 395/800, 650, 395/700, 600

[56] References Cited

U.S. PATENT DOCUMENTS

| | | | |
|---|---|---|---|
| 5,187,790 | 2/1993 | East et al. | 395/725 |
| 5,249,293 | 9/1993 | Schreiber et al. | 395/650 |
| 5,307,490 | 4/1994 | Davidson et al. | 395/650 |
| 5,307,492 | 4/1994 | Benson | 395/700 |
| 5,317,746 | 5/1994 | Watanabe | 395/700 |
| 5,329,619 | 7/1994 | Page et al. | 395/200 |
| 5,339,430 | 8/1994 | Lundin et al. | 395/700 |
| 5,355,483 | 10/1994 | Serlet | 395/650 |
| 5,377,350 | 12/1994 | Skinner | 395/600 |
| 5,410,703 | 4/1995 | Nilsson et al. | 395/700 |
| 5,452,447 | 9/1995 | Nelson et al. | 395/650 |
| 5,481,721 | 1/1996 | Serlet et al. | 395/700 |
| 5,511,197 | 4/1996 | Hill et al. | 395/700 |
| 5,539,909 | 7/1996 | Tanaka et al. | 395/700 |

OTHER PUBLICATIONS

Muhammad M. Saggaf, "Seyon.help", TSX–11.MIT.EDU, Internet Site, Under Linux, 1992–1993.
Muhammad M. Saggaf, "Scriptoquik" TSX–11.MIT.EDU, Internet Site, Under Linux.
IBM TDB "Algorithm For Locating Object Handlers In A Distributed System", vol. 36, No. 1, Jan. 1993, pp. 484–485.
IBM TDB "Efficient Message Dispatching In Distributed Environments", vol. 35, No. 7, Dec. 1992, pp. 437–438.
IBM TDB "Object Data Manager", vol. 32, No. 10A, Mar. 1990, pp. 55–57.
IBM, *System Object Model Guide Reference*, Version 2.00, "OS/2 2.0 Technical Library", First Edition Dec. 1991.
*The Common Object Request Broker: Architecture and Specification*, OMG Document No. 91.12.1, Revision 1.1.

*Primary Examiner*—Mehmet B. Geckil
*Attorney, Agent, or Firm*—David A. Mims, Jr.; Paul S. Drake

[57] ABSTRACT

A method for activating and executing objects containing data and procedures including the steps of relaying, by a first object in a first address space, a communication from a process in a second address space to a second object in the first address space, activating, by the second object, a third object containing data and procedures in response to the relayed communication, and executing, by the activated third object, an operation in response to the relayed communication. In addition, an apparatus for activating and executing remote objects containing data and procedures including a first object in a first address space for relaying a communication from a process in a second address space to a second object in the first address space, apparatus for activating, in the second object, a third object containing data and procedures in response to the relayed communication, and apparatus for executing, in the activated third object, an operation in response to the relayed communication.

22 Claims, 11 Drawing Sheets

METHOD AND APPARATUS FOR ACTIVATING AND EXECUTING REMOTE OBJECTS

This is a continuation of application Ser. No. 08/077,221 filed Jun. 14, 1993, now abandoned.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

RELATED PATENT APPLICATIONS

Related patent applications include commonly assigned copending patent application U.S. Ser. No. 08/077,219 filed on the same date as the present application, entitled "METHOD AND APPARATUS FOR UTILIZING PROXY OBJECTS TO COMMUNICATE WITH TARGET OBJECTS", hereby incorporated by reference.

TECHNICAL FIELD

The present invention relates to data processing systems and more particularly to communications to invoke objects in different address spaces.

BACKGROUND ART

The development of programming for data processing systems has traditionally been a time consuming task. Object oriented programming (OOP) has emerged as a promising new technology which will allow more efficient development reuse and customization of new software programming. Object oriented programming shifts the emphasis of software development away from function decomposition and towards the recognition of units of software called "objects" which encapsulate both data and functions. As a result, programs become easier to maintain and enhance.

Yet despite its promise, object oriented technology has not penetrated major commercial software products to date. This is due in part because of the obstacles which the developer must confront when utilizing object oriented programming. A first obstacle that developers must confront is the choice of which object oriented programming language to use. The early expressions of object oriented programming concept focused on the creation of toolkits and languages, each of which are designed to exploit some particular aspect of OOP. So called pure object oriented languages such as SmallTalk use a runtime environment which will operate smoothly and consistently so long as the developer works within the supplied environment. However, when interacting with foreign environments, the objects must be reduced to data structures which do not retain the advantages which objects offer with regard to encapsulation and code use. Hybrid languages, such as C++ require less runtime support, but can result in tight bindings between the programs which provide the objects and the clients which use them. Tight binding implies that the client programs must be recompiled whenever simple changes are made to the library. The second obstacle is the disparity in concept among the plurality of different object oriented languages. That is, toolkits embrace different incompatible models of what objects are and how they work. The software developed using any particular language or tool kit is limited in scope. A program implemented in one language can rarely be used in another.

The System Object Module "SOM" is a new object oriented technology for building packaging and manipulating object oriented programs designed to unite various object oriented approaches. In SOM, the interfaces of the classes of objects, together with the names of the method they support, the return types, the parameter types and so forth, are specified in a standard language called the Interface Definition Language (IDL). The actual implementation of the object class can be performed in whatever programming language the developer prefers. The preferred programming language need not necessarily be an object oriented programming language, but might be a procedural language such as C. Thus, the advantages of object oriented programming can be extended to programmers of non-object oriented programming languages. SOM is described in greater detail in the *OS2.20 SOM Guide and Reference*, a publication of the IBM Corporation, which is hereby incorporated by reference.

There also exists distributed OOP models which are extensions of standard OOP systems. Standard OOP systems are typically restricted to utilizing or making calls to objects within the same address space as the process utilizing or calling those objects. That is, a process typically cannot access objects located within other processes including where those other processes are located on the same or different host computers. However, distributed OOP systems allow processes to access objects located in remote address spaces including address spaces located in the same or other host systems. A standard for such distributed OOP systems currently exists called Common Object Request Broker Architecture (CORBA) and is described in *The Common Object Request Broker: Architecture and Specification*, published by the Object Management Group and X Open, which is hereby incorporated by reference. This architecture allows a process to make calls to objects in other address spaces, typically by constructing the necessary communication paths during compilation.

DISCLOSURE OF THE INVENTION

The present invention includes a method for activating and executing objects containing data and procedures including the steps of relaying, by a first object in a first address space, a communication from a process in a second address space to a second object in the first address space, activating, by the second object, a third object containing data and procedures in response to the relayed communication, and executing, by the activated third object, an operation in response to the relayed communication. In addition, the present invention includes an apparatus for activating and executing remote objects containing data and procedures including a first object in a first address space for relaying a communication from a process in a second address space to a second object in the first address space, means for activating, in the second object, a third object containing data and procedures in response to the relayed communication, and means for executing, in the activated third object, an operation in response to the relayed communication.

A further understanding of the nature and advantages of the present invention may be realized by reference to the remaining portions of the specification and the drawings.

BEST MODE FOR CARRYING OUT THE INVENTION

The invention may be run on a variety of computers or collection of computers under a number of different operating systems. The computer could be, for example, a personal computer, a minicomputer, mainframe computer or a computer running in a distributed network of other computers. Although the specific choice of computer is limited only by disk and disk storage requirements, computers in the IBM PS/2 (TM) series of computers could be used in the present invention. For additional information on IBM's PS/2 series of computers, the reader is referred to *Technical Reference Manual Personal Systems/2 Model* 50, 60 systems IBM Corporation, Part No. 68X2224 Order No. S68X-2224 and *Technical Reference Manual Personal Systems/2 (Model* 80) IBM Corporation Part No. 68X2256 Order No. S68X-2254. One operating system which an IBM PS/2 personal computer may run is IBM's OS/2 2.0 (TM). For more information on the IBM OS/2 2.0 Operating System, the reader is referred to OS/2 2.0 *Technical Library, Programming Guide*, Vols. 1, 2, 3 Version 2.00 Order No. 10G6261, 10G6495, 10G6494.

In the alternative, the computer system might be in the IBM RISC System/6000 (TM) line of computers which run on the AIX (TM) operating system. The various models of the RISC System/6000 are described in many publications of the IBM Corporation, for example, *RISC System/6000, 7073 and 7016 POWERstation and POWERserver Hardware Technical Reference*, Order No. SA23-2644-00. The AIX operating system is described in *General Concepts and Procedures—AIX Version* 3 *for RISC System/6000*, Order No. SC23-2202-00, as well as other publications of the IBM Corporation.

Figure 1:
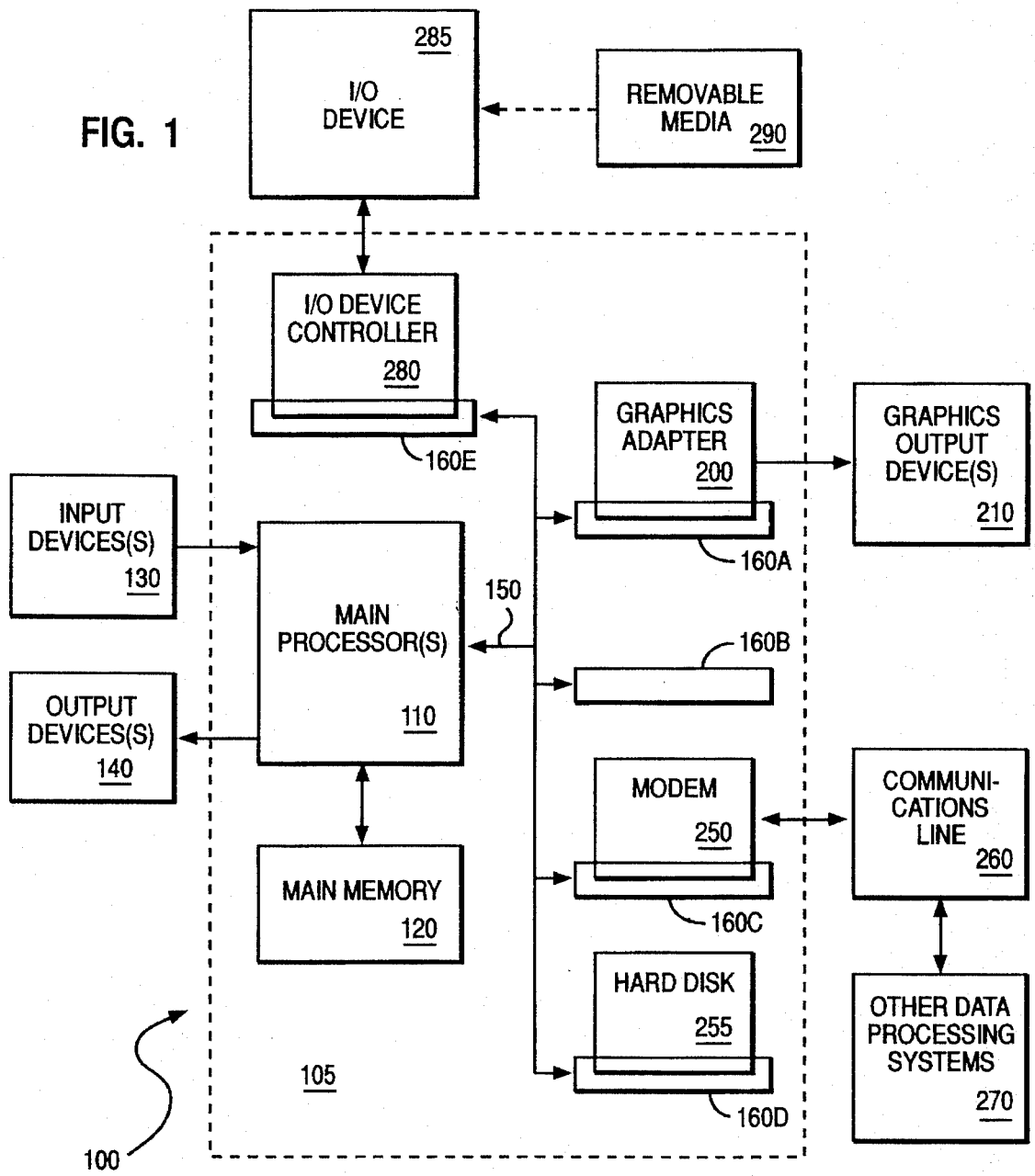
FIG. 1 is a block diagram of a typical data processing system utilized by a preferred embodiment of the invention.

FIG. 1 is a block diagram of a typical data processing system 100 utilized by a preferred embodiment of the invention. The data processing system includes main processor(s) 110 coupled to a main memory 120 in computer box 105 with input device(s) 130 and output device(s) 140 attached. Main processor(s) 110 may include a single processor or multiple processors. Input device(s) 130 may include a keyboard, mouse, tablet or other types of input devices. Output device(s) 140 may include a text monitor, plotter or other types of output devices. The main processor may also be coupled to graphics output device(s) 210 such as a graphics display through a graphics adapter 200. Graphics adapter 200 may be located in an adapter slot 160A. Graphics adapter 200 receives instructions regarding graphics from main processor 110 on bus 150, thereby rendering the desired graphics output from the main processor. A modem or other communications adapter 250 and a hard disk 255 may also be located in slots 160C and 160D to provide communications with main processor 110 across bus 150. Modem 250 may communicate with other data processing systems 270 across communications line 260. Computer readable removable media 290, such as a magnetic diskette or a compact disc, may be inserted into an input/output device 285, such as a disk drive or a CD-ROM (compact disc—read only memory) driver. Data is read from or written to the removable media by the I/O device under the control of the I/O device controller 280. The I/O device controller communicates with the main processor through slot 160E across bus 150. Main memory 120, hard disk 255 and removable media 290 are all referred to as memory for storing data for processing by processor 110. One of the preferred implementations of the present invention is as several sets of instructions in a code module resident in the main memory 120. Until required by the computer system, the sets of instructions may be stored in another computer memory, for example, in a hard disk drive, or in a removable memory such as an optical disk for eventual use in a CDROM or a floppy disk for eventual use in the floppy disk drive.

SOM is described in greater detail in copending and commonly assigned application Ser. No. 07/805,668 "Language Neutral Objects" filed May 4, 1992, to M. Conner et al, which is hereby incorporated by reference. SOM will be discussed in the present application only insofar as necessary to understand the present invention. Nonetheless, several facets of SOM are worth mentioning. Within SOM and other object oriented systems, each object has certain data attributes and methods which operate on the data. Data is said to be "encapsulated" by an object and can only be modified by the method which belongs to the object. Methods are typically invoked by sending a message to an object, identifying the desired method and supplying any needed arguments. Objects can be subclassed to create new objects. "Inheritance" is the ability to derive a new object from an existing object inheriting all properties such as methods and data structure from the existing object. The new object may have certain unique features such as new methods which are added to or override existing methods of the existing class. A new subclass needs only specify the functions and data which distinguish it from its already existing base class. Thus, the software developer does not need to develop an entirely new piece of code. He or she need only specify the new unique features of the software.

Distributed SOM (DSOM) is an extension to the System Object Model (SOM). Whereas SOM is a single address space object model directed to client processes utilizing only those objects located within the same address space as the client process, DSOM allows a client process in one address space to make calls on target objects residing in other address spaces. DSOM builds on SOM by making an object's location transparent to the client process. That is, a client process accesses a remote object by utilizing the same mechanism used for accessing an object located in the same address space as the client process. DSOM transmits the request from the client process to the target object and returns the results from the target object to the client process.

Figure 2:
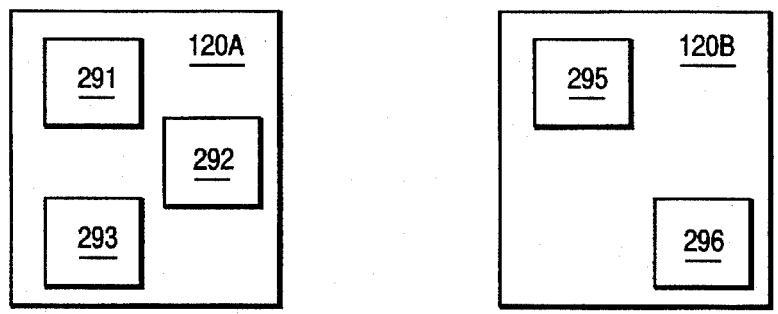
FIG. 2 is a block diagram illustrating the address spaces utilized by various processes in main memory according to a preferred embodiment of the invention.

FIG. 2 is a block diagram illustrating the address spaces utilized by various processes in main memory according to a preferred embodiment of the invention. Main memory 120A and 120B are typically random access memories (RAM) for two different host computers. Each main memory has address spaces 291, 292, 293, 295 and 296 made available for various processes to utilize during execution. The processes utilizing these address spaces (each process is allocated one address space) could be client or server processes. Typically, a client process is the process that initiates requests for communications with objects not in its address space. In addition, a server process is typically the process that includes the target object and responds to the request for communications from the client process. Furthermore, the server process may become a client process should it initiate a request to communicate with an object not in its address space and the client process may become a server process should it include a target object for another client process.

Figure 3:
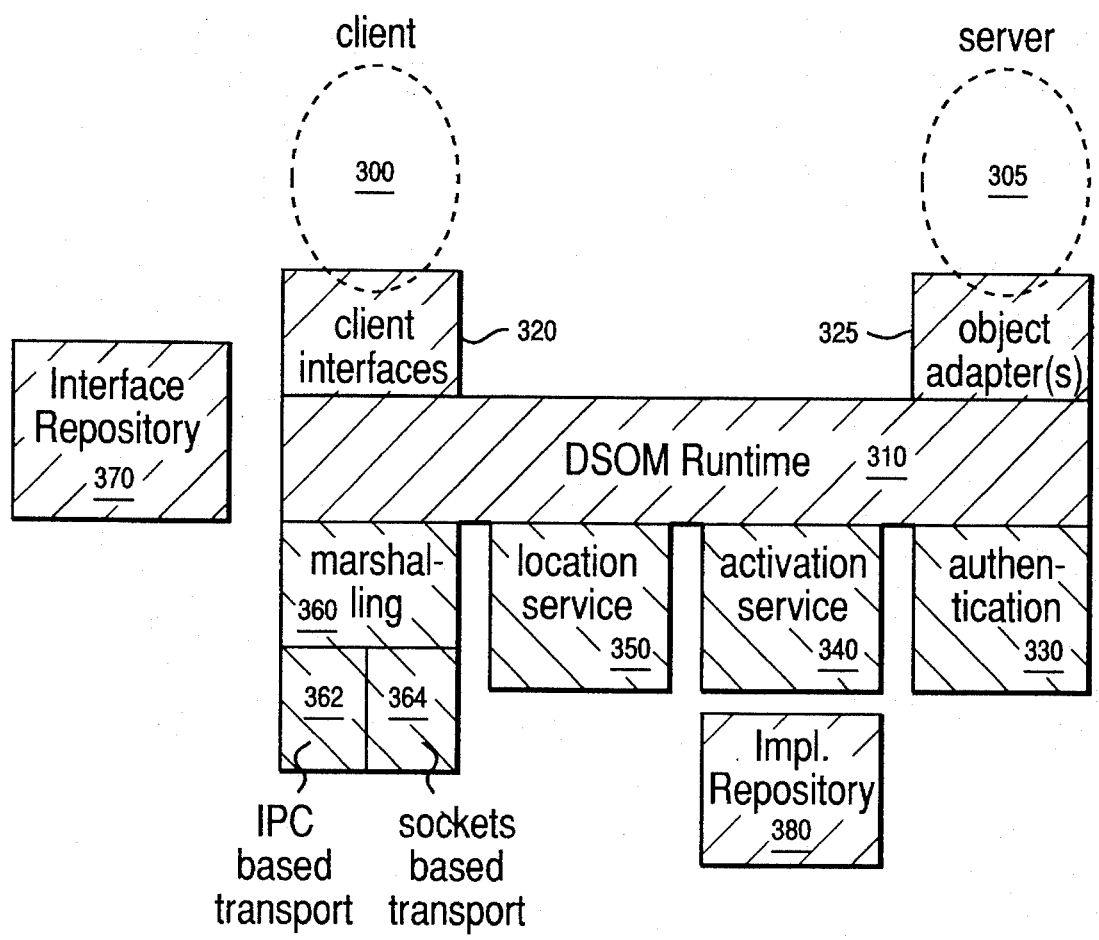
FIG. 3 is a block diagram of the primary component utilized by a preferred distributed object system.

FIG. 3 is a block diagram of the primary component utilized by a preferred distributed object system. A client process 300 and a surface processor 305 are shown running on the distributed object system. As described above with reference to FIG. 2, the client and server processes are running in different address spaces and may be on different host systems. The distributed object system provides the necessary communications between the client and server processes when needed.

The core piece of the distributed object system is DSOM runtime 310. DSOM runtime 310 handles all communications between the various elements illustrated in FIG. 3. DSOM runtime 310 communicates with client 300 via client interface 320 and with server 305 via object adapter 325. Client interface 320 provides a known or standard interface to various client processes. In the preferred embodiment, the client interface follows the common object request broker architecture (CORBA) and system object model (SOM) standards. Object adapter 325 provides a known or standard interface to various server processes. In the preferred embodiment, the object adapter also follows the CORBA and SOM standards. As a result, the preferred DSOM runtime 310 may communicate with and provide services for applications written to these known standards, thereby providing an open architecture. In addition, additional client and server processes may be supported concurrently in additional address spaces and possibly on other host systems by adding additional client interfaces and object adapters. In the preferred embodiment, some portions or all of the DSOM Runtime and its services and utilities reside on each of the host systems. This includes the necessary elements to handle communications between the hosts across networks. For ease of explanation, the DSOM Runtime and its services and utilities are illustrated as a single entity rather than as multiple distributed copies that communicate with each other in a transparent manner.

DSOM runtime 310 utilizes various service utilities. These service utilities include authentication service 330, activation service 340, location service 350 and marshalling service 360. Authentication service 330 verifies the identity of client processes requesting services of DSOM runtime 310. This is to prevent unauthorized utilization of the DSOM runtime functions including access or communications to objects residing in various server processes. Activation service 340 is responsible for activating various server processes when those server processes contain objects needed for communications with client processes. Location service 350 assists DSOM runtime 310 in locating on which host a desired server may be located. Marshalling 360 handles communications between processes by packaging the desired communications and then passing that package to either IPC based transport 362 or socket based transport 364 to perform the communications.

Interface repository 370 is a database providing information regarding how to communicate with objects located on other host or processes. As a centralized database, interface repository can provide various pieces of information to various elements of the distributed object system to perform communication with various objects. For example, marshalling 360 may query interface repository 370 regarding information about various objects that the marshalling service is attempting to communicate with on another host. Implementation repository 380 is a centralized database that provides information regarding which host a server process may reside on as well as other information needed for activation of those server processes by activation service 340. Since interface repository 370 and implementation repository 380 are databases, calls and updates to them may be one of many types of database queries and transactions known in the art. In the preferred embodiment, the interface repository and the implementation repository are flat files. Interface repository 370 contains information needed to make calls on objects including remote objects. In the preferred embodiment, this information includes the signatures of each type of call for each object including the form and data types needed to communicate with the objects. Implementation repository 380 contains a listing of the various types of objects available by class or other types of attributes, as well as which server that target object may be associated with. Utilization of the above described distributed object system is described below.

Figure 4:
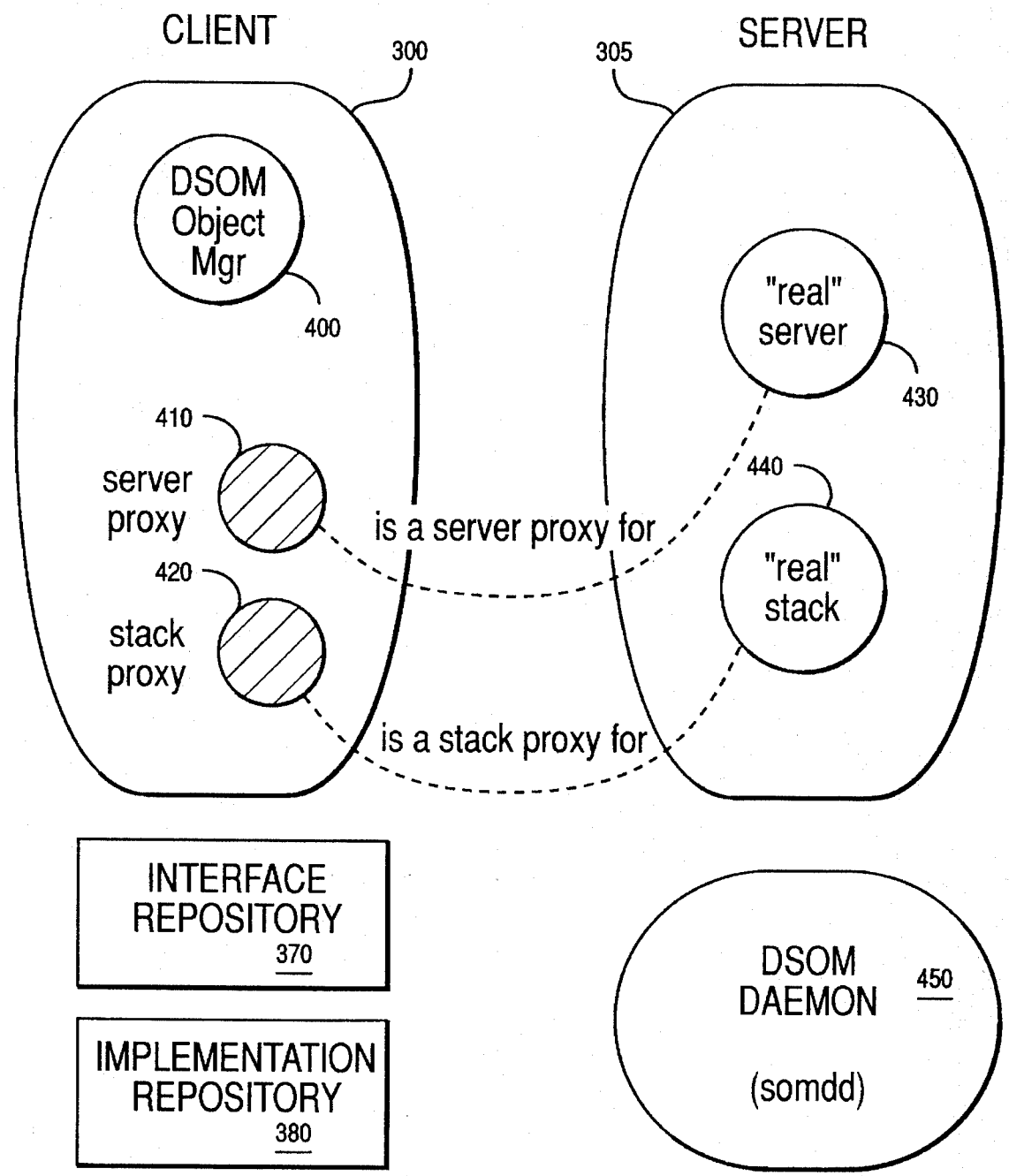
FIG. 4 is a block diagram illustrating various elements needed for utilizing proxy objects according to a preferred embodiment of the invention.

FIG. 4 is a block diagram illustrating various elements needed for utilizing proxy objects according to a preferred embodiment of the invention. Client process 300 includes an object manager 400 which is responsible for locating servers according to various attributes specified by the client. Client process 300 utilizes a server proxy object 410 and a stack proxy object 420 to communicate with a target server object 430 and a target stack object 440 located on server process 305. These proxy objects allow the object manager to utilize local addressing to communicate with objects located in a different address space. In order to perform these communications, interface repository 370 and implementation repository 380 will be utilized as described below. In addition, a daemon is utilized for establishing communications paths between client and server processes. A copy of the interface and implementation repositories may be stored on each host or they may be stored in a common memory or a distributed file system. In addition, a copy of the daemon should be running on each host system. The utilization of these elements will be described in greater detail below with reference to FIGS. 5 and 6.

FIGS. 5A–5D are block diagrams illustrating a client process bootstrapping communications with a server process and activating, invoking, and calling an object located in the server process. The server process has a separate address space from the client process and may be located on a separate host.

Figure 5A:
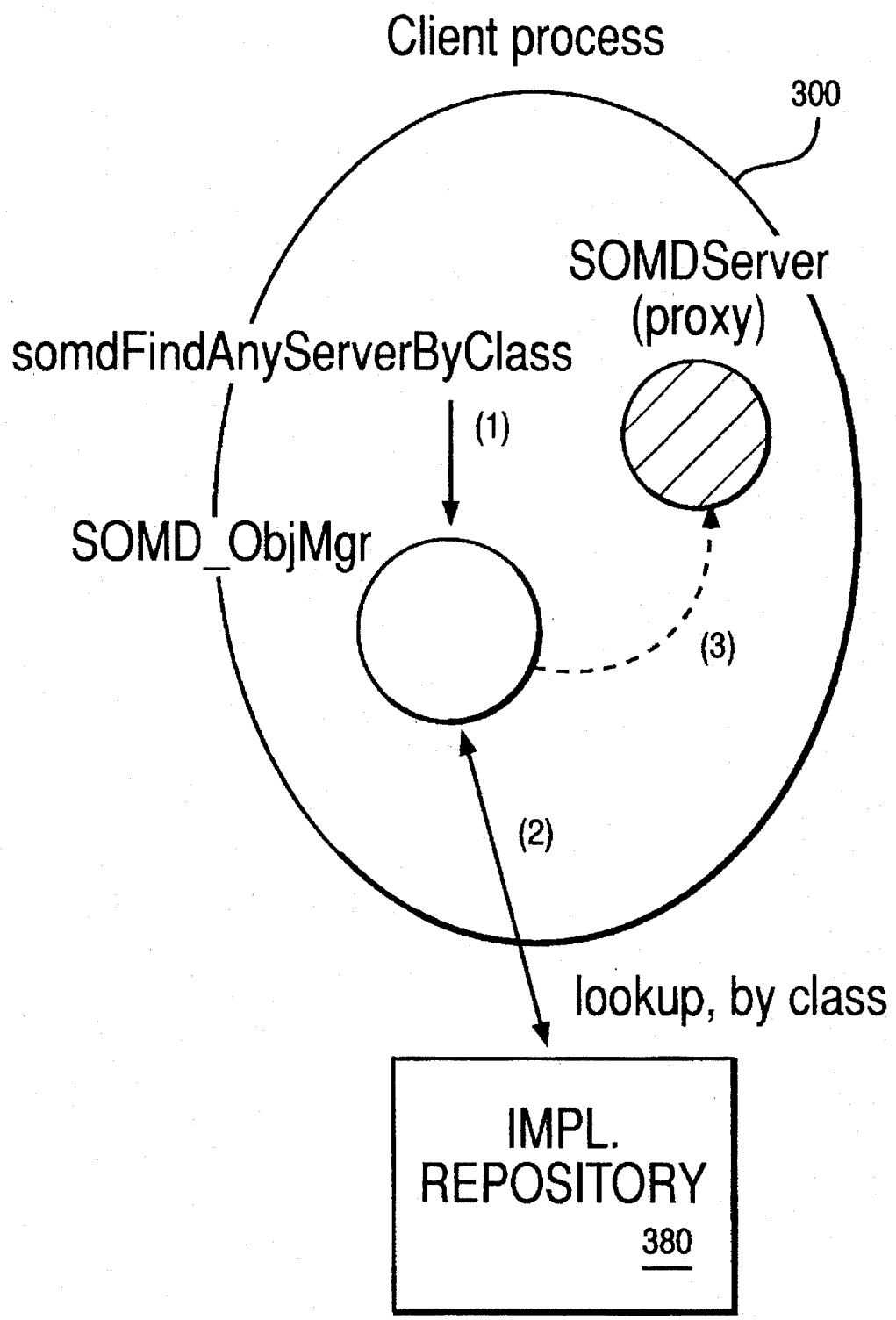
FIGS. 5A–5D are block diagrams illustrating a client process bootstrapping communications with a server process and activating, invoking, and calling an object located in the server process.

FIG. 5A illustrates a client process bootstrapping a server proxy object which manages communications to a server process that contains a desired target object. Upon activation or perhaps during processing, client process 300 may determine that it needs access to various objects, such as a printer object, which may be located in different address spaces and may also be located on a separate host. In the preferred embodiment, every client process has a SOMD__ObjMgr (distributed SOM object manager) which is responsible for locating servers according to various attributes specified by the client. A typical attribute utilized by the client process is object class (such as a type of printer). Upon determining that an object is needed to perform a desired function, the client process queries the SOMD_ObjMgr for a desired object by a SOMDFindAnyServerByClass call. Upon receiving the call from the client process the SOMD_ObjMgr then queries the implementation repository 80 to determine whether any server supports such an object by that class. If so, then the SOMD_ObjMgr constructs a SOMDServer proxy object in the client address space representing the SOMDServer object of the server containing the target object unless such a proxy object already exists for that server. In the preferred embodiment, there is only on SOMDServer proxy object for each server process that the client process intends to communicate with since each server process has one and only one SOMDServer object. At this point, the remote server may not be running. However, the client process now has a basic interface tool to activate and invoke the server process when needed. As a result, a client process may have initialized access to desired server processes without requiring the overhead of invoking and activating those server processes until it is needed.

In the preferred embodiment, a proxy object is built by creating an instance of a class that inherits from a general proxy class (called SOMDClientProxy in the preferred embodiment) and the interface of the target object. This interface information may be obtained from the interface repository. Within the proxy object the portion of a method or call table utilized for target object calls will be replaced with pointers to a known general purpose dispatch mechanism (preferably called somdDispatch) inherited from SOMDClientProxy which allows the dynamic construction of calls on SOM objects. This general purpose dispatch mechanism is typically called dynamic method invocation in SOM. The standard somdDispatch mechanism has been overridden in the SOMDClientProxy with a generic mechanism for redirecting calls on the proxy to the remote object.

Figure 5B:
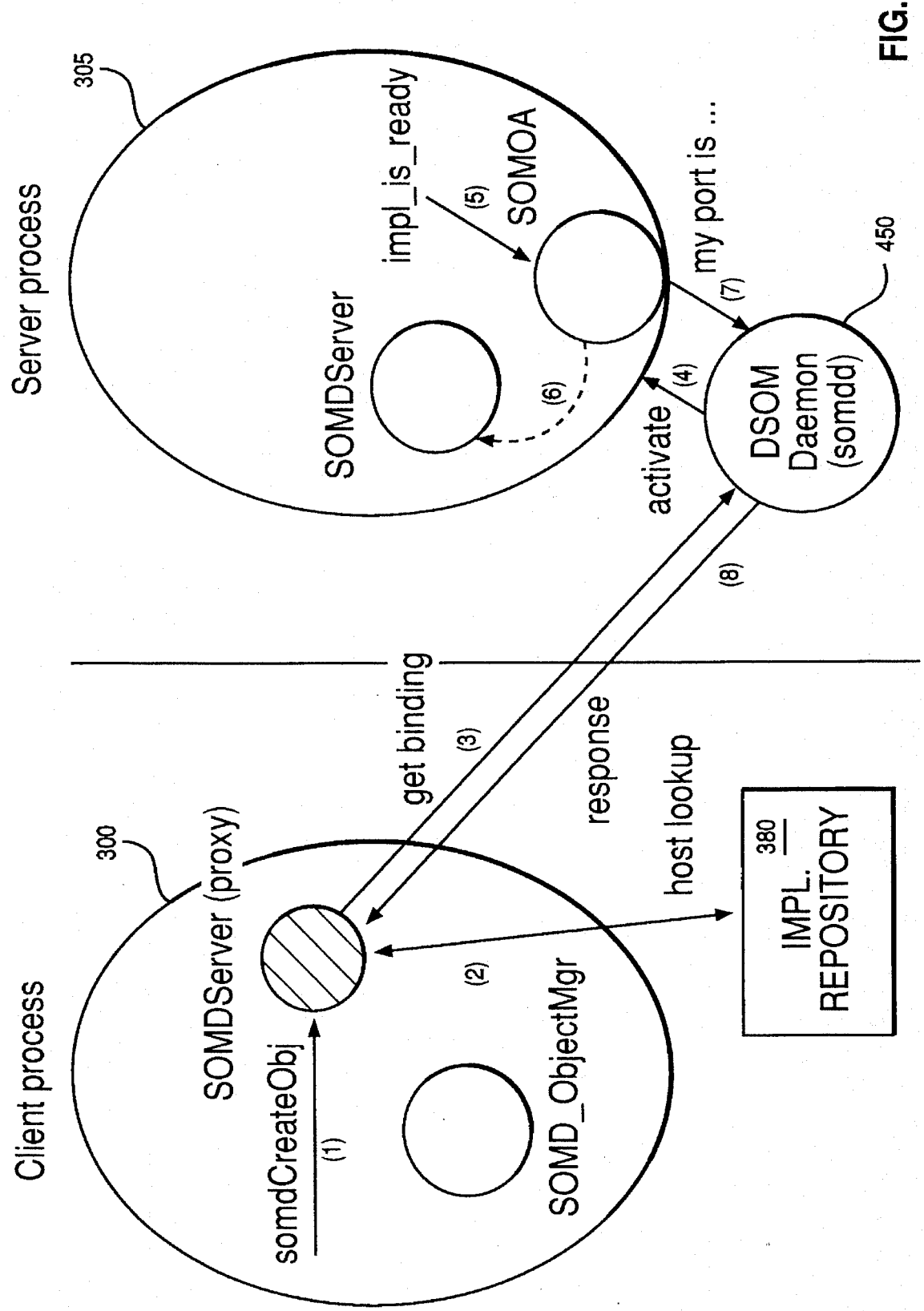

FIG. 5B is a block diagram illustrating a client process invoking a call to initiate communications with the server process containing the target object via the SOMDServer proxy. Because the proxy object has not yet established communications with the server process, the proxy object queries the implementation repository to locate which host the desired server process is located on and to determine how to communicate with the daemon on that host. The proxy then establishes communications with the daemon located on that host to obtain a binding to that server process. The daemon determines whether the server process is already activated. If so, then the daemon immediately returns the binding to the SOMDServer proxy object. However, if the server process is not already activated, then the daemon communicates with the implementation repository to determine the means by which to activate the server process. Once obtained, the daemon then activates the server process. Once activated the server preferably includes a SOMDServer object and SOM object adapter (SOMOA). The server process then tells the SOMOA that it is up and running. The SOMOA then communicates this to the daemon which then tells the proxy SOMDServer what the binding is for the server process. As a result, the client process has caused the server process to be activated and has obtained bindings necessary to handle direct communications with the server process.

Figure 5C:
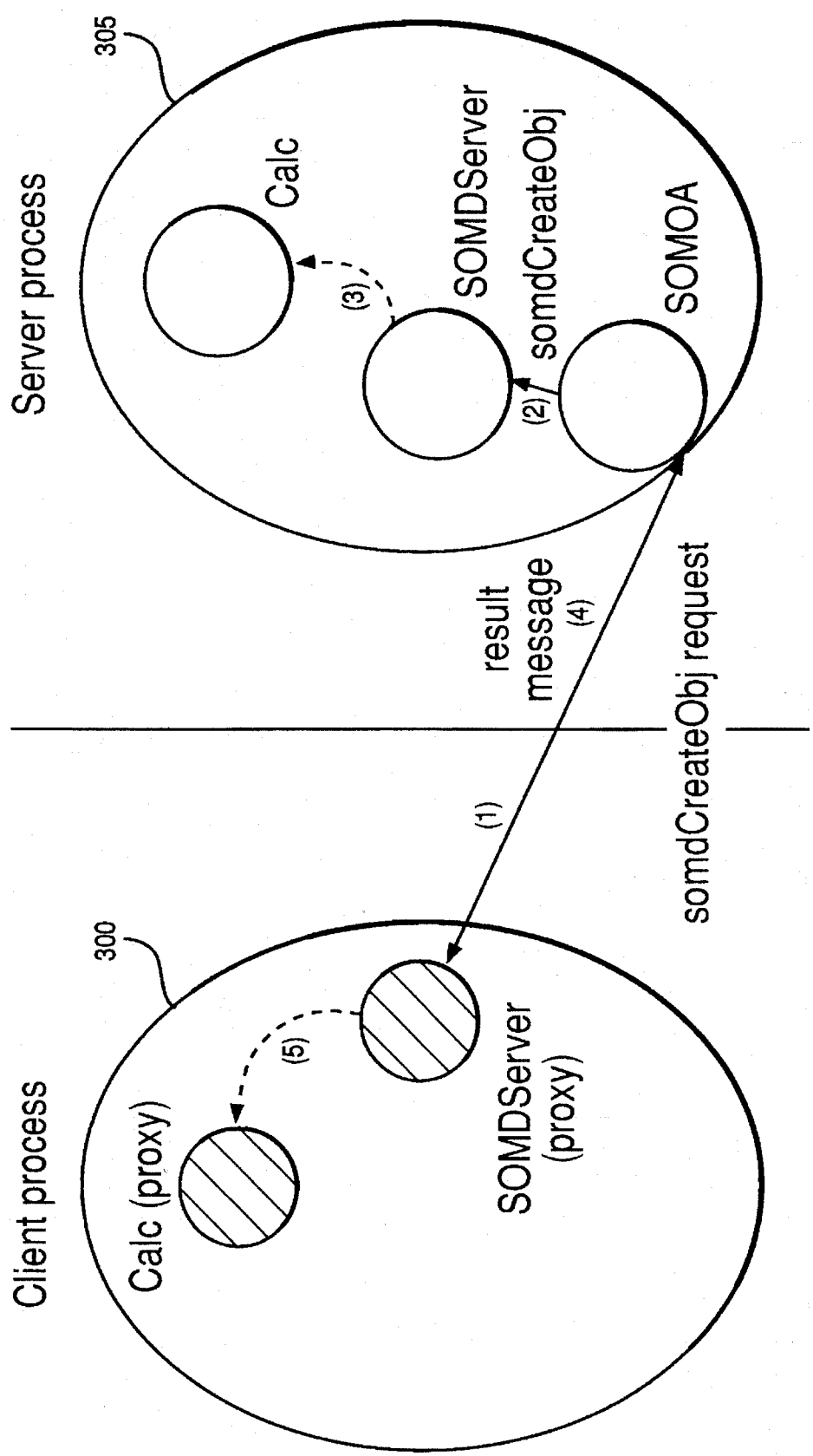

FIG. 5C is a block diagram illustrating the SOMDServer proxy object invoking an object in the server process as a result of the original call by the client process to the proxy object. The SOMDServer proxy object issues a create request directly to the SOMOA (SOM object adapter) in the server process. The SOMOA then passes this communication to the SOMDServer object. The SOMDServer object then generates the desired object (a Calc object within the present example) within the server process. The SOMDServer object then communicates back to the client process via the SOMOA the results of the object generation within the server process. The SOMDServer proxy then causes a corresponding Calc proxy object to be generated in the client process. As a result of the above, the client process now has readily accessible communications to an active server process with a corresponding Calc object via the Calc proxy object.

Figure 5D:
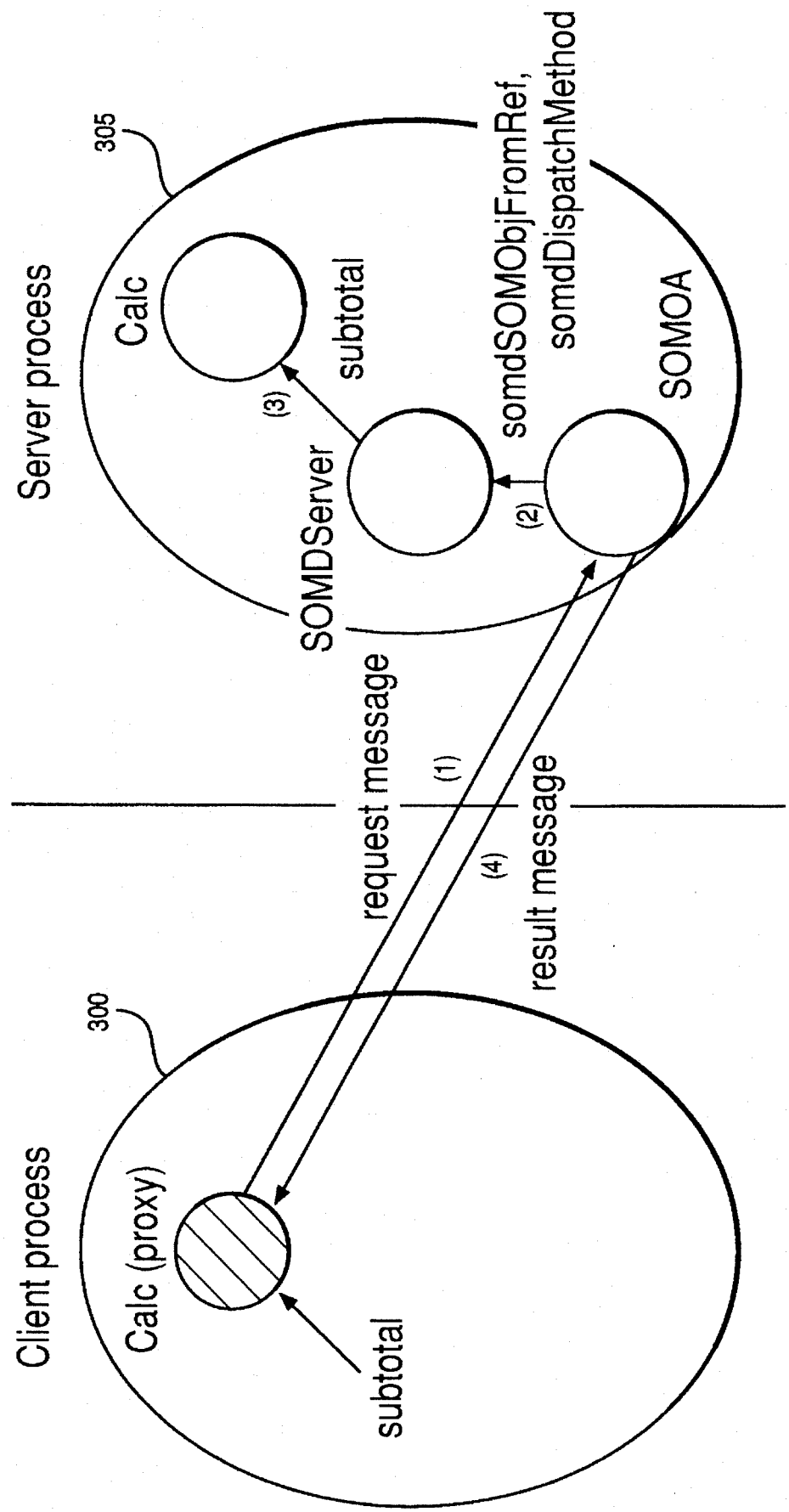

FIG. 5D is a block diagram illustrating the Calc proxy object providing communication to the server process Calc object. The client process invokes the Calc proxy with an operation such as subtotal. The Calc proxy then sends a request message to the server process SOMOA. The SOMOA then passes the request message to the SOMDServer object. The SOMDServer then passes the request message to the Calc object for the actual calculations. The result of the calculations is then communicated back to the client process Calc proxy in a result message. As result, the Calc proxy appears to the client process to perform the desired operation without the client process actually being aware of the communications to the server process Calc object. In addition, the client process does not require special tools in order to communicate with objects in other address spaces.

Figure 6:
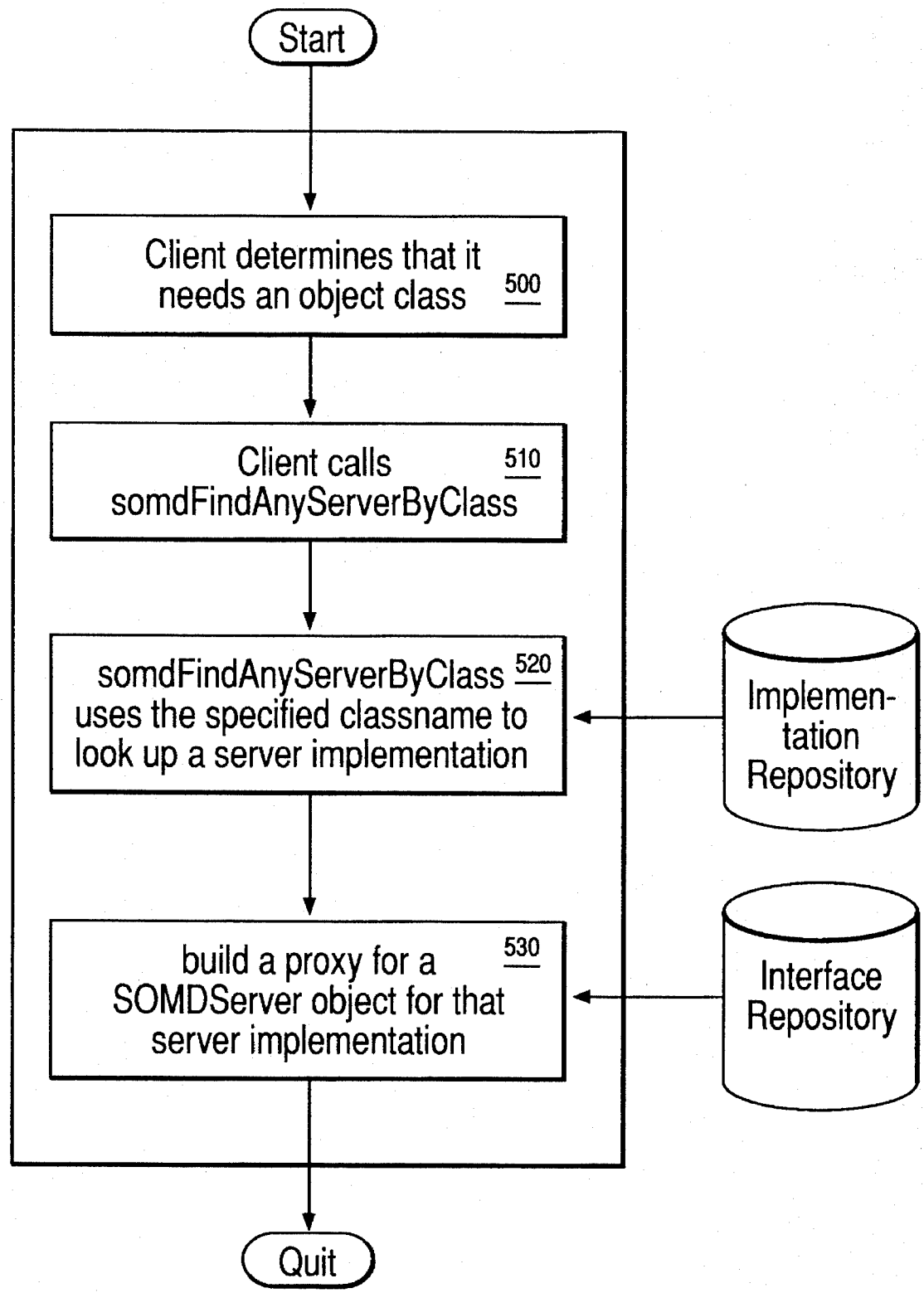
FIG. 6 is a flowchart corresponding to the bootstrapping operation described with reference to FIG. 5A.

FIG. 6 is a flowchart corresponding to the bootstrapping operation described with reference to FIG. 5A above. In a first step 500, it is determined that the client process needs a certain type or class of object that is not available in the local address space. This determination is typically performed by the client process in the preferred embodiment. This determination may occur during activation of the client process or during client process execution. In either case, this determination occurs during runtime of the client process according to the preferred embodiment of the invention. The object class may be one of many types of resources such as a printer, access to a database, etc. In step 510, the client process then generates and issues a SOMDFindAnyServerByClass call to the local SOMD_ObjMgr object. As mentioned above, the SOMD_ObjMgr is utilized by the client process to locate server processes which may contain a desired class of object. In step 520, the SOMD_ObjMgr then issues a query to the implementation repository for a server containing the desired class of object. This query is passed through client interface 320 to implementation repository 380 to obtain the desired information including which server contains the desired object. If a server for a desired target object is not located, then the client process is so notified. In step 530, if a desired target object is located, the DSOM Runtime then determines, by querying the client process, whether a SOMDServer proxy object already exists in the client process that is associated with the server containing the target object. If such a SOMDServer proxy object is not located in the client process, then the DSOM Runtime builds in the client process a SOMDServer proxy object associated with the server that contains the target object. The DSOM runtime accomplishes this by communicating with the interface repository, based on the information obtained from the implementation repository, to obtain interface information regarding the server containing the target object. This information is included in the SOMDServer proxy object to facilitate communications with the server containing the target object upon request. Regardless of whether a new SOMDServer proxy object was generated or previously existed, the client process is then notified of the target object availability including a pointer to the SOMDServer proxy object.

In the preferred embodiment, at this point there has been no determination whether the server is currently executing or not. In addition, no communications have been passed to the server process. As a result, a minimal amount of overhead is needed to create the SOMDServer proxy object in the client process containing a communication path to the server containing the target object.

Figure 7A:
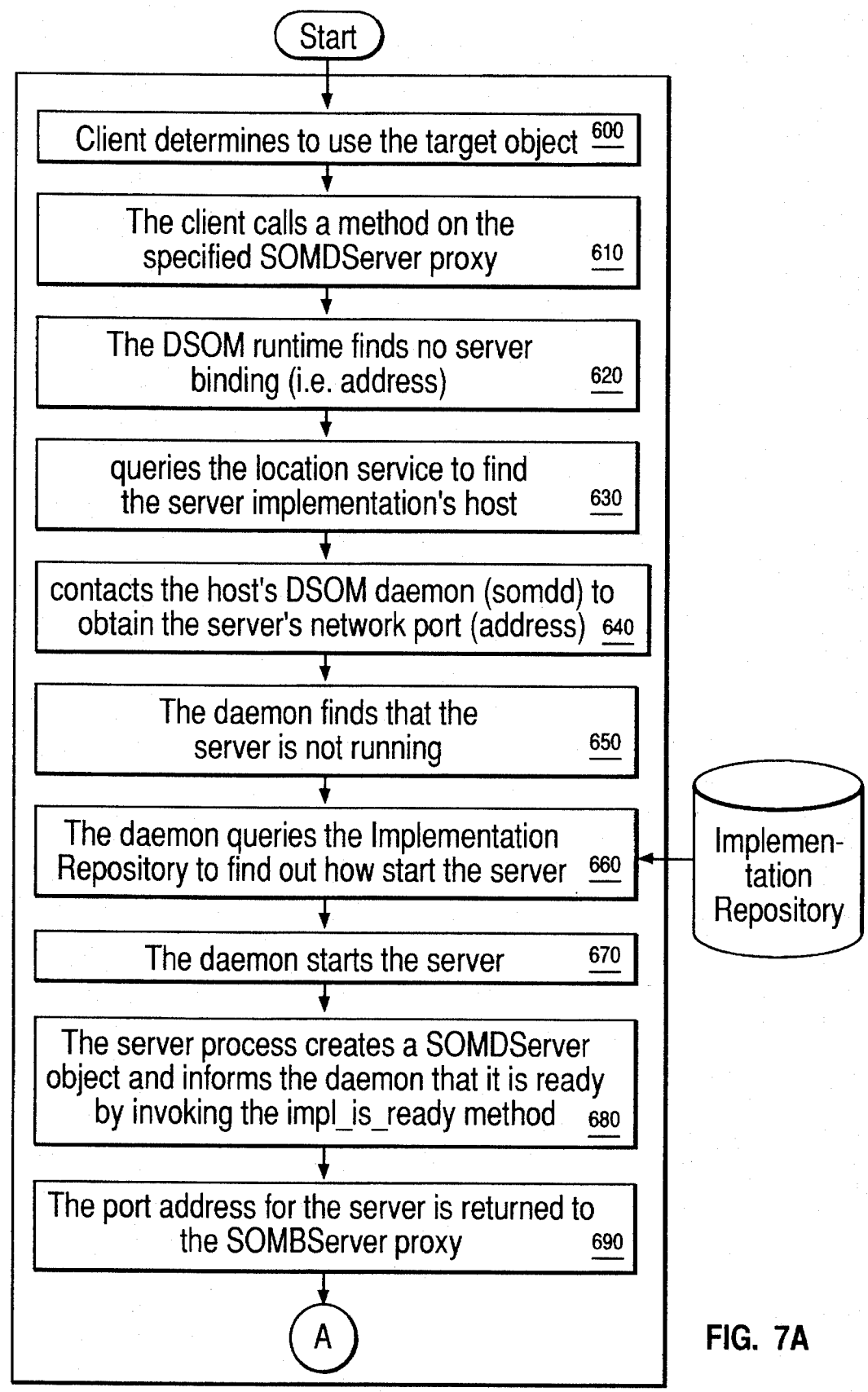
FIGS. 7A–7B are a flowchart corresponding to the activation and invocation operations described with reference to FIGS. 5B–5C.
Figure 7B:
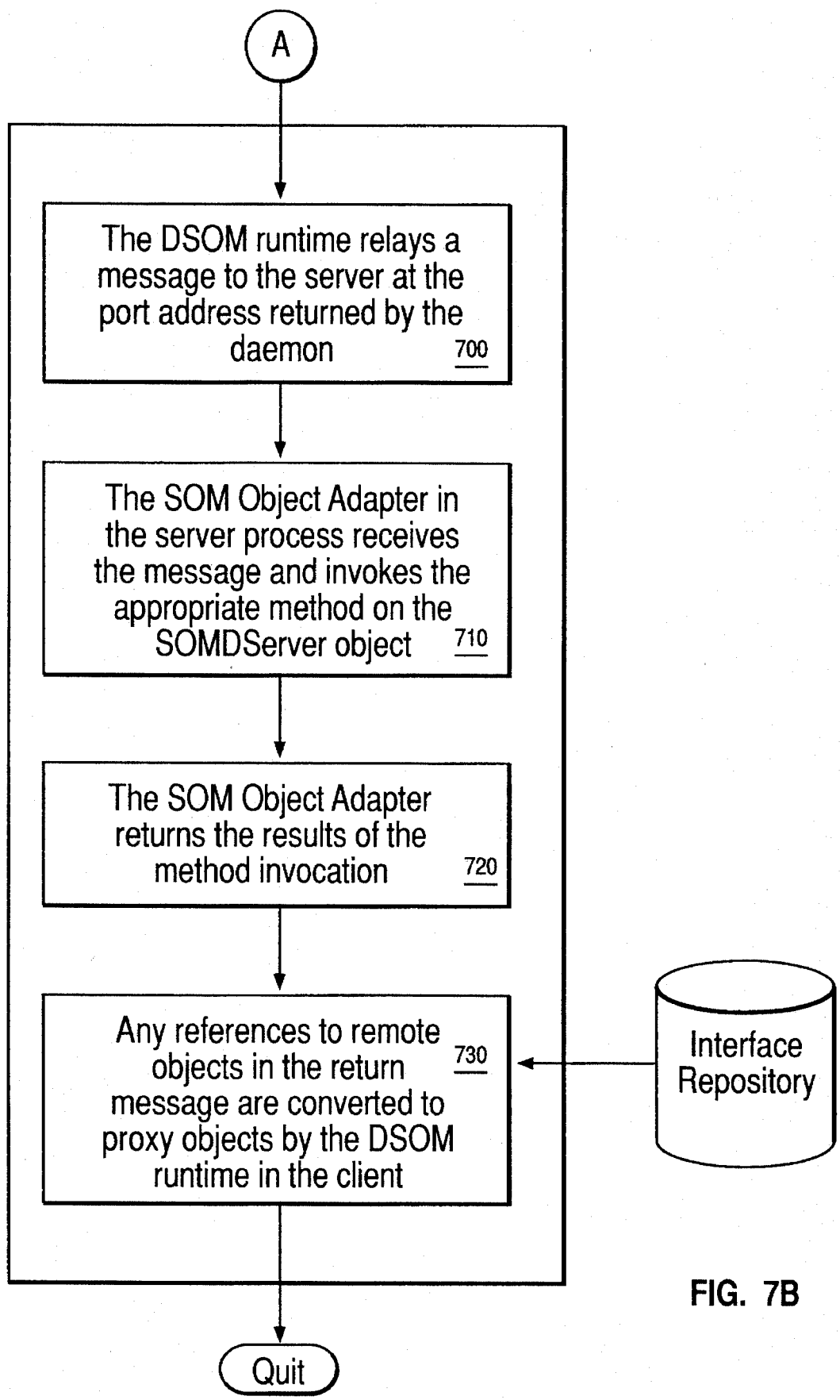

FIGS. 7A–7B are a flowchart corresponding to the activation and invocation operations described above with reference to FIGS. 5B–5C. In step 600, it is determined that the client process needs to utilize the target object. This determination is typically performed by the client process in the preferred embodiment. This determination may occur during activation of the client process or during client process execution. In either case, this determination occurs during runtime of the client process according to the preferred embodiment of the invention. In step 610, the client process makes a call to the server containing the target object via the SOMDServer proxy object. This call can include information necessary to perform the call. In step 620, the SOMDServer proxy object queries the DSOM Runtime to determine whether a previous communication had been made with the server containing the target object. If so, then the SOMDServer proxy object immediately passes the communication on to the server process as will be described below with reference to step 700. Otherwise, in step 630, the DSOM Runtime utilizes the location service to query the implementation repository to find which host the server is located on. Upon obtaining the host location, the DSOM runtime then contacts the host daemon to obtain the network port address of the desired server. In step 650, if the daemon determines that the server is already running, then the daemon returns the port address of the server process according to step 690 below. Otherwise, in step 660, the daemon queries the implementation repository to determine how to activate the server. In step 670, the daemon then activates the server. In the preferred embodiment, when the server process is activated, a SOM object adapter (SOMOA) is generated for handling communications between the server process and the daemon. This server activation function is a type of function typically performed by daemons. In step 680, the activated server process creates a SOMDServer object and informs the daemon via the SOMOA that the server process is ready for communications. In step 690, the daemon then returns the port address for the server process to the SOMDServer proxy object in the client process.

Now that the server process is activated, the DSOM Runtime can handle the original call from the client process to the server process. In step 700, the DSOM Runtime relays the call from the client process to the server process at the previously indicated port address. The SOMOA in the server process then receives the call and makes a call to the SOMDServer object. The SOMDServer object then will perform the call. For example, the SOMDServer object may create a desired calc object within the server process. However, the SOMDServer may perform other activities desired by the calling client process. In step 720, the SOMOA then returns the results of the call back to the SOMDServer proxy object via the DSOM runtime. In the case of the SOMDServer object generating a new target object in the server process to handle the call, the return results contain a reference to the new target object in the server process. Whenever this the case, in step 730, a proxy object corresponding to the target object referenced in the return results is then generated. This proxy object includes information from the interface repository regarding how to handle communications between the proxy object and the target object to which it corresponds.

Figure 8:
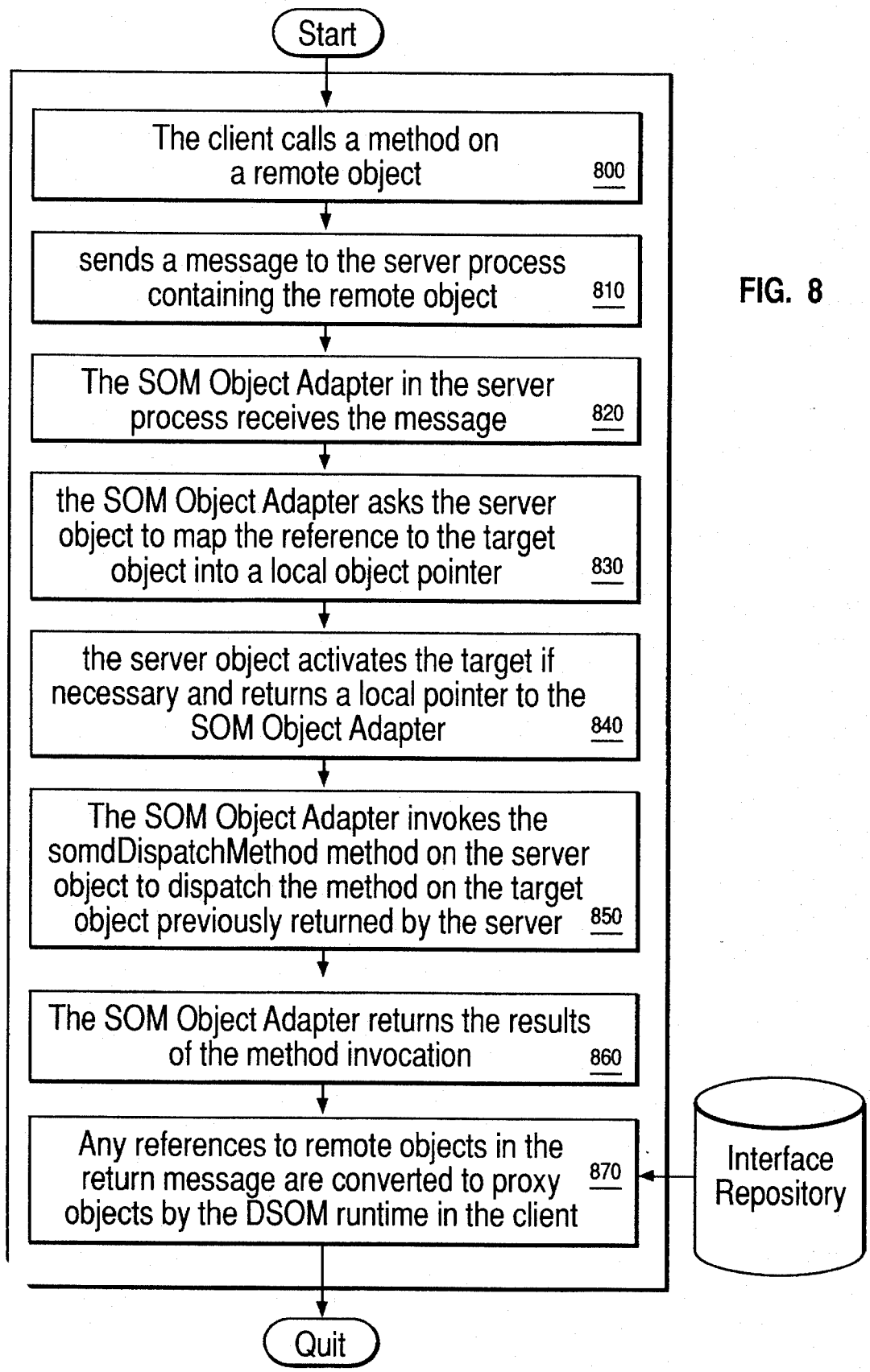
FIG. 8 is a flowchart corresponding to a call operation to a target object described with reference to FIG. 5D.

FIG. 8 is a flowchart corresponding to a call operation to a target object described above with reference to FIG. 5D. In a first step 800, the client process makes a call to the local proxy object requesting the proxy object perform some operation. The local proxy object then makes a call to the target object in the server process via the DSOM runtime. If not already activated, the server process will be activated as described above. In step 820, the SOMOA in the server process receives the call. In step 830, the SOMOA asks the SOMDServer object for a local pointer to the target object. In step 840, the SOMDServer object activates the target object if necessary and returns a local pointer to the SOMOA. In step 850, the SOMOA then makes a call to the SOMDServer object to dispatch the original call from the client process to the target object. The target object then performs the call (in the illustrated case, a subtotal operation) and returns the results to the SOMOA via the SOMDServer object. In step 860, the SOMOA then returns the results of the call to the calc proxy object in the client process via the DSOM runtime. In the case of the SOMDServer object generating a new target object in the server process to handle the call, the return results contain a reference to the new target object in the server process. As described above, any return references to new target objects would be converted in step 870 by the DSOM runtime. This conversion would include converting the reference into the appropriate proxy objects in the client process while utilizing the interface repository.

The SOMDServer object activates and calls objects for execution in response to communications received by the SOMOA and relayed to the SOMDServer. Typically, the basic object adapter (BOA) for a process will activate and call objects in response to communications without utilizing an intermediate object. By utilizing the SOMDServer object to activate and call objects in response to communications from other address spaces, the user has the capability of easily modifying the activation and calling processes by subclassing the SOMDServer or by utilizing other techniques well known in the art of object oriented programming.

Appendix A contains additional information regarding the use of the distributed object system.

Although the present invention has been fully described above with reference to specific embodiments, other alternative embodiments will be apparent to those of ordinary skill in the art. Therefore, the above description should not be taken as limiting the scope of the present invention which is defined by the appended claims.

APPENDIX A

Distributed SOM (DSOM)

(C) Copyright Internation Business Machines Corporation, 1993
All Rights Reserved.

1 Introduction

What is Distributed SOM?

Whereas the power of SOM technology comes from the fact that SOM insulates the client of an object from the object's *implementation*, the power of DSOM lies in the fact that DSOM insulates the client of an object from the object's *location*.

Distributed SOM (or DSOM) provides a framework that allows application programs to access objects across address spaces. That is, application programs can access objects in other processes, even on different machines. Both the location and implementation of an object are hidden from a client, and the client accesses the object (via method calls) in the same manner regardless of its location.

DSOM currently supports two types of distribution: distribution among processes on the same machine — referred to as *Workstation DSOM* — and distribution among a network of machines — referred to as *Workgroup DSOM*. DSOM runs on the AIX (Release 3.2 and above) and OS/2 (Release 2.0 and above) operating systems, and Workgroup DSOM supports distribution across local area networks comprised of both OS/2 and AIX systems. Future releases of DSOM may support large, enterprise-wide networks.

DSOM can be viewed in two ways:

- As an extension to the System Object Model, that allows a program to invoke methods on SOM objects in other processes, and

- As an Object Request Broker (ORB), i.e., a standardized "transport" for distributed object interaction. In this respect, DSOM complies with the Common Object Request Broker Architecture (CORBA) specification, published by the Object Management Group (OMG) and x/Open™.

This chapter describes DSOM from both perspectives.

*DSOM features*

Here is a quick summary of some of DSOM's more important features:

- Uses the standard SOM Compiler, Interface Repository, language bindings, and class libraries. DSOM provides a growth path for non-distributed SOM applications.

- Allows an application program to access a mix of local and remote objects. The fact that an object is remote is transparent to the program.

- Provides run-time services for creating, destroying, identifying, locating, and dispatching methods on remote objects. These services can be overridden or augmented to suit the application.

- Uses existing interprocess communication (IPC) facilities for Workstation communication, and common local area network (LAN) transport facilities for Workgroup communications. Support for TCP/IP, Netware IPX/SPX, and Netbios is provided. DSOM communications is extensible in that an application can provide its own transport (see Appendix E of this User's Guide).

- Provides support for writing multi-threaded (on OS/2) and event-driven programs.

- Provides a default object server program, which can be easily used to create SOM objects and make those objects accessible to one or more client programs. If the default server program is used, SOM class libraries are loaded upon demand, so no server programming or compiling is necessary.
- Complies with the CORBA 1.1 specification, which is important for application portability.

When to use DSOM

DSOM should be used for those applications that require *sharing* of objects among multiple programs. The object actually exists in only one process (this process is known as the object's *server*); the other processes (known as *clients*) access the object via remote method invocations, made transparently by DSOM.

DSOM should also be used for applications that require objects to be *isolated* from the main program. This is usually done in cases where reliability is a concern — either to protect the object from failures in other parts of the application, or (less often), to protect the application from an object.

Note that some distributed applications may have special performance, reliability, or cooperative processing requirements, to which the SOM Replication framework is better suited. The Replication framework is oriented toward "groupware" (multi-party cooperative processing) applications, and has facilities for fault tolerance and recovery. The Replication framework is distinct from DSOM in that it maintains a complete replica of an object in each participant's address space, while DSOM establishes remote connections to shared objects.

outline

Tutorial example

First, a complete example shows how an existing SOM class implementation (a "Stack") can be used, without modification, with DSOM to create a distributed "Stack" application. Using the "Stack" example as backdrop, the basic DSOM interfaces are introduced.

Programming DSOM applications

All DSOM applications involve three kinds of programming:

- *Client programming:* writing code that uses objects;
- *Server programming:* writing code that implements and manages objects; and
- *Implementing classes:* writing code that implements objects.

Three sections — "Basic Client Programming", "Basic Server Programming", and "Implementing Classes" — describe how to create DSOM applications from these three points of view. In turn, the structure and services of the relevant DSOM run-time environment are explained.

Note: The three sections are presented in the order above to aid in their explanation. However, the actual programming tasks are likely to be performed in the opposite order!

Additional examples are provided in these sections to illustrate DSOM services.

Configuring DSOM applications

The section "Configuring DSOM Applications" explains what is necessary to set up a DSOM application, once the application has been built.

Running DSOM applications

The section "Running DSOM Applications" explains what is necessary to run a DSOM application, once it has been built and configured.

*DSOM and CORBA*

Those readers interested in using DSOM as a CORBA-compliant ORB should read the section entitled "DSOM as a CORBA-compliant Object Request Broker." That section answers the question: How are CORBA concepts implemented in DSOM?

*Advanced topics*

The section on "Advanced Topics" covers the following:

- "Peer vs. client-server processes" demonstrates how peer-to-peer object interactions are supported in DSOM.

- "Dynamic Invocation Interface" details DSOM support for the CORBA dynamic invocation interface to dynamically build and invoke methods on remote objects.

- "Building client-only 'stub' DLLs" shows how a programmer can build a stub DLL for a remote object so that the DSOM run time can build a proxy without having access to the remote object's complete DLL.

- "Creating user-supplied proxy classes" describes how to override proxy generation by the DSOM run time and, instead, install a proxy object supplied by the user.

- "Sockets class" describes how DSOM uses Sockets subclasses.

*Error reporting and troubleshooting*

The section on "Error Reporting and Troubleshooting" discusses facilities to aid in problem diagnosis.

2 A Simple DSOM Example

A sample "Stack" application is presented in this section as a tutorial introduction to DSOM. It demonstrates that, for simple examples like a "Stack", after very little work the class can be used to implement distributed objects that are accessed remotely. The example first presents the "Stack" application components and the steps that the implementor must perform before the application can be run, and then describes the run-time activity that results from executing the application. This run-time scenario introduces several of the key architectural components of the DSOM run-time environment.

The "Stack" interface

The example starts with the assumption that the class implementor has successfully built a SOM class library DLL, called "stack.dll". The DLL implements the following IDL interface.

```
interface Stack: SOMObject {
        const long stackSize = 100;
        boolean full();
        boolean empty();
        long top();
        void pop();
        void push(in long element);
        #ifdef __SOMIDL__
        implementation {
            releaseorder: full, empty, top, pop, push;
            dllname="stack.dll";         // dll name
            somInit: override;           // method modifier
            long stackimpl[stackSize];   // instance data
        };
        #endif
};
```

This DLL could have been built without the knowledge that it would ever be accessed remotely. Note, however, that some DLLs may require changes in the way their classes pass arguments and manage memory, in order to be used by remote clients.

Client program using a local stack

A simple client program *written to use a local "Stack" object* is displayed below. This C program is shown so that the differences between a local and remote client program can be highlighted.

```
include <stack.h> int main(int argc, char *argv[]) {
        Stack stk;
        Environment e;

SOM_InitEnvironment(&e);
        stk = StackNew();

_push(stk,&e,100);
        _push(stk,&e,200);
        _pop(stk,&e);
        if (!_empty(stk,&e)) somPrintf("Top: %d\n", _top(stk,&e));

_somFree(stk);
        SOM_UninitEnvironment(&e);

return(0);
}
```

Client program using a remote stack

The preceding program has been rewritten below to use DSOM to create and access a "Stack" object somewhere in the system. The exact location of the object does not matter to the application — it just wants a "Stack" object. Note that the stack operations of the two programs are identical. The main differences lie in stack creation and destruction, as highlighted below.

```
#include <somd.h>
include <stack.h> int main(int argc, char *argv[]) {
        Stack stk;
        Environment e;

SOM_InitEnvironment(&e);
        SOMD_Init(&e);

StackNewClass(Stack_MajorVersion, Stack_MinorVersion);
        stk = _somdNewObject(SOMD_ObjectMgr, &e, "Stack", "");

/* Note that the stack is accessed as if it is local */
        _push(stk,&e,100);
        _push(stk,&e,200);
        _pop(stk,&e);
        if (!_empty(stk,&e)) somPrintf("Top: %d\n", _top(stk,&e));

_somdDestroyObject(SOMD_ObjectMgr, &e, stk);
        SOMD_Uninit(&e);
        SOM_UninitEnvironment(&e);

return(0);
}
```

Let's step through the differences.

First, every DSOM program must include the file <somd.h> (or, when using C++, <somd.xh>). This file defines constants, global variables, and run-time interfaces used by DSOM. Usually, this file is sufficient to establish all necessary DSOM definitions.

Next, DSOM requires its own initialization call.

```
SOMD_Init(&e);
```

The call to SOMD_Init initializes the DSOM run-time environment. SOMD_Init must be called before any DSOM run-time calls are made. A side-effect of calling SOMD_Init is that a run-time object, called the *DSOM Object Manager*, is created and a pointer to it is stored in the global variable, SOMD_ObjectMgr, for programming convenience. The DSOM Object Manager provides basic run-time support for *clients* to find, create, destroy, and identify objects. The Object Manager is discussed in detail in the section entitled "Basic Client Programming."

Next, the local stack creation statement,

```
stk = StackNew();
``` was replaced by

```
StackNewClass(Stack_MajorVersion, Stack_MinorVersion);
stk = _somdNewObject(SOMD_ObjectMgr, &e, "Stack", "");
```

The call to "StackNewClass" registers the "Stack" class with the SOM Class Manager. This call is necessary to define the "Stack" class and its interfaces to the SOM run time. In fact, in the original program "StackNewClass" is implicitly called by the "StackNew" procedure.

The call to somdNewObject asks the DSOM Object Manager (SOMD_ObjectMgr) to create a "Stack" object, wherever it can find an implementation of "Stack". (There are other methods with which one can request *specific* servers.) If no object could be created, NULL is returned and an exception is raised. Otherwise, the object returned is a "Stack" proxy.

A *proxy* is an object that is a local representative for a remote *target object*. A proxy inherits the target object's interface, so it responds to the same methods. Operations invoked on the proxy are not executed locally, but are forwarded to the "real" target object for execution. The client program always has a proxy for each remote target object on which it operates.

From this point on, the client program treats the "Stack" proxy exactly as it would treat a local "Stack". The "Stack" proxy takes responsibility for forwarding requests to and yielding results from the remote "Stack". For example,

```
_push(stk,&e,100);
``` causes a message representing the method call to be sent to the server process containing the remote object. The DSOM run time in the server process decodes the message and invokes the method on the target object. The result (in this case, just an indication of completion) is then returned to the client process in a message. The DSOM run time in the client process decodes the result message and returns any result data to the caller.

At the end of the original client program, the local "Stack" was destroyed by the statement,

```
_somFree(stk);
``` whereas in the client program above, the "Stack" proxy and the remote "Stack" are destroyed by the statement,

```
_somdDestroyObject(SOMD_ObjectMgr, &e, stk);
```

If the client only wants to release its use of the remote object (freeing the proxy) without destroying the remote object, it can call the somdReleaseObject method instead of somdDestroyObject.

Finally, the client must shut down DSOM, so that any operating system resources acquired by DSOM for communications or process management can be returned:

```
SOMD_Uninit(&e);
```

This call must be made at the end of every DSOM program.

*Using specific servers*

In DSOM, the process that manages a target object is called the object's *server*. Servers are implemented as programs that use SOM classes. Server implementations are registered with DSOM in an *Implementation Repository* — the Implementation Repository is a database queried by clients in order to find desired servers, and queried by DSOM in order to activate those servers upon demand.

The example above placed no constraints on the DSOM Object Manager as to where the remote "Stack" object should be created. The somdNewObject call creates a remote object of a specified class in an arbitrary server that implements that class. However, the DSOM Object Manager provides methods for finding specific servers.

For example, the client program above can be modified slightly to find a specific server named "StackServer", which has already been registered in DSOM's Implementation Repository. (Note that the programmer knew or discovered that the "StackServer" server implementation supports the "Stack" class.) The highlighted lines below show the changes that were made:

```
#include <somd.h>
include <stack.h> int main(int argc, char *argv[]) {
        Stack stk;
        Environment e;
        SOMDServer server;

SOM_InitEnvironment(&e);
        SOMD_Init(&e);

StackNewClass(Stack_MajorVersion, Stack_MinorVersion);
        server =
            _somdFindServerByName(SOMD_ObjectMgr, &e, "StackServer");
        stk = _somdCreateObj(server, &e, "Stack", "");

_push(stk,&e,100);
        _push(stk,&e,200);
        _pop(stk,&e);
        if (!_empty(stk,&e)) somPrintf("Top: %d\n", _top(stk,&e));

_somdDeleteObj(server, &e, stk);
        _somdReleaseObject(SOMD_ObjectMgr, &e, stk);
        _somdReleaseObject(SOMD_ObjectMgr, &e, server);
        SOMD_Uninit(&e);
        SOM_UninitEnvironment(&e);

return(0);
}
```

This version of the program replaces the somdNewObject operation with calls to somdFindServerByName and somdCreateObj. The somdFindServerByName method consults the Implementation Repository to find the DSOM server implementation whose name is "StackServer", and creates a *server proxy*, which provides a connection to that server. Every DSOM server process has a *server object* that defines methods to assist in the creation and management of objects in that server. Server objects must be instances of SOMDServer or one of its subclasses. The somdFindServerByName returns a proxy to the SOMDServer object in the named server.

Once the client has the server proxy, it can create and destroy objects in that server. The somdCreateObj call creates an object of the class "Stack" in the server named "StackServer".

To free the remote "Stack" object, the example shows a somdDeleteObj request on the stack object's server. Next, somdReleaseObject requests are made on the DSOM Object Manager, to free the stack proxy and the server proxy in the client. (Note that these three calls are equivalent to the somdDestroyObject call in the previous example.)

A note on finding existing objects

The two examples above show how a remote, transient object can be created by a client, for its exclusive use. It is also likely that clients will want to find and use objects that are already in existence. In that case, the calls to somdNewObject or somdCreateObj would be replaced with other "lookup" calls on some directory object that would take an object name or identifier and return a proxy to the remote object.

Such a directory object could be implemented by the application as a persistent SOM object, using DSOM to share it among processes.

The basic mechanisms that DSOM provides for naming and locating objects will be discussed in section 3, "Basic Client Programming".

"Stack" server implementation

A server consists of three parts. First, a "main" program, when run, provides an address space for the objects it manages, and one or more process "threads" that can execute method calls. (AIX currently does not have multi-thread support, while OS/2 does.) Second, a server object, derived from the SOMDServer class, provides methods used to manage objects in the server process. Third, one or more class libraries provide object implementations. Usually these libraries are constructed as *dynamically linked libraries* (DLLs), so they can be loaded and linked by a server program dynamically.

In this simple example, we can use the default DSOM server program, which is already compiled and linked. The default server behaves as a simple server, in that it simply receives requests and executes them, continuously. The default server creates its server object from the class, SOMDServer. The default server will load any class libraries it needs upon demand.

The "Stack" class library, "stack.dll", can be used without modification in the distributed application. This is possible because the "Stack" class is "well formed" — *there are no methods that implicitly assume the client and the object are in the same address space.*

Thus, by using the default server and the existing class library, a simple "Stack" server can be provided without any additional programming!

An application may require more functionality in the server program or the server object than the default implementations provide. A discussion on how to implement server programs and server objects is found later in this chapter, in section C.4, "Basic Server Programming".

Compiling the application

DSOM programs and class libraries are compiled and linked like any other SOM program or library. The header file "somd.h" (or for C++, "somd.xh") should be included in any source program that uses DSOM services. DSOM run-time calls can be resolved by linking with the SOMobjects Toolkit library: "libsomtk.a" on AIX and "somtk.lib" on OS/2. (The DSOM DLL, "somd.dll", will be loaded at run time.)

Installing the implementation

Before the application can be run, certain environment variables must be set and the stack class and server implementations must be registered in the SOM Interface Repository and DSOM Implementation Repository. This installation must be performed on every machine that has a copy of the Interface Repository and Implementation Repository. (If the IR and Implementation Repository are in a shared file system, this need only be done once.)

*Setting environment variables*

Several environment variables are used by SOM and DSOM. These variables need to be set before registering the DSOM application in the Interface and Implementation Repositories.

For this example, the following environment variables could be set as shown. A full description of the environment variables and how to set them is given in section 6, "Configuring DSOM."

On AIX (in the syntax of the default shell, /bin/ksh):

```
export  HOSTNAME=machine3
export  SOMIR=$SOMBASE/etc/som.ir:/u/shared/my.ir
export  SOMDDIR=/u/shared/somddir
export  SOMSOCKETS=TCPIPSockets
export  LIBPATH=$LIBPATH:$SOMBASE/lib:/u/shared/lib
export  MALLOCTYPE=3.1
```

On OS/2:

```
set  USER=pat
set  HOSTNAME=machine3
set  SOMDDIR=c:\somddir
set  SOMSOCKETS=TCPIPSockets rem *** The following variables are set in CONFIG.SYS by
rem *** the install program on OS/2, assuming "c:\som" is the
rem *** value of %SOMBASE% supplied by the user.
set  SOMIR=c:\som\etc\som.ir;c:\som.ir
set  LIBPATH=.;c:\som\lib;<previous LIBPATH>
```

USER identifies the user of a DSOM client application. DSOM sends the USER ID with every remote method call, in case the remote object wishes to perform any access-control checking. This is discussed later in the section "Basic Server Programming." (Note that USER is usually set automatically by AIX when a user logs in.)

HOSTNAME identifies the name of each machine running DSOM.

SOMIR gives a list of files that together comprise the Interface Repository. The IR is used by DSOM to guide the construction and interpretation of request messages. For DSOM, it is preferable to use *full* pathnames in the list of IR files, since the IR will be shared by several programs that may not all reside in the same directory.

SOMDDIR gives the name of a directory used to store DSOM configuration files, including the Implementation Repository.

SOMSOCKETS identifies the name of a class that implements communications services for DSOM and other SOM frameworks. (The TCPIPSockets class comes with the SOMobjects Toolkit; Netbios, Netware, and TCP/IP support are packaged with Workgroup DSOM.)

LIBPATH gives a list of directories where DLLs can be found.

MALLOCTYPE is defined by AIX; it forces the standard C library routines to use the same memory allocation algorithm as in AIX 3.1. (DSOM occasionally experiences problems using the AIX 3.2 algorithm.)

*Registering the class in the Interface Repository*

Before an object can be accessed remotely by DSOM, it is necessary to register the class's interface and implementation in the Interface Repository (IR). DSOM uses the interface information when transforming local method calls on proxies into request messages transmitted to remote objects.

DSOM servers also consult the IR to find the name of the DLL for a dynamically loaded class. The DLL name for the "Stack" class must be specified using the dllname="stack.dll" modifier in the implementation statement of the "Stack" IDL.

The IDL specification of "Stack" is compiled into the Interface Repository using the following command:

```
sc -u -sir stack.idl
```

When a class has not been compiled into the Interface Repository, DSOM will generate a run-time error when an attempt is made to invoke a method from that class. The error indicates that the method's descriptor was not found in the IR.

*Registering the server in the Implementation Repository*

It is necessary to register a description of a server's implementation in the Implementation Repository. DSOM uses this information to assist clients in finding servers, and in activating server processes upon demand.

For this example, where the default server is used, we need only to identify the server's name, and the class that the server implements. This is accomplished using the regimpl utility discussed in section 6, "Configuring DSOM Applications". The following commands define a default server, named "StackServer", which supports the Stack class:

```
regimpl -A -i StackServer
regimpl -a -i StackServer -c Stack
```

Running the application

*Starting the DSOM daemon*

Before running a DSOM application, the DSOM daemon, somdd, must be started on each (server) machine. (Client-only machines do not require an active DSOM daemon.) The daemon can be started manually from the command line, or it could be started automatically from a start-up script run at boot time. It may be run in the background with the commands somdd& on AIX and start somdd on OS/2. (The somdd program takes no parameters.)

The somdd daemon is responsible for establishing a "binding" (i.e., a connection) between a client process and a server. It will activate the desired server automatically, if necessary.

*Running the client*

Once the DSOM daemon is running on every machine, the application may be started. This is accomplished by running the client program. If the StackServer is not running, it will be started automatically by the DSOM daemon when the client attempts to invoke a method on one of its objects.

"Stack" example run–time scenario

The following scenario steps through the actions taken by the DSOM run time in response to each line of code in the second "Stack" client program presented above. The illustration following the scenario is an illustration of the processes, and the objects within them, that participate in these actions.

- Initialize an environment for error passing:

`SOM_InitEnvironment(&e);`

- Initialize DSOM:

`SOMD_Init(&e);`

This causes the creation of the DSOM Object Manager (with SOMDObjectMgr interface). The global variable SOMD_ObjectMgr points to this object.

- Initialize "Stack" class object:

```
  StackNewClass(Stack_MajorVersion, Stack_MinorVersion);
  ```

- Find the "StackServer" implementation and assign its proxy to the variable `server`:

```
  server = _somdFindServerByName(SOMD_ObjectMgr, &e, "StackServer");
  ```

This causes the creation of the server proxy object in the client process. Proxy objects are shown as shaded circles. Note that the "real" server object in the server process is not created at this time. In fact, the server process has not yet been started.

- Ask the server object to create a "Stack" and assign "Stack" proxy to variable `stk`:

```
  stk = _somdCreateObj(server, &e, "Stack", "");
  ```

This causes somdd, the DSOM daemon (already running on the server machine), to activate the stack server process (by starting the "generic" server program). The stack server process, upon activation, creates the "real" SOMDServer object in the server process. The SOMDServer object works with the DSOM run time to create a local "Stack" object and return a "Stack" proxy to the client. (The details of this procedure are deferred until section 6.4, "Basic Server Programming".)

- Ask the "Stack" proxy to push 100 onto the remote stack:

```
  _push(stk,&e,100);
  ```

This causes a message representing the method call to be marshalled and sent to the server process. In the server process, DSOM demarshals the message and, with the help of the SOMDServer, locates the target "Stack" object upon which it invokes the method ("push"). The result (which is void in this case) is then passed back to the client process in a message.

- Invoke more "Stack" operations on the remote stack, via the proxy:

```
  _push(stk,&e,200);
  _pop(stk,&e);
  if (!_empty(stk,&e)) t = _top(stk,&e);
  ```

- Explicitly destroy both the remote stack, the stack proxy, and the server proxy:

```
  _somdDeleteObj(server, &e, stk);
  _somdReleaseObject(SOMD_ObjectMgr, &e, stk);
  _somdReleaseObject(SOMD_ObjectMgr, &e, server);
  ```

- Free the error-passing environment:

```
  SOM_UninitEnvironment(&e);
  ```

This scenario has introduced the key processes in a DSOM application: client, server, and somdd. Also introduced are the key objects that comprise the DSOM run-time environment: the SOMD_ObjectMgr in the client process and the SOMD_ServerObject in the server process.

Summary

This example has introduced the key concepts of building, installing, and running a DSOM application. It has also introduced some (though not all) of the key components that comprise the DSOM application run-time environment, as pictured below.

The following sections, "Basic Client Programming", "Basic Server Programming", and "Implementing Classes" provide more detail on how to use, manage, and implement remote objects, respectively.

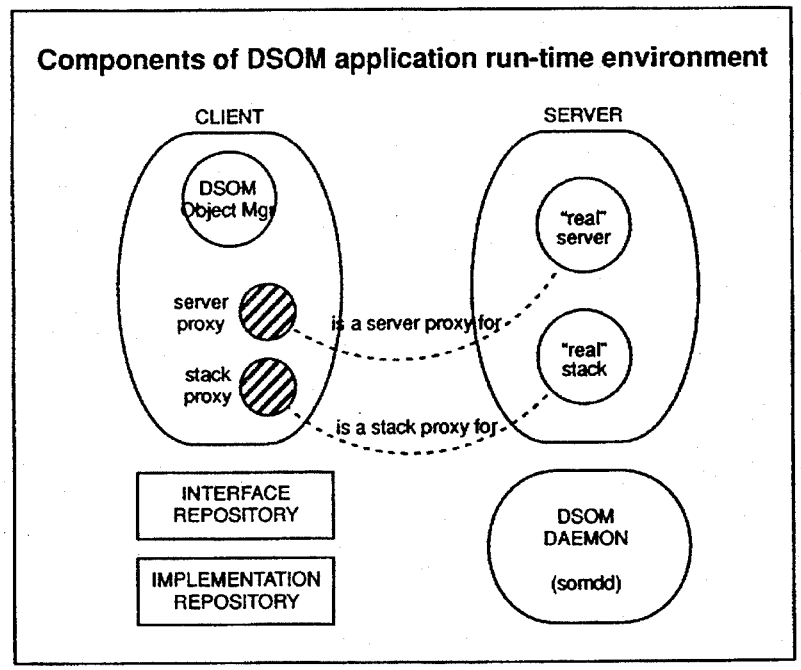

3 Basic Client Programming

For the most part, client programming in DSOM is exactly the same as client programming in SOM, since DSOM transparently hides the fact that an object is remote when the client accesses the object.

However, a client application writer also needs to know how to create, locate, use, save, and destroy remote objects. (This is *not* done using the usual SOM bindings.) The DSOM run-time environment provides these services to client programs primarily through the DSOM Object Manager. These run-time services will be detailed in this section. Examples of how an application developer uses these services are provided throughout the section.

DSOM Object Manager

DSOM defines a *DSOM Object Manager*, which provides services needed by clients to create, find and use objects in the DSOM run time environment.

The DSOM Object Manager is derived from an abstract, generic "object manager" class, called ObjectMgr. This abstract ObjectMgr class defines a basic set of methods that support object creation, location (with implicit activation), and destruction.

As an abstract class, ObjectMgr defines only an interface — there is no implementation associated with ObjectMgr. Consequently, an application should *not* create instances of the ObjectMgr class.

An abstract Object Manager class was defined under the expectation that applications will often need simultaneous access to objects implemented and controlled by a variety of object systems. Such object systems may include other ORBs (in addition to DSOM), persistent object managers, object-oriented databases, and so forth. It is likely that each object system will provide the same sort of basic services for object creation, location, and activation, but each using a different interface.

Thus, the ObjectMgr abstract class defines a simple and "universal" interface that can be mapped to any object system. The application would only have to understand a single, common ObjectMgr interface. Under this scheme, specific object managers are defined by subclassing the ObjectMgr class and overriding the ObjectMgr methods to map them into the object system-specific programming interfaces.

DSOM's Object Manager, SOMDObjectMgr, is defined as a specific class of ObjectMgr. It defines methods for:

- Finding servers that implement particular kinds of objects
- Creating objects in servers
- Obtaining object identifiers (string ids)
- Finding objects, given their identifiers
- Releasing and destroying objects These functions will be discussed in the remainder of this section.

Note: The OMG is in the early stages of reviewing submissions for programming interfaces for an "object lifecycle" service, which includes support for creating and destroying distributed objects. The interface to the DSOM Object Manager may change in the future to be compliant with the accepted standard.

Initializing a client program

A client application must declare and initialize the DSOM run time before attempting to create or access a remote object. The SOMD_Init procedure initializes all of the DSOM run time, including the SOMDObjectMgr object. The global variable, SOMD_ObjectMgr is initialized to point to the local DSOM Object Manager.

A client application must also initialize all application classes used by the program. For each class, the corresponding <className>NewClass call should be made.

Note: In non-distributed SOM programs, the <className>New macro (and the new operator provided for each class by the SOM C++ bindings) implicitly calls the procedure <className>NewClass when creating a new object. This is not currently possible in DSOM because, when creating remote objects, DSOM uses a generic method that is not class specific.

This was shown in the "Stack" example in section 2. In a similar example of an application that uses "Car" and "Driver" objects, the initialization code might look like this:

```
#include <somd.h>     /* needed by all clients */
#include <Car.h>      /* needed to access remote Car */
include <Driver.h>   /* needed to access remote Driver */ main()
{
    Environment ev; /* ev used for error passing */
    SOM_InitEnvironment(&ev);

/* Do DSOM initialization */
    SOMD_Init(&ev);

/* Initialize application classes */
    CarNewClass(Car_MajorVersion, Car_MinorVersion);
    DriverNewClass(Driver_MajorVersion, Driver_MinorVersion);
    ...
}
```

As shown, client programs should include the "somd.h" file (or, for C++ programs, the "somd.xh" file) in order to define the DSOM run-time interfaces.

Note also that, since Environments are used for passing error results between a method and its caller, an Environment variable (ev) must be declared and initialized for this purpose.

The calls to "CarNewClass" and "DriverNewClass" are required if the client will be creating or accessing Cars and Drivers. The procedures "CarNewClass" and "DriverNewClass" create class objects for the classes "Car" and "Driver". When a DSOM Object Manager method like somdNewObject is invoked to create a "Car", it expects the "Car" class object to exist. If the class does not yet exist, the "ClassNotFound" exception will be returned.

Exiting a client program

At the end of a client program, the SOMD_Uninit procedure must be called to free DSOM run-time objects, and to release system resources such as semaphores, shared memory segments, and so on.

For example, the exit code in the client program might look like this:

```
...
SOMD_Uninit(&e);
SOM_UninitEnvironment(&e);
}
```

Note also the SOM_UninitEnvironment call, which frees any memory associated with the specified Environment structure.

Creating remote objects

Distributed objects can be created in several different ways in DSOM.

- The client can create an object on any server that implements that class of object.

- The client can find a specific server upon which to create an object.

- A server can create an object and register a reference to the object in some well-known directory. (An *object reference* contains information that reliably identifies a particular object.)

The first two cases are discussed immediately below. The last case is discussed near the end of this section.

Creating an object in an arbitrary server

Following is an example of how to create a new remote object in the case where the client does not care in which server the object is created. In this situation, the client defers these decisions to the DSOM Object Manager (SOMD_ObjectMgr) by using the somdNewObject method call, which has this IDL definition:

```
// (from file om.idl)

SOMObject somdNewObject(in Identifier objclass, in string hints);

// Returns a new object of the named class.  This is a "basic"
// creation method, where the decisions about where and how to
// create the object are mostly left up to the Object Manager.
// However, the Object Manager may optionally define creation
// "hints" which the client may specify in this call.
```

Here is the example of a how a remote "Car" would be created using somdNewObject:

```
#include <somd.h>
include <Car.h> main()
{
    Environment ev;
    Car car;

SOM_InitEnvironment(&ev);
    SOMD_Init(&ev);

/* create the class object */
    CarNewClass(Car_MajorVersion, Car_MinorVersion);

/* create a Car object on some server, let the
       Object Manager choose which one */
    car = _somdNewObject(SOMD_ObjectMgr, &ev, "Car", "");
    ...
}
```

The main argument to the somdNewObject method call is a string specifying the name of the class of the desired object. The last argument is a string that may contain "hints" for the Object Manager when choosing a server. In this example, the client is providing no hints. (Currently, the DSOM Object Manager simply passes the hints to the server object in a somdCreateObj call.)

*Proxy objects*

As far as the client program is concerned, when a remote object is created, a pointer to the object is returned. However, what is actually returned is a pointer to a *proxy object*, which is a local representative for the remote *target object*.

Proxies are responsible for ensuring that operations invoked on it get forwarded to the "real" target object that it represents. The DSOM run time creates proxy objects automatically, wherever an object is returned as a result of some remote operation. The client program will always have a proxy for each remote target object on which it operates. Proxies are described further in the sections entitled "DSOM as a CORBA-compliant Object Request Broker" and "Advanced Topics".

In the example above, a pointer to a "Car" proxy is returned and put in the variable "car". Any subsequent methods invoked on "car" will be forwarded and executed on the corresponding remote "Car" object.

Proxy objects inherit behavior from the SOMDClientProxy class.

*Servers and server objects*

In DSOM, the process that manages a target object is called the object's *server*. Servers are implemented as programs that use SOM classes. The example above placed no constraints on the DSOM Object Manager as to which server should create the remote "Car" object. However, if the client desires more control over distribution of objects, the DSOM Object Manager provides methods for finding specific servers.

Server implementations are registered with DSOM in an *Implementation Repository*. Server implementations are described by a unique ID, a unique (user-friendly) name, the program name that implements the server, the classes that are implemented by the server, the machine on which the server is located, whether the server is multi-threaded, and so forth. (See section 6 for more information on registering server implementations.) A client can ask the DSOM Object Manager to find a particular server:

- By name,
- By ID,
- By a class it supports.

When a client asks for a "server", it is given (a proxy to) a *server object* that provides interfaces for managing the objects in the server. There is one server object per server process. All server objects are instances of the SOMDServer class, or its subclasses. The default method provided by SOMDServer for creating objects is:

```
// (from file somdserv.idl)

SOMObject somdCreateObj(in Identifier objclass, in string hints);

// Creates an object of the specified class.  This method
// may optionally define creation "hints" which the client
// may specify in this call.  (Hints are ignored by default.)
```

Section 4 explains how to create application-specific server objects, derived from SOMDServer, which override SOMDServer methods and introduce their own methods for object management.

*Creating an object in a specific server*

The following example demonstrates how a client application creates a new object *in a remote server chosen by the client*. The DSOM Object Manager method somdFindServerByName is used to find and create a proxy to the server object for the server implementation named "myCarServer". The method somdCreateObj is then invoked on the server object to create the remote "Car". A proxy to the remote "Car" is returned. (The "Stack" client presented in the previous section used the same methods to create a remote "Stack".)

```
/* find a specific Car server */
   server =
      _somdFindServerByName(SOMD_ObjectMgr, &ev, "myCarServer");

/* create a remote Car object on that server */
   car = _somdCreateObj(server, &ev, "Car", "");
   ...
}
```

Note: If the specified server does *not* provide any implementation of the desired class, a NULL pointer will be returned and a "ClassNotFound" exception will be raised.

Three other methods can be invoked on the DSOM Object Manager to find server implementations: somdFindServer, somdFindServersByClass, and somdFindAnyServerByClass. The IDL declarations of these methods follow:

```
SOMDServer somdFindServer(in ImplId serverid);

sequence<SOMDServer> somdFindServersByClass(in Identifier objclass);

SOMDServer somdFindAnyServerByClass(in Identifier objclass);
```

The somdFindServer method is similar to the somdFindServerByName method, except that the server's *implementation ID* (of type ImplId) is used to identify the server instead of the server's user-friendly name (or "alias"). The implementation ID is a unique string generated by the Implementation Repository during server registration. (See section 6 for more details.)

The somdFindServersByClass method, given a class name, returns a sequence of *all* servers that support the given class. The client program may then choose which server to use, based on the server's name, location, program, or other implementation attributes (e.g., the server is multi-threaded). (See the topic below, "Inquiring about a remote object's implementation.)

Finally, the somdFindAnyServerByClass method simply selects any one of the server implementations registered in the Implementation Repository that supports the given class, and returns a server proxy for that server.

Once the server proxy is obtained, methods like somdCreateObj, shown in the example above, can be invoked upon it to create new objects.

*Inquiring about a remote object's implementation*

A client may wish to inquire about the (server) implementation of a remote object. All objects in a server, including the "server object", share the same implementation definition. This is common when using the somdFindServersByClass call, where a sequence of server proxies is returned, and some choice must be made about which to use.

When a proxy is obtained by a client, the client can inquire about the underlying server implementation by obtaining its corresponding ImplementationDef. An ImplementationDef object contains a set of attributes that describe a server implementation. To get the ImplementationDef associated with a remote object, the get_implementation method (implemented on SOMDObject and inherited by SOMDClientProxy) can be called.

For example, if a program has a proxy for a remote server object, it can get the ImplementationDef for the server with method calls similar to the following:

```
ImplementationDef implDef;
SOMDServer server;
...
implDef = _get_implementation(server, &ev);
```

Once the ImplementationDef has been obtained, the application can access its attributes using the _get_impl_xxx methods.

The ImplementationDef class is discussed further in section 6.6, "Configuring DSOM."

Destroying remote objects

There are several ways of destroying objects or their proxies in DSOM, just as there are several ways to create objects. Remote objects can be asked to destroy themselves, or, the SOMDObjectMgr and the SOMDServer can participate in the deletion.

Destroying objects via a proxy

DSOM provides means for deleting remote objects via their proxies. For example, if somFree is invoked on a proxy, the somFree call gets forwarded directly to the target object, just like any other target method call. For example,

```
_somFree(car);
``` frees the remote car.

To be explicit about whether the proxy or the remote object is being deleted, the methods somdTargetFree and somdProxyFree, defined on proxies, can be used:

```
_somdTargetFree(car, &ev);
``` frees the remote "Car" (but not the proxy) and

```
_somdProxyFree(car, &ev);
``` frees the proxy (but not the remote "Car").

Note: CORBA specifies a third method for deleting object references. (Proxies are a specialized type of object reference.) The method

```
_release(car, &ev);
``` deletes the proxy (but not the target object).

Destroying objects via the DSOM Object Manager

Having created a remote object with somdNewObject or somdCreateObj, the remote object and its local proxy may be destroyed by invoking the method somdDestroyObject on the DSOM Object Manager using the proxy as an argument. For example,

```
/* create the car */
car = _somdNewObject(SOMD_ObjectMgr, &ev, "Car", "");
...
/* destroy the car (and its proxy) */
_somdDestroyObject(SOMD_ObjectMgr, &ev, car);
```

If the client does not want to destroy the remote object, but is finished working with it, the somdReleaseObject method should be used instead, e.g.,

```
_somdReleaseObject(SOMD_ObjectMgr, &ev, car);
```

This deletes the local proxy, but not the remote object.

Both somdDestroyObject and somdReleaseObject are defined on the ObjectMgr, so that the Object Manager is aware of the client's actions, in case it wants to do any bookkeeping.

*Destroying objects via a server object*

The somdDestroyObject method described above sends a request to delete a remote object to the object's server. It does so to ensure that the server has an opportunity to participate in, if not perform, the deletion. The method defined on the SOMDServer class for destroying objects is somdDeleteObj. If the client has a proxy for the server object, it can also invoke somdDeleteObj directly, instead of calling somdDestroyObject.

Destroying objects via the server object, rather than asking the object itself (as in somFree or somdTargetFree), allows the server object do any clean-up that is needed. For simple applications, this may not be necessary, but for applications that provide their own application-tailored server objects, it may be critical. See, for example, the persistent server example in the section entitled "Basic Server Programming."

Creating remote objects using user-defined metaclasses

An application may wish to define its own constructor methods for a particular class, via a user-supplied metaclass. In this case, the somdNewObject method should not be used, since it simply calls the default constructor method, somNew, defined by SOMClass.

Instead, the application can obtain a proxy to the actual class object in the server process. It can do so via the somdGetClassObj method, invoked on the SOMDServer proxy returned by one of the somdFindServerXxx methods. The application-defined constructor method can then be invoked on the proxy for the remote class object.

Note: The same issues apply to destructor methods. If the application defines its own destructor methods, they can be called via the class object returned by somdGetClassObj, as opposed to calling somdDestroyObject.

The following example creates a new object in a remote server using an application-defined constructor method, "makeCar", which is assumed to have been defined in the metaclass of "Car", named "MetaCar".

```
#include <somd.h>
include <Car.h>
main( )
{
    Environment ev;
    SOMDServer server;
    Car car;
    MetaCar carClass;

SOM_InitEnvironment(&ev);
    SOMD_Init(&ev);

/* find a Car server */
    server = _somdFindAnyServerByClass(SOMD_ObjectMgr, &ev, "Car");

/* get the class object for Car */
    carClass = (MetaCar) _somdGetClassObj(server, &ev, "Car");

/* create the car object */
    car = _makeCar(carClass, &ev, "Red", "Toyota", "2-door");

...
}
```

Saving and restoring references to objects

A proxy is a kind of "object reference". An *object reference* contains information that is used to identify a target object.

To enable clients to save references to remote objects (in a file system, for example) or exchange references to remote objects (with other application processes), DSOM must be able to externalize proxies. To "externalize a proxy" means to create a string ID for a proxy that can be used by any process to identify the remote target object. DSOM must also support the translation of string IDs back into proxies.

The DSOM Object Manager defines two methods for converting between proxies and their string ids: somdGetIdFromObject and somdGetObjectFromId.

Here is an example client program that creates a remote "Car" object. It generates a string ID corresponding to the proxy, and saves the string ID to a file for later use.

```
#include <stdio.h>
#include <somd.h>
include <Car.h>
main( )
{
    Environment ev;
    Car car;
    string somdObjectId;
    FILE* file;

SOM_InitEnvironment(&ev);
    SOMD_Init(&ev);

/* create a remote Car object */
    car = _somdNewObject(SOMD_ObjectMgr, &ev, "Car", "");

/* save the reference to the object */
    somdObjectId = _somdGetIdFromObject(SOMD_ObjectMgr, &ev, car);
    file = fopen("/u/joe/mycar", "w");
    fprintf(file, "%s", somdObjectId);
    ...
```

Next is an example client program that retrieves the string ID and regenerates a valid proxy for the original remote "Car" object (assuming the remote "Car" object can still be found in the server).

```
    ...
    Environment ev;
    Car car;
    char buffer[256];
    string somdObjectId;
    FILE* file;
    ...
    /* restore proxy from its string form */
    file = fopen("/u/joe/mycar", "r");
    somdObjectId = (string) buffer;
    fscanf(file, "%s", somdObjectId);
    car = _somdGetObjectFromId(SOMD_ObjectMgr, &ev, somdObjectId);
    ...
```

Once the proxy has been regenerated, methods can be invoked on the proxy and they will be forwarded to the remote target object, as always.

Note: The somdGetIdFromObject and somdGetObjectFromId methods directly correspond to the CORBA methods ORB_object_to_string and ORB_string_to_object, defined on the ORB class.

Finding existing objects

The SOMDObjectMgr and SOMDServer classes support the methods described above, which allow clients to create objects in servers. However, it is also likely that clients will want to find and use objects that have already been created, usually by the servers that implement them. For example, a print service will create printer objects, and must then export them to clients. In that case, the calls to somdNewObject or somdCreateObj would be replaced with other "lookup" calls on some directory (server) object which would take an object name or identifier and return a proxy to a corresponding remote object. Likewise, the server that owns the object would register the exported object in the directory.

It is important to understand that DSOM does not provide a directory service such as the one described. But such a directory object could be implemented by the application, where a table or collection object maps object names to proxies. The string ids for the proxies in the directory object could be saved using a file (as above) or a persistent object
A directory server implemented using DSOM could be used to share the directory among processes.

Upon a lookup call, the directory server could find the corresponding proxy (or its string id) in the directory, and return it to the caller.

Finding server objects

The DSOM Object Manager can be used to find server object proxies using the somdFindServerXxx methods. However, it is important to point out that an application can also augment those services, by managing server proxies itself. Server proxies can be maintained in an application-specific directory, stored in a file, or passed from process to process, just as any other proxies.

Invoking methods on remote objects

As described earlier, DSOM proxies are local representatives of remote objects, and as such, they can be treated like the target objects themselves. Method calls are invoked in exactly the same manner as if the object is local. This is true both for method calls using the *static bindings* (as most of our examples have shown), as well as for *dynamic dispatching* calls, where SOM facilities (such as the somDispatch method) are used to construct method calls at run time.

CORBA 1.1 also defines a dynamic invocation interface that is implemented by DSOM. It is described later in section 9, "Advanced Topics".

The DSOM run time is responsible for transporting any input method argument values supplied by the caller (defined by legal IDL types) to the target object in a remote call. Likewise, the DSOM run time transports the return value and any output argument values back to the caller following the method call.

Note: DSOM uses the Interface Repository (IR) to discover the "signature" of a method (that is, the method's prototype). It is important that the contents of the IR match the method bindings used by the application program (i.e. the same IDL file is used to update the IR and to generate bindings).

Passing object references in method calls

When pointers to objects are returned as method output values (as in the previous examples), DSOM automatically converts the object pointers (in the server) to object proxies in the client.

Likewise, when a client passes object (proxy) pointers as input arguments to a method, DSOM automatically converts the proxy argument in the client to an appropriate object reference in the server.

Note: If the proxy is for an object that is in the same server as the target object, DSOM gives the object reference to the server object for resolution to a SOM object pointer. Otherwise, DSOM leaves the proxy alone, since the proxy must refer to an object in some process other than the target's server.

Writing clients that are also servers

In many applications, processes may need to play both client and server roles. That is, objects in the process may make requests of remote objects on other servers, but may also implement and export objects, requiring that it be able to respond to incoming requests. Details of how to write programs in this peer-to-peer style are explained in section 9, "Advanced Topics".

Compiling and linking clients

All client programs must include the header file "somd.h" (or for C++, "somd.xh") in addition to any "<*className*>.h" (or "<*className*>.xh") header files they require from application classes. All DSOM client programs must link to the SOMobjects Toolkit library: "libsomtk.a" on AIX and "somkt.lib" on OS/2.

4 Basic Server Programming

Server programs execute and manage object implementations. That is, they are responsible for:

- Notifying the DSOM daemon that they are ready to begin processing requests,
- Accepting client requests,
- Loading class library DLLs when required,
- Creating/locating/destroying local objects,
- Demarshalling client requests into method invocations on their local objects,
- Marshalling method invocation results into responses to clients, and
- Sending responses back to clients.

As mentioned previously, DSOM provides a simple, "generic" server program that performs all of these tasks. All the server programmer needs to provide are the application class library(ies) DLL that the implementor wants to distribute. Optionally, the programmer can also supply an application-specific server class, derived from SOMDServer. (The SOMDServer class can be used by default.) The server program does the rest automatically.

The "generic" server program is called somdsvr and can be found in /usr/lpp/som/bin/somdsvr on AIX and in %SOMBASE%\bin\somdsvr.exe on OS/2.

Some applications may require additional flexibility or functionality than what is provided by the generic server program. In that case, application-specific server programs can be developed. This section discusses the steps involved in writing a such a server program.

To create a server program, a server writer needs to know what services the DSOM run-time environment will provide and how to use those services to perform the duties (listed above) of a server. The DSOM run-time environment provides several key objects that can be used to perform server tasks. These objects and the services they provide will be discussed in this section. Examples showing how to use the run-time objects to write a server are also shown.

Server run-time objects

There are three DSOM run-time objects that are important in a server:

- The server's *implementation definition* (ImplementationDef),
- The *SOM Object Adapter* (SOMOA), and
- The application-specific *server object* (an instance of either SOMDServer or a class derived from SOMDServer).

Server implementation definition

A *server's implementation definition* must be registered in the *Implementation Repository* before a server can be used. When a client attempts to invoke a method on a remote object, DSOM consults the Implementation Repository to find the location of the target object's server.

An implementation definition is represented by an object of class ImplementationDef, whose attributes describe a server's id, user-assigned alias, host name, program pathname, the class of its server object, whether or not it is multi-threaded, and so forth. Implementation IDs uniquely identify servers within the Implementation Repository, and are used as keys into the Implementation Repository when retrieving the ImplementationDef for a particular server.

It is possible to change the implementation characteristics of a server, even to the point of using a completely different server program on another machine. Thus, the implementation ID identifies a *logical server*, and the ImplementationDef describes the current implementation of that logical server.

See the topic "Registering Servers and Classes" in section 6 for details on server registration. Two registration methods are described: "manual," via the regimpl utility, and "programmatic," via ImplRepository methods.

When a server is initialized, it must retrieve a copy of its ImplementationDef, and keep it in a global variable (SOMD_ImplDefObject). This variable is used by the DSOM run time. (Client-only programs may leave the SOMD_ImplDefObject variable set to NULL.)

*SOM Object Adapter (SOMOA)*

The *SOM Object Adapter* (SOMOA) is the main interface between the server application and the DSOM run time. The SOMOA is responsible for most of the server duties listed at the beginning of this section. In particular, the SOMOA object handles all communications and interpretation of inbound requests and outbound results. When clients send requests to a server, the requests are received and processed by the SOMOA.

The SOMOA works together with the server object to create and resolve DSOM references to local objects, and dispatch methods on objects.

There is one SOMOA object per server process. (The SOMOA class is implemented as a *single instance* class.)

*Server object*

Each server process contains a single *server object*, which has the following responsibilities for managing objects in the server:

- Provides an interface to *client applications* for basic object creation and destruction services, as well as any other application-specific object-management services that may be required by clients. For example, a print server may have a method that returns a list of all printers managed by that server. Clients may call this method to find out what printers are available.

- Provides an interface to the *SOM Object Adapter* for support in the creation and management of DSOM object references (which are used identify an object in the server), and for dispatching requests.

The server class, SOMDServer, defines the base interface that *must* be supported by any server object. In addition, SOMDServer provides a default implementation that is suited to managing transient SOM objects in a server. This section will show how an application might override the basic SOMDServer methods and introduce new methods in order to tailor the server object functionality to a particular application.

Server activation

Server programs may be activated either

- *Automatically* by the DSOM daemon, somdd, or
- *Manually* via command line invocation, or under application control.

When a server is activated automatically by somdd, it will be passed a single argument (in argv[1]) that is the *implementation ID* assigned to the server implementation when it was registered into the Implementation Repository (discussed above and in section 6, "Configuring DSOM Applications"). This is useful when the server program cannot know until activation which "logical" server it is implementing. (This is true for the generic server provided with DSOM.) The implementation ID is used by the server to retrieve its ImplementationDef from the Implementation Repository.

A server that not activated by somdd may obtain its ImplementationDef from the Implementation Repository in any manner that is convenient: by ID, by alias, and so forth. Moreover, a server may choose to "register itself" dynamically, as part of its initialization. To do so, the server would use the programmatic interface to the Implementation Repository.

For example, suppose that the server program "myserver" was designed so that it could be activated either automatically or manually. This requires that it be written to expect the implementation ID as its first argument, and to use that argument to retrieve its ImplementationDef fro the Implementation Repository. If an application has defined a server in the Implementation Repository whose implementation ID is 2bcdc4f2-0f62f780-7f-00-10005aa8afdc, then "myserver" could be run as that server by invoking the following command:

```
myserver 2bcdc4f2-0f62f780-7f-00-10005aa8afdc
```

Initializing a server program

Initializing the DSOM run-time environment

The first thing the server program should do is to initialize the DSOM run time by calling the SOMD_Init function. This causes the various DSOM run-time objects to be created and initialized, including the Implementation Repository (accessible via the global variable SOMD_ImplRepObject), which is used in the next initialization step.

Initializing the server's ImplementationDef

Next, the server program is responsible for initializing its ImplementationDef, referred to by the global variable SOMD_ImplDefObject. It is initialized to NULL by SOMD_Init. (For client programs it should be left as NULL.) If the server implementation was registered with the Implementation Repository before the server program was activated (as will be the case for all servers that are activated automatically by somdd), then the ImplementationDef can be retrieved from the Implementation Repository. Otherwise, the server program can register its implementation with the Implementation Repository dynamically (as shown in section 6.6, "Configuring DSOM applications").

The server can retrieve its ImplementationDef from the Implementation Repository by invoking the find_impldef method on SOMD_ImplRepObject. It supplies, as a key, the implementation ID of the desired ImplementationDef.

The following code shows how a server program might initialize the DSOM run-time environment and retrieve its ImplementationDef from the Implementation Repository.

```
#include <somd.h> /* needed by all servers */
main(int argc, char **argv)
{
   Environment ev;
   SOM_InitEnvironment(&ev);

/* Initialize the DSOM run-time environment */
   SOMD_Init(&ev);

/* Retrieve its ImplementationDef from the Implementation
   Repository by passing its implementation ID as a key */
   SOMD_ImplDefObject =
      _find_impldef(SOMD_ImplRepObject, &ev, argv[1]);
   ...
}
```

Initializing the SOM Object Adapter

The next step the server must take before it is ready to accept and process requests from clients is to create a SOMOA object and initialize the global variable SOMD_SOMOAObject to point to it. This is accomplished by the assignment:

```
SOMD_SOMOAObject = SOMOANew();
```

Note: The SOMOA object is not created automatically by SOMD_init because it is only required by server processes.

After the global variables have been initialized, the server can do any application-specific initialization required before processing requests from clients.

Finally, when the server is ready to process requests, it must call the impl_is_ready method on the SOMOA:

```
_impl_is_ready(SOMD_SOMOAObject, &ev, SOMD_ImplDefObject);
```

The SOMOA will then set up a communications port for incoming messages, which it registers with the DSOM daemon. Once the DSOM daemon has been notified of the server's port, it assists client applications in "binding" (i.e., establishing a connection) to that server.

The impl_is_ready method also causes the server object, whose class is defined in the server's ImplementationDef, to be created. The server object can be referenced through the global variable, SOMD_ServerObject.

When initialization fails

It is possible that a server will encounter some error when initializing itself. Servers must attempt to notify DSOM that their activation failed, using the activate_impl_failed method. This method is called as follows:

```
/* tell the daemon (via SOMOA) that activation failed */
_activate_impl_failed(SOMD_SOMOAObject,&ev, SOMD_ImplDefObject, rc);
```

Note: A server program should *not* call activate_impl_failed once it has called impl_is_ready.

Processing requests

The SOMOA is the object in the DSOM run-time environment that receives client requests and transforms them into method calls on local server objects. In order for SOMOA to listen for a request, the server program must invoke one of two methods on SOMD_SOMOAObject. If the server program wishes to turn control over to SOMD_SOMOAObject completely (that is, effectively have SOMD_SOMOAObject go into an infinite request-processing loop), then it invokes the execute_request_loop method on SOMD_SOMOAObject as follows:

```
rc = _execute_request_loop(SOMD_SOMOAObject, &ev, SOMD_WAIT);
```

Note: This is the way the DSOM-provided "generic" server program interacts with SOMD_SOMOAObject.

The execute_request_loop method takes an input parameter of type Flags. The value of this parameter should be either SOMD_WAIT or SOMD_NOWAIT. If SOMD_WAIT is passed as argument, execute_request_loop will return only when an error occurs. If SOMD_NOWAIT is passed, it will return when there are no more outstanding messages to be processed. SOMD_NOWAIT is usually used when the server is being used with the event manager. See the topic "Peer vs. client-server processes" in section 9, "Advanced Topics," for more details.

If the server wishes to incorporate additional processing between request executions, it can invoke the execute_next_request method to receive and execute requests one at a time:

```
for(;;) {
    rc = _execute_next_request(SOMD_SOMOAObject, &ev, SOMD_NOWAIT);
    /* perform app-specific code between messages here, e.g., */
        if (!rc) numMessagesProcessed++;
}
```

Just like execute_request_loop, execute_next_request has a Flags argument that can take one of two values: SOMD_WAIT or SOMD_NOWAIT. If execute_next_request is invoked with the SOMD_NOWAIT flag and no message is available, the method returns immediately with a return code of SOMDERROR_NoMessages. If a request is present, it will execute it. Thus, it is possible to "poll" for incoming requests using the SOMD_NOWAIT flag.

Exiting a server program

When a server program exits, it should notify the DSOM run time that it is no longer accepting requests. This should be done whether the program exits normally, or as the result of an error. If this is not done, somdd will continue to think that the server program is active, allowing clients to attempt to connect to it, as well as preventing a new copy of that server from being activated.

To notify DSOM when the server program is exiting, the deactivate_impl method defined on SOMOA should be called. For example,

```
/* tell DSOM (via SOMOA) that server is now terminating */
    _deactivate_impl(SOMD_SOMOAObject, &ev, SOMD_ImplDefObject);
```

Note: For robustness, it would be worthwhile to add appropriate "exit handlers" or "signal handlers" to your application servers that call the deactivate_impl method upon abnormal program termination. This ensures the the DSOM daemon is made aware of the server's termination, so that client connections are no longer allowed.

Finally, at the end of a server program, the SOMD_Uninit procedure must be called to free DSOM run-time objects, and to release semaphores, shared memory segments, and any other system resources.

For example, the exit code in the server program might look like this:

```
    ...
    SOMD_Uninit(&e);
    SOM_UninitEnvironment(&e);
}
```

Note also the SOM_UninitEnvironment call, which frees any memory associated with the specified Environment structure.

Managing objects in the server

Object references, ReferenceData, and the ReferenceData table

One of SOMOA's responsibilities is to support the creation of object references (SOMDObjects). Recall from the "Stack" example discussion (in Section 6.2) that an *object reference* is an exportable "handle" to an object and that proxies are examples of object references. The SOMOA interface supports three operations for creating object references: create, create_constant, and create_SOM_ref.

The create and create_constant methods allow a server to associate application-specific data about an object with an object reference for that object. This data, called *reference data*, is represented in a sequence of up to 1024 bytes of information about the object. This sequence, defined by the type ReferenceData, may contain the object's location, state, or any other characteristics meaningful to the application. Usually, ReferenceData is used by a server process to locate or activate an object in the server. ReferenceData, and hence the methods create and create_constant, are usually only used in connection with persistent objects (objects whose lifetimes exceed that of the process that created them).

The create method differs from the create_constant method in the following way: ReferenceData associated with an object reference constructed by create_constant is immutable whereas the the ReferenceData associated with an object reference created by create can be changed (via the change_id method). References created with create_constant return true when the method is_constant is invoked on them.

The create method stores the ReferenceData in a *ReferenceData table* associated with the server, while create_constant maintains the ReferenceData as a constant part of the object reference. The ReferenceData associated with an object reference (whether it was constructed using create or create_constant) can be retrieved via the SOMOA method get_id.

The IDL SOMOA interface declarations of create, create_constant, get_id, and change_id, and the SOMDObject interface declaration of is_constant are presented below.

```
/* From the SOMOA interface */ sequence <octet,1024> Referencedata;
    SOMDObject create(in ReferenceData id, in InterfaceDef intf,
                      in ImplementationDef impl);

SOMDObject create_constant(in ReferenceData id,
                               in InterfaceDef intf,
                               in ImplementationDef impl);

ReferenceData get_id(in SOMDObject objref);

void change_id(in SOMDObject objref, in ReferenceData id);

/* From the SOMDObject interface */ boolean is_constant();
```

An example of how ReferenceData can be used by an application follows the description of SOMDServer objects in the next section.

Simple SOM object references

In order to efficiently support the generation and interpretation of references to SOM objects, the SOMOA defines another method called create_SOM_ref.

The create_SOM_ref method creates a simple DSOM reference (SOMDObject) for a local SOM object. The reference is "special" in that, unlike create and create_constant, there is no user-supplied ReferenceData associated with the object and because the reference is only valid while the SOM object exists in memory. The SOMObject to which it refers can be retrieved via the get_SOM_object method. The is_SOM_ref method can be used to tell if the reference was created using create_SOM_ref or not. The IDL declarations for create_SOM_ref, get_SOM_object, and is_SOM_ref are displayed below:

```
/* from SOMOA's interface */

SOMDObject create_SOM_ref(in SOMObject somobj,
                              in ImplementationDef impl);

SOMObject get_SOM_object(in SOMDObject somref);

/* from SOMDObject's interface */ boolean is_SOM_ref();
```

SOMDServer (default server-object class)

Every server has a server object that implements three kinds of activities:

- Creation and destruction of SOM objects
- Mapping between SOMObjects and SOMDObjects, and
- Dispatching methods on SOM objects Additional, application-specific server methods (for initialization, server control, etc.) can be defined in a subclass of the SOMDServer class. The class of the server object to be used with a server is contained in the server's ImplementationDef.

Following are the IDL declarations of the SOMDServer operations:

```
// methods called by a client

SOMObject somdCreateObj(in Identifier objclass, in string hints);

void somdDeleteObj(in SOMObject somobj);

SOMClass somdGetClassObj(in Identifier objclass);

// methods called by SOMOA

SOMDObject somdRefFromSOMObj(in SOMObject somobj);

SOMObject somdSOMObjFromRef(in SOMDObject objref);

void somdDispatchMethod(in SOMObject somobj,
                            out somToken retValue,
                            in somId methodId,
                            in va_list ap);
```

Creation and destruction of SOM objects

The SOMDServer class defines methods for the basic creation of SOM objects in the server process (somdCreateObj), and for finding the SOM class object for a specified class (somdGetClassObj). With somdGetClassObj, a client can get a proxy to a class object on the server, so that methods introduced in the class's metaclass (for example, class-specific constructors, etc.) may be invoked directly on the class object. Examples of client use of these two methods were presented earlier in Sections 2 and 3.

With somdDeleteObj, the client can involve the server object in object destruction. (The methods somdTargetFree and somFree are defined on the objects themselves and do not involve the server object.) Involving the server object in object creation and destruction can be important for applications that need more control over how objects are created and destroyed, or if the application needs to keep track of an object's creation and destruction.

Mapping objects to object references

SOMDServer also defines methods that implement mappings between SOMObjects and SOMDObjects (object references) and a method for dispatching method calls on SOM objects. These methods are used by the SOM Object Adapter (SOMOA) when converting remote requests into method calls and results into responses.

Recall from the topic "Objects returned from servers" in Section 3, "Basic Client Programming", that servers return *proxies* to remote objects as method results, not the remote objects themselves. Recall also that class libraries need not be designed to be distributed (that is, the code that implements the classes need not be aware of the existence of proxy objects at all). Thus, it is up to the DSOM run-time environment to ensure that proxies, rather than remote objects, are returned to clients. The SOMD_SOMOAObject and SOMD_ServerObject work together to perform this service. Whenever a result from a remote method call includes a SOMObject, the SOMD_SOMOAObject invokes the somdRefFromSOMObj method on SOMD_ServerObject, asking it to create a SOMDObject from the SOMObject.

The default implementation (i.e., SOMDServer's implementation) for somdRefFromSOMObj uses the create_SOM_ref method to return a "simple" reference for the SOMObject. Application-specific server objects (instances of a subclass of SOMDServer) may elect to use create or create_constant to construct the object reference if the application requires ReferenceData to be stored.

*Hints on the use of create vs. create_constant*

Enough context now exists so that the following question may be answered: "If object references constructed with create support changeable ReferenceData, but object references constructed with create_constant do not, why would I ever want to use create_constant?"

Invocations of create add entries to a table called the *ReferenceData Table*. The ReferenceData Table is persistent; that is, ReferenceData saved in it persists between server activations. Two calls to create with the same arguments do not return the same SOMDObject (per CORBA 1.1 specifications). That is, if create is called twice with the same arguments, two entries in the ReferenceData Table will be created. If a server using create wishes to avoid cluttering up the ReferenceData Table with multiple references to the same object, it must maintain a table of its own to keep track of the references it has created to avoid calling create twice with the same arguments.

The create_constant method stores the ReferenceData as part of the SOMDObject's state; that is, it does not add entries to the ReferenceData Table. The create_constant method, then, might be used by a server that does not want to have maintain a table of references nor pay the penalty of cluttering up the ReferenceData Table with multiple entries.

*Mapping object references to objects*

The somdSOMObjFromRef method maps SOMDObjects to SOMObjects. This method is invoked by SOMOA on the server object, for each object reference found as a parameter in a request. The somdSOMObjFromRef call returns a SOMObject pointer, which can be used in building the argument list for the method call.

*Dispatching a method*

After SOMOA (with the help of the local server object) has resolved all the SOMDObjects present in a request, it is ready to invoke the specified method on the target. Rather than invoking somDispatch *directly* on the target, it calls the somdDispatchMethod method on the server object. The parameters to somdDispatchMethod are the same as the parameters for SOMObject::somDispatch (see the *SOMobjects Developer Toolkit: Programmers Reference Manual* for a complete description).

The default implementation for somdDispatchMethod in SOMDServer simply invokes SOMObject::somDispatch on the specified target object with the supplied arguments. The reason for this indirection through the server object is to give the server object a chance to intercept method calls coming into the server process, if desired.

Example: Writing a persistent object server

This section shows an example of how to provide a server class implementation for persistent SOM objects, which uses the Persistence Framework. (See Chapter 8 for detailed information on this framework). All of the persistent object management is contained in the server class; this class can be used with the DSOM "generic" server program, somdsvr.

The following example describes a user-supplied server class "SOMPServer" that is derived from SOMDServer. The "SOMPServer" class introduces six new methods:

getPStorageMgr
isPObj
assignRefDataToPObj
deletePObj
getRefDataFromPObj and
activatePObjFromRefData and overrides four SOMDServer methods:

somdCreateObj
somdDeleteObj
somdRefFromSOMObj and
somdSOMObjFromRef.

The example shows how a server class might use and manage ReferenceData in object references to find and activate persistent objects.

The IDL specification for "SOMPServer" follows:

```
interface SOMPServer : SOMDServer {
    SOMObject getPStorageMgr(in SOMObject pobj);
    boolean isPObj (in SOMObject obj);
    void assignRefDataToPObj(in SOMObject pobj);
    void deletePObj(in SOMObject pobj);
    ReferenceData getRefDataFromPObj(in SOMObject pobj);
    SOMObject activatePObjFromRefData(in ReferenceData rd);
#ifdef __SOMIDL__
    implementation {
        somdCreateObj     : override;
        somdDeleteObj     : override;
        somdRefFromSOMObj : override;
        somdSOMObjFromRef : override;
    };
#endif
};
```

Note: The code presented in this subsection has been extracted from a sample application shipped with DSOM. Many of the actual Persistence Framework calls are not shown here, and error checks present in the sample application have been removed here to improve readability.

The following procedure implements the "getPStorageMgr" method by simply creating a SOMobjects Persistent Storage Manager in the server and returning a proxy for it to the client.

```
SOM_Scope SOMObject SOMLINK
              getPStorageMgr(SOMPServer somSelf,Environment *ev) {
    return(SOMPPersistentStorageMgrNew());
}
```

The "isPObj" method returns TRUE if the object passed to it is a persistent object. It is implemented as follows:

```
SOM_Scope boolean SOMLINK
isPObj(SOMPServer somSelf, Environment *ev, SOMObject obj) {
    return(obj && _somIsA(obj, SOMPPersistentObjectNewClass(0, 0));
}
```

The following two procedures override SOMDServer's implementations of somdCreateObj and somdDeleteObj.

```
SOM_Scope SOMObject SOMLINK
              somdCreateObj(SOMPServer somSelf, Environment *ev,
              Identifier objclass, string hints)
{
    /* create the object as usual */
    SOMObject obj =
        parent_somdCreateObj(somSelf, ev, objclass, hints);
    /* if obj is persistent, assign Ref Data to it */
    if (_isPObj(somSelf, ev, obj))) {
        _assignRefDataToPObj(somSelf, ev, obj)
    }
    return(obj);
}
```

The implementation of somdCreateObj is straightforward. It first creates the object as usual by employing SOMDServer's (SOMPServer's parent) implementation. If the newly created object is persistent, the SOMobjects Persistence Framework is asked to assign it a persistent ID (PID). The job of "assignRefDataToPObj" is to associate with the object a piece of data (in this case, a PID) that (1) identifies the object, (2) is retrievable from the object, and (3) can be coerced into ReferenceData so that it can be used to create a SOMDObject (an object reference). Note that "assignRefDataToPObj" could be overridden to use other persistence mechanisms.

```
SOM_Scope void SOMLINK
     somdDeleteObj(SOMPServer somSelf, Environment *ev, SOMObject obj)
{
    /* is obj persistent, have the persistence framework delete it */
    if (_isPObj(somSelf, ev, obj)) {
        _deletePObj(somSelf, ev, obj);
    } else /* obj is not persistent, so delete as usual */
        parent_somdDeleteObj(somSelf, ev, obj);
}
```

The somdDeleteObj implementation, when the object to be deleted is persistent, asks the Persistence Framework, via "deletePObj", to delete the object. When the object is not persistent, the SOMDServer implementation of somdDeleteObj deletes the object.

The following two procedures override SOMDServer's implementations of the methods somdRefFromSOMObj and somdSOMObjFromRef:

```
SOM_Scope SOMDObject SOMLINK
           somdRefFromSOMObj(SOMPServer somSelf, Environment *ev,
           SOMObject obj)
{
  SOMDObject objref;

/* is obj persistent */
  if (_isPObj(somSelf, ev, obj {
    /* Create an object reference based on persistent ID. */
    ReferenceData rd = _getRefDataFromPObj(somSelf, ev, obj);
    InterfaceDef intf =
        _lookup_id(SOM_InterfaceRepository,ev,somGetClassName(obj));
    objref = _create_constant(SOMD_SOMOAObject, ev, &rd, intf,
                              SOMD_ImplDefObject);
    _somFree(intf);
    SOMFree(rd._buffer);
  } else /* obj is not persistent, so get Ref in usual way */
    objref = parent_somdRefFromSOMObj(somSelf, ev, obj);
  return(objref);
}
```

Method somdRefFromSOMObj is responsible for producing a SOMDObject (the "Ref" in somdRefFromSOMObj) from a SOMObject. As mentioned earlier, SOMOA exports two methods for creating SOMDObjects: create and create_constant. This implementation uses create_constant because it does not want to store the ReferenceData in the ReferenceData Table. If it did use create and store the ReferenceData in the persistent table, the server object would either (1) have to keep a persistent table that maps SOMObjects to SOMDObjects so that it didn't call create twice with the same arguments (recall that create always returns a new SOMDObject even when called twice with the same arguments), or (2) fill up the ReferenceData table with SOMDObjects that contain the same ReferenceData.

The prerequisites for asking SOMOA to create a SOMDObject are (1) some ReferenceData to be associated with the SOMDObject, (2) an InterfaceDef that describes the interface of the object, and (3) an ImplementationDef that describes the object's implementation. The InterfaceDef is retrieved from the SOM Interface Repository using the object's class name as key. The ImplementationDef is held in the variable SOMD_ImplDefObject that is set when the server process is initialized. The "SOMPServer" method "getRefDataFromPObj" is used to retrieve the PID from the object and coerce it into ReferenceData. With these three arguments, SOMOA's create_constant is called to create the SOMDObject.

```
SOM_Scope SOMObject SOMLINK
            somdSOMObjFromRef(SOMPServer somSelf, Environment *ev,
            SOMDObject objref)
{   SOMObject obj;

/* test if objref is mine */
    if (_is_constant(objref, ev)) {
        /* objref was mine, activate persistent object myself */
        ReferenceData rd = _get_id(SOMD_SOMOAobject, ev, objref);
        obj = _activatePObjFromRefData(somSelf, ev, &rd);
        SOMFree(rd._buffer);
    } else
        /* its not one of mine, let parent activate object */
        obj = parent_somdSOMObjFromRef(somSelf, ev, objref);
    return obj;
}
```

This implementation of somdSOMObjFromRef is a little different from the others in that the server object must determine whether the SOMDObject is one that it created (i.e., one that represents a persistent object), or is just a SOMDObject that was created by the SOMDServer code (its parent). It does this by asking the SOMDObject if it is a "constant" object reference (that is, one created by create_constant). If the SOMDObject says that it is a "constant", then the "SOMPServer" may safely assume that the SOMDObject represents a persistent object that it created. If the SOMDObject is determined to represent a persistent object, then its ReferenceData is used to locate/activate the object it represents (via the method "activatePObjFromRefData"). The "SOMPServer" implementation of method "activatePObjFromRefData" converts the ReferenceData to a PID and uses the Persistence Framework to locate (and activate, if necessary) the persistent object.

Identifying the source of a request

CORBA 1.1 specifies that a Basic Object Adapter should provide a facility for identifying the *principal* (or user) on whose behalf a request is being performed. The get_principal method, defined by BOA and implemented by SOMOA, returns a Principal object, which identifies the caller of a particular method. From this information, an application can perform access control checking.

In CORBA 1.1, the interface to Principal is not defined, and is left up to the ORB implementation. In the current release of DSOM, a Principal object is defined to have two attributes:

userName (string)

— Identifies the name of the user who invoked a request.

hostName (string)

— Identifies the name of the host from which the request originated.

Currently, the value of the userName attribute is obtained from the USER environment variable in the calling process. Likewise, the hostName attribute is obtained from the HOSTNAME environment variable. This facility is intended to provide basic information about the source of a request, and currently, is *not* based on any specific authentication (i.e., "login") scheme. More rigorous authentication and security mechanisms will be considered for future DSOM implementations.

The IDL prototype for the get_principal method, defined on BOA (SOMOA) is as follows:

```
Principal  get_principal (in SOMDObject obj,
                          in Environment *req_ev);
```

This call will typically be made either by the target object or by the server object, when a method call is received. The get_principal method uses the Environment structure associated with the request, and an object reference for the target object, to produce a Principal object that defines the request initiator.

> Note: CORBA 1.1 defines a "tk_Principal" TypeCode which is used to identify the type of Principal object arguments in requests, in case special handling is needed when building the request. Currently, DSOM does not provide any special handling of objects of type "tk_Principal"; they are treated like any other object.

Compiling and linking servers

The server program must include the "somd.h" header file. Server programs must link to the SOMobjects Toolkit library: "libsomtk.a" on AIX, and "somtk.lib" on OS/2.

5 Implementing Classes

DSOM has been designed to work with a wide range of object implementations, including SOM class libraries as well as non-SOM object implementations. This section describes the necessary steps in using SOM classes or non-SOM object implementations with DSOM.

Using SOM class libraries

It is quite easy to use SOM classes in multi-process DSOM-based applications as exemplified by the sample DSOM application presented in section 2, "A Simple DSOM Example". In fact, in many cases, existing SOM class libraries may be used in DSOM applications *without* requiring any special coding or recoding for distribution. This is possible through the use of DSOM's *generic server program*, which uses SOM and the *SOM Object Adapter* (SOMOA) to load SOM class libraries on demand, whenever an object of a particular class is created or activated.

The topic "Registering servers and classes" in section 4 "Basic Server Programming" discusses how to register a server implementation consisting of a DSOM generic server process and one or more SOM class libraries.

*Role of DSOM generic server program*

The generic server program provides basic server functionality: it continuously receives and executes requests (via an invocation of the SOMOA's execute_request_loop method), until the server is stopped. Some requests result in the creation of SOM objects; the generic server program will find and load the DLL for the object's class automatically, if it has not already been loaded.

When generic server program functionality is not sufficient for the particular application, application-specific server programs can be developed. For example, some applications may want to interact with a user or I/O device between requests. The previous section, entitled "Basic Server Programming," discussed the steps involved in writing a server program.

*Role of SOM Object Adapter*

The SOM Object Adapter is DSOM's standard object adapter. It provides basic support for receiving and dispatching requests on objects. As an added feature, the SOMOA and the server process's server object collaborate to automate the task of converting SOM object pointers into DSOM object references, and vice versa. That is, whenever an object pointer is passed as an argument to a method, the SOMOA and the server object convert the pointer to a DSOM object reference (since a pointer to an object is meaningless outside the object's address space).

*Role of SOMDServer*

The server process's server object (whose default class is SOMDServer) is responsible for creating/destroying objects on the server via somdCreateObj, somdGetClassObj, and somdDeleteObj, for mapping between object references (SOMDObjects) and SOMObjects via somdRefFromSOMObj and somdSOMObjFromRef, and for dispatching remote requests to server process objects via somdDispatchMethod. These last three methods are invoked on the server object by the SOMOA when objects are to be returned to clients, when incoming requests contain object references, and when the method is ready to be dispatched, respectively. By partitioning out these mapping and dispatching functions into the server object, the application can more easily customize them, without having to build object adapter subclasses.

SOMDServer can be subclassed by applications that want to manage object location, object activation, and method dispatching. An example of such an application (that works with the Persistence Framework) is shown in section 4, "Basic Server Programming."

These features of SOMOA and SOMDServer make it possible to take existing SOM classes, which have been written for a single-address space environment, and use them unchanged in a DSOM application. More information on the SOMOA and server objects can be found in the "Basic Server Programming" section.

*Implementation constraints*

The generic server program (somdsvr), the SOMOA, and the SOMDServer make it easy to use SOM classes with DSOM. However, if there are any parts of the class implementation that were written expecting a single-process environment, the class may have to be modified to behave properly in a client-server environment. Some common implementation practices to *avoid* are listed below:

- Printing to standard output. Any text printed by a method will appear at the server, as opposed to the client. In fact, the server may not be attached to a text display device or window, so the text may be lost completely. It is preferred that any textual output generated by a method be returned as an output string.

Note: Passing textual output between the client program and the called method via an "inout string" parameter is *strongly* discouraged. As discussed in the CORBA 1.1 specification (page 94), the size of the output string is constrained by the size of the input string. If there was no input string value, the size of the output string would be constrained to 0 bytes. Instead, it is preferred that textual data be returned either as an output string (DSOM provides the storage), or by passing a character array buffer (client provides the storage).

- Creating and deleting objects. Methods that create or delete objects may have to be modified if the created objects are intended to be remote. The calls to create local objects are different than the calls to create remote objects.

- Using pointers to client-allocated memory in instance variables. Consider the following example: A class has a method that accepts a pointer to a data value created by the client (e.g., a string or a struct), and simply stores the pointer in an instance variable or attribute. However, in DSOM, the called method is passed a pointer to a *copy* of the value (in the request message body), but the copy is freed at the end of the request. If the data value is meant to persist between requests, the object is responsible for making its own copy of it. (The implementation of the "_set_printerName" method in the topic "Wrapping a printer API" later in this section is an example of a method performing such a copy.)

In addition to those coding practices which simply do not "port" to a distributed environment, there are a few other restrictions that are imposed by DSOM's (current) implementation.

- Using structures with embedded pointers as method arguments. When DSOM makes a copy of a struct value used as an argument to a method call, it simply copies the values of the structure fields. For structure fields that are pointers, it copies the pointer value, but it does not dereference the pointer (and copy that value). The only exception is that DSOM *does* convert pointers to SOM objects or DSOM object proxies into an encoding for object references.

- Packing of structures used as method arguments. If a compiler option is used to pack or optimize storage of structs (including reordering of struct members) or unions, it is important to indicate the exact alignment of the structures using *alignment modifiers* expressed in the implementation section of the IDL file. This information must then be updated in the Interface Repository. See the topic "Providing 'alignment' information" in Chapter 7, "The Interface Repository Framework."

Some applications may need to associate specific identification information with an object,to support application-specific object location or activation. In that case, an application server should create object references explicitly, using the create or create_constant method in SOMOA. A logical place to put these calls is in a subclass of SOMDServer, as it is the server object that is responsible for producing/activating objects from object references.

Using other object implementations

As an Object Request Broker, DSOM must support a wide range of object implementations, including non-SOM implementations. For example, in a print spooler application, the implementation of a print queue object may be provided by the operating system, where the methods on the print queue are executable programs or system commands. As another example, consider an application that uses a large, existing class library that is not implemented using SOM. Finally, consider a class library where persistence is implemented by something other than the Persistence Framework.

In each of these examples, the application must *participate* in object identification, activation, initialization, and request dispatching. Each server supplies a server object (derived from SOMDServer) that works in conjunction with the SOMOA for this purpose.

Wrapping a printer API

Presented below is a simple example showing how an existing API could be "wrapped" as SOM objects. The API is admittedly trivial, but it is hoped that readers understand this simple example well enough to create more sophisticated applications of their own.

The "API" wrapped in this example is comprised of two OS/2 system calls. The first one asks for a file to be printed on a specific printer:

```
print /D:<printerName> <filename>
```

The second one asks for the file currently being printed on device *<printerName>* to be cancelled.

```
print /D:<printerName> /C
```

Two IDL interfaces are declared in the module "PrinterModule": "Printer" and "PrinterServer". The "Printer" interface wraps the two system calls. The "PrinterServer" interface describes a subclass of SOMDServer. "PrinterModule::PrinterServer" will be the class of the server object in the print-server application.

```
include <somdserv.idl> module PrinterModule {
  interface Printer : SOMObject {
    attribute string printerName;
    void print(in string fname);
    void cancel();
    #ifdef __SOMIDL__
    implementation {
      printerName: noset;
      };
    #endif
  };

interface PrinterServer : SOMDServer {
    #ifdef __SOMIDL__
    implementation {
      somdCreateObj: override;
      somdRefFromSOMObj: override;
      somdSOMObjFromRef: override;
      };
    #endif
  };

};
```

Note that the "Printer" interface defines one attribute, "printerName", that will be used to identify the printer. It will be set when a "Printer" is created. Printer's two operations, "print" and "cancel", correspond to the two system commands the interface is encapsulating. The "PrinterServer" interface does not introduce any new attributes or operations. It does specify that three of SOMDServer's methods will have their implementations overridden. The three method procedures below show how the "Printer" interface is implemented for the "_set_printerName", "print", and "cancel" methods.

```
SOM_Scope void  SOMLINK PrinterModule_Printer_set_printerName(
  PrinterModule_Printer somSelf, Environment *ev, string printerName)
{
    PrinterModule_PrinterData *somThis =
       PrinterModule_PrinterGetData(somSelf);

if (_printerName) SOMFree(_printerName);
    _printerName = (string)SOMMalloc(strlen(printerName) + 1);
    strcpy(_printerName, printerName);
}

SOM_Scope void  SOMLINK PrinterModule_Printerprint(
  PrinterModule_Printer somSelf, Environment *ev, string fname)
{
    long rc;
    PrinterModule_PrinterData *somThis =
       PrinterModule_PrinterGetData(somSelf);
    string printCommand = (string)
       SOMMalloc(strlen(_printerName) + strlen(fname) + 10 + 1);

sprintf(printCommand,"print /D:%s %s",_printerName,fname);
    rc = system(printCommand);
    if (rc) raiseException(ev,rc);
}

SOM_Scope void  SOMLINK PrinterModule_Printercancel(
  PrinterModule_Printer somSelf, Environment *ev)
{
    long rc;
    PrinterModule_PrinterData *somThis =
       PrinterModule_PrinterGetData(somSelf);
    string printCommand =
       (string) SOMMalloc(strlen(_printerName) + 12 + 1);

sprintf(printCommand,"print /D:%s /C",_printerName);
    rc = system(printCommand);
    if (rc) raiseExeception(ev,rc);
}
```

Note: The implementation of the "raiseException" procedure shown in the example above must be provided by the application. However, it is not shown in this example.

The three method procedures that implement the "PrinterServer" interface's three overridden methods of SOMDServer are very similar to the method procedures of the "SOMPServer" server-object class presented in the previous section ( 4), and therefore have not been shown.

Building and registering class libraries

The generic server uses SOM's run-time facilities to load class libraries dynamically. Thus, *dynamically linked libraries* (DLLs) should be created for the classes, just as they would be for non-distributed SOM-based applications.

During the development of the DLL, it is important to remember the following steps:

- Export a routine called SOMInitModule in the DLL, which will be called by SOM to initialize the class objects implemented in that library. SOMInitModule should contain a *<className>*NewClass call for each class in the DLL.

- For each class in the DLL, specify the DLL name in the class's IDL file. The DLL name is specified using the dllname=*<name>* modifier in the *implementation statement* of the interface definition. If not specified, the DLL filename is assumed to be the same as the class name.

- For each class in the DLL, compile the IDL description of the class into the Interface Repository. This is accomplished by invoking the following command syntax:

```
  sc -sir -u stack.idl
  ```

Note: If the classes are not compiled into the Interface Repository, DSOM will generate a run-time error (30056: SOMDERROR_BadDescriptor) when an attempt is made to lookup the signature of a method in the class (for example, on a method call).

- Put the DLL in one of the directories listed in LIBPATH. (This is necessary for both OS/2 and AIX.)

- On OS/2, if the DLL uses the C run time, export a routine called "_DLL_InitTerm" that invokes the C Set/2 run time initialization function, "_CRT_Init." The _DLL_InitTerm function is invoked automatically when the DLL is loaded.

An example _DLL_InitTerm function is included in the DSOM sample code shipped with the SOMobjects Developer Toolkit for OS/2, in the file "initterm.c".

6 Configuring DSOM Applications

Preparing the environment

Some environment variables must be defined before running DSOM. Unless noted, these environment variables are required in both the AIX and OS/2 environments.

HOSTNAME=\<name\> — Each machine that is running DSOM must have its HOSTNAME variable set.

USER=\<name\> — USER specifies the name of the DSOM user running a client program.

SOMIR=\<file(s)\> — SOMIR specifies a list of files (separated by a colon on AIX and a semicolon on OS/2) which together make up the Interface Repository.

Note: For DSOM, it is preferable to use *full* pathnames in the list of IR files, since the IR will be shared by several programs that may not all be started in the same directory.

SOMSOCKETS=\<name\> — SOMSOCKETS specifies the name of the SOM Sockets subclass that implements the sockets services.

Note: For Workstation DSOM, this variable is effectively ignored. (However, it may be used by other frameworks.)

SOMDDIR=\<directory\> — SOMDDIR specifies the directory where various DSOM files should be located, including the Implementation Repository files. See the section in this chapter entitled "Implementation Repository" for more information.

Note: If this value is not set, DSOM will attempt to use a default directory: $SOMBASE/etc/dsom on AIX, and %SOMBASE%\ETC\DSOM on OS/2.

SOMDPORT=\<integer\> — In DSOM, servers, clients and DSOM daemons communicate with each other using a "sockets" abstraction. In particular, DSOM clients establish connections to DSOM servers by communicating with the DSOM daemon, somdd, running on each server machine. The daemon is designed to listen for client requests on a well-known port.

Normally, somdd will look in the /etc/services (for AIX) or %ETC%\SERVICES (for OS/2) file for its well-known port number. However, if the user has set the SOMDPORT environment variable, the value of SOMDPORT will be used and the "services" file will not be consulted. The user should pick a 16-bit integer that is not likely to be in use by another application (check the "services" file for ports reserved for use on your machine). Typically, values below 1024 are reserved and should *not* be used.

Note: If there is no "services" file and the SOMDPORT environment variable is not set, DSOM will use a default port number (currently 9393).

Note: The *same* well-known port number must be used on *all* machines in a workgroup in order for an application to establish connections successfully.

| | |
|---|---|
| SOMDTIMEOUT=<integer> | — SOMDTIMEOUT specifies how long a receiver should wait for a message, or how long a sender should wait for an acknowledgement. The value should be expressed in seconds. The default value is 600 seconds (10 minutes). |
| SOMDDEBUG=<integer> | — SOMDDEBUG may optionally be set to enable DSOM run-time error messages. If set to 0, error reporting is disabled. If set to 1, error reporting is enabled. Error reports may be directed to the file named by SOMDMESSAGELOG, if set. |
| SOMDTRACELEVEL=<integer> | — SOMDTRACELEVEL may optionally be set to enable DSOM run-time trace messages. If set to 0, tracing is disabled. If set to 1, tracing is enabled. Trace output may be directed to the file named by SOMDMESSAGELOG, if set. |
| SOMDMESSAGELOG=<file> | — SOMDMESSAGELOG may optionally be set to the name of a file where DSOM run-time error messages are recorded. If not set, error messages will be reported on the standard output device. |
| MALLOCTYPE=3.1 | — This is just for AIX. It tells the malloc/free routines in the AIX standard C library to use the memory management algorithms from AIX Version 3.1, versus the new algorithms used in Version 3.2. Apparently the new algorithms sometimes cause problems, so this environment variable was provided. |
| | DSOM occasionally experiences problems with malloc/free on AIX 3.2. Setting MALLOCTYPE=3.1 usually fixes the problem. |

Registering class interfaces

DSOM relies heavily on the Interface Repository for information on method *signatures* (that is, a description of the method's parameters and return value). It is important to compile the IDL for all application classes into the IR before running the application.

For each class in the DLL, compile the IDL description of the class into the Interface Repository. This is accomplished by invoking the following command syntax:

```
sc -sir -u stack.idl
```

If the default SOM IR (supplied with the SOMobjects Toolkit and Runtimes) is not used by the application, the user's IR must include the interface definitions for:

- the appropriate Sockets class,
- the server class (derived from SOMDServer), and
- the definitions of the standard DSOM exceptions (found in file "stexcep.idl") that may be returned by a method call.

Registering servers and classes

*Implementation definitions*

The Implementation Repository holds ImplementationDef objects. The ImplementationDef class defines attributes necessary for the SOMOA to find and activate the implementation of an object. Details of the ImplementationDef object are not currently defined in the CORBA 1.1 specification; the attributes that have been defined are required by DSOM.

Listed below is each available attribute, with its corresponding type in parentheses, followed by a description of its purpose:

impl_id (string)

— Contains the DSOM-generated identifier for a server implementation.

impl_alias (string)

— Contains the "alias" (user-friendly name) for a server implementation.

impl_program (string)

— Contains the name of the program or command file which will be executed when a process for this server is started automatically by somdd. If the full pathname is not specified, the directories specified in the PATH environment variable will be searched for the named program or command file.

— Optionally, the server program can be run under control of a "shell" or debugger, by specifying the shell or debugger name first, followed by the name of the server program. (A space separates the two program names.) For example,

```
dbx myprogram
``` will start the program "myprogram" under control of "dbx".

— Servers that are started automatically by somdd will always be passed their impl_id as the first parameter, in order to retrieve their ImplementationDef (if desired).

impl_flags (Flags)

— Contains a bit-vector of flags used to identify server options (for example, the IMPLDEF_MULTI_THREAD flag indicates multi-threading).

impl_server_class (string)

— Contains the name of the SOMDServer class or subclass created by the server process.

impl_refdata_file (string)

— Contains the full pathname of the file used to store ReferenceData for the server.

impl_refdata_bkup (string)

— Contains the full pathname of the backup mirror file used to store ReferenceData for the server. This file can be used to restore a copy of the primary file in case it becomes corrupted. (It would be a good idea to keep the primary and backup files in different disk volumes.)

impl_hostname (string)

— Contains the hostname of the machine where the server is located.

The 'regimpl' registration utility

Before an implementation (a server program and class libraries) can be used by client applications, it must be registered with DSOM by running the implementation registration utility, regimpl. During execution of regimpl, DSOM updates its database to include the new server implementation and the associated classes. This enables DSOM to find and, if necessary, to activate the server so that clients can invoke methods on it.

Typically, DSOM users employ the generic SOM-object server program, described below. A discussion on how to write a specific (non-generic) server program is found in the earlier section, "Basic Server Programming."

*Registration steps*

Registering a server implementation and its classes requires the steps described in the following paragraphs.

First, make sure the SOMDDIR environment variable is defined to the name of the Implementation Repository directory, as discussed in the section "Preparing the Environment."

Then, to run the regimpl utility, at the system prompt enter:

```
> regimpl
```

This brings up the DSOM Implementation Registration Utility menu, shown below. To begin registering the new implementation, select "1.Add" from the IMPLEMENTATION OPERATIONS section — that is, at the "Enter operation:" prompt, enter "1" (as shown in bold):

```
DSOM IMPLEMENTATION REGISTRATION UTILITY
(C) Copyright IBM Corp. 1992,1993.  All rights reserved.

Implementation data being loaded from: /u/xyz/dsomRepos/

[ IMPLEMENTATION OPERATIONS ]
  1.Add   2.Delete   3.Change
  4.Show one  5.Show all  6.List aliases
[ CLASS OPERATIONS ]
  7.Add   8.Delete   9.Delete from all   10.List classes
[ SAVE & EXIT OPERATIONS ]
  11.Save data   12.Exit
Enter operation: 1
```

The regimpl utility then issues several prompts for information about the server implementation (typical responses are shown in bold as an example).

*Implementation alias.* Enter a "shorthand" name for conveniently referencing the registered server implementation while using regimpl:

```
Enter an alias for new implementation:  myServer
```

*Program name.* Enter the name of the program that will execute as the server. This may be the name of one of the DSOM generic servers (discussed under the following topic, "Using Generic SOM-Object Servers") or a user-defined name for one of these servers. Note: The if the program is located in PATH only the program name needs to be specified. Otherwise the pathname must be specified.

```
Enter server program name:(default: somdsvr)   <return>
```

*Multi-threading.* Specify whether or not the server expects the SOM Object Adapter (SOMOA) to run each method in a separate thread or not. Notes: This option is only meaningful on OS/2. It is the responsibility of the class implementor to ensure that the methods being executed by the server are "thread safe".

```
Allow multiple threads in the server? [y/n]  (default: no) : no
```

*Server class.* Enter the name of the SOMDServer class or subclass that will manage the objects in the server.

```
Enter server class (default: SOMDServer) : <return>
```

*Reference data file name.* Enter the full pathname of the file used to store ReferenceData associated with object references created by this server. Note: A file name is required *only* if the server is using the create method to generate object references.

```
Enter object reference file name (optional) :   <return>
```

*Backup reference data file name*. Enter the full pathname of the backup file used to mirror the primary ReferenceData file for this server. Note: a file name is required *only* if (1) a primary reference data file has been specified, and (2) the application desires an online backup to be maintained. This file can be used to restore a copy of the primary file should it become corrupted.

```
Enter object reference backup file name (optional) : <return>
```

*Host machine name*. This is the name of the machine on which the server program code is stored. The same name should be indicated in the HOSTNAME environment variable. (If "localhost" is entered, the contents of the HOSTNAME environment variable will be used.

```
Enter host machine name:(default: localhost)  <return>
```

The regimpl system next displays a summary of the information defined thus far, and asks for confirmation before adding it. Enter "y" to save the implementation information in the Implementation Repository.

```
================================================================
Implementation id.........: 2befc82b-13a11e00-7f-00-10005ac9272a
Implementation alias......: myServer
Program name..............: somdsvr
Multithreaded.............: No
Server class..............: SOMDServer
Object reference file.....:
Object reference backup...:
Host Name.................: localhost The above implementation is about to be added. Add? [y/n]  Y Implementation 'myServer' successfully added
```

*Add class*. Once the server implementation is added, the complete menu reappears. The next series of prompts and entries will identify the classes associated with this server. To begin, from the CLASS OPERATIONS section, select "7.Add":

```
[ IMPLEMENTATION OPERATIONS ]
  1.Add   2.Delete   3.Change
  4.Show one   5.Show all   6.List aliases
[ CLASS OPERATIONS ]
  7.Add   8.Delete   9.Delete from all   10.List classes
[ SAVE & EXIT OPERATIONS ]
  11.Save data   12.Exit Enter operation: 7
```

*Class name*. Enter the name of a class associated with the implementation alias.

```
Enter name of class:  class1
```

*Implementation alias*. Enter the alias for the server that implements the new class (this should be the same alias as given above).

```
Enter alias of implementation that implements class:  myServer

Class 'class1' successfully associated with implementation 'myServer'
```

The top-level menu will then reappear. Repeat the previous three steps until all classes have been associated with the server.

Then, from the SAVE & EXIT OPERATIONS section, select "11.Save data" to complete the registration. Finally, select "12.Exit" to exit the regimpl utility.

```
[ IMPLEMENTATION OPERATIONS ]
  1.Add   2.Delete   3.Change
  4.Show one   5.Show all   6.List aliases
[ CLASS OPERATIONS ]
  7.Add   8.Delete   9.Delete from all   10.List classes
[ SAVE & EXIT OPERATIONS ]
  11.Save data   12.Exit Enter operation:  11

Enter operation:  12
```

*Command line interface to 'regimpl'*

The regimpl utility also has a command line interface. The command flags correspond to the interactive commands described above. The syntax of the regimpl commands follows:

To enter interactive mode:

regimpl

To add an implementation:

regimpl -A -i <str> [-p <str>] [-v <str>] [-f <str>] [-b <str>]
                       [-h <str>] [-m {on|off}]

To update an implementation:

regimpl -U -i <str> [-p <str>] [-v <str>] [-f <str>] [-b <str>]
                       [-h <str>] [-m {on|off}]

To delete one or more implementations:

regimpl -D -i <str> [-i ...]

To list all, or selected, implementations:

regimpl -L [-i <str> [-i ...]]

To list all implementation aliases:

regimpl -S

To add class associations to one or more implementations:

regimpl -a -c <str> [-c ...] -i <str> [-i ...]

To delete class associations from all, or selected, implementations:

regimpl -d -c <str> [-c ...] [-i <str> [-i ...]]

To list classes associated with all, or selected, implementation:

regimpl -l [-i <str> [-i ...]]

The following parameters are used in the commands described above:

```
-i <str>      = Implementation alias name
-p <str>      = Server program name   (default: somdsvr)
-v <str>      = Server-class name   (default: SOMDServer)
-f <str>      = Reference data file name   (optional)
-b <str>      = Reference data backup file name   (optional)
-h <str>      = Host machine name   (default: localhost)
-m {on|off}   = Enable multi-threaded server   (optional)
-c <str>      = Class name
```

*Programmatic interface to the Implementation Repository*

The Implementation Repository can be accessed and updated dynamically using the programmatic interface provided by the ImplRepository class (defined in "implrep.idl"). The global variable SOMD_ImplRepObject is initialized by SOMD_Init to point to the ImplRepository object. The following methods are defined on it:

```
void   add_impldef (in ImplementationDef impldef);
```
— Adds an implementation definition to the Implementation Repository. (Note: The value of the "impl_id" attribute is ignored. A unique ImplId will be generated for the newly added ImplementationDef.)

```
void   delete_impldef (in ImplementationDef impldef);
```
— Deletes an implementation definition from the Implementation Repository.

```
void   update_impldef (in ImplementationDef impldef);
```
— Updates the implementation definition (defined by the "impl_id" of the supplied ImplementationDef) in the Implementation Repository.

```
ImplementationDef   find_impldef (in ImplId implid);
```
— Returns a server implementation definition given its ID.

```
ImplementationDef   find_impldef_by_alias (in string alias_name);
```
— Returns a server implementation definition, given its user-friendly alias.

```
sequence<ImplementationDef>  find_impldef_by_class (
                                           in string classname);
```
— Returns a sequence of ImplementationDefs for those servers that have an association with the specified class. Typically, a server is associated with the classes it knows how to implement, by registering its known classes via the add_class_to_impldef method.

The following methods maintain an association between server implementations and the names of the classes they implement. These methods effectively maintain a mapping of <className, Implid>.

```
void   add_class_to_impldef (in ImplId implid,
                             in string classname);
```
— Associates a class, identified by name, with a server, identified by its ImplId. This type of association is used to lookup server implementations via the find_impldef_by_class method.

```
void   remove_class_from_impldef (
                       in ImplId implid,
                       in string classname);
```
— Removes the association of a particular class with a server.

```
sequence<string>  find_impldef_classes (in ImplId implid);
```
— Returns a sequence of class names associated with a server.

With the ImplRepository programmatic interface, it is possible for an application to define additional server implementations at run time.

*Moving servers*

In DSOM, it is possible to move a server from one machine to another, for purposes of system maintenance, system load balancing, and so on.

To move a server:

- The server implementation (program and DLLs) must be moved to the new machine;
- The server's reference data file (if any), and backup file (if any), must be moved to the new machine;
- Any data files associated with the server must be moved to the new machine;
- The server implementation definition must be updated in the Implementation Repository, to indicate the new hostname, program name (if changed), and reference data file names (if changed).

To accomplish the last step, the regimpl utility can be run to update the information associated with the server implementation.

Note: It is important to *update* the server information, versus create a new implementation definition. Any clients of the server's objects have object references that refer to the ID of that server. If a new implementation definition is created with a new implementation id, the existing object references would be rendered invalid.

7 Running DSOM Applications

Prior to starting the DSOM processes, the DSOM executables should be installed and the DSOM environment variables should be set appropriately, as discussed in the earlier section, "Configuring DSOM."

A copy of the Implementation Repository files should be made available on all machines that run clients or servers. The path of the Implementation Repository should be set in the SOMDDIR environment variable.

Running the DSOM daemon (somdd)

To run a DSOM application, the DSOM daemon, somdd, must be started on each (server) machine. (Client machines do not require an active DSOM daemon.) The daemon can be started manually from the command line, or could be started automatically from a start-up script run at boot time. It may be run in the background with the commands somdd& on AIX, and start somdd on OS/2. (The somdd program takes no parameters.)

The somdd daemon is responsible for "binding" a client process to a server process and will activate the desired server if necessary. The binding procedure is such that the client will consult the Implementation Repository to find out which machine contains a desired server, and will then contact the DSOM daemon on the server's machine to retrieve the server's communications address (a port). Servers are activated dynamically as separate processes.

Running DSOM servers

Once the somdd daemon is running, application programs can be started. If the application uses the generic SOM server, somdsvr, it can be started either from the command line or automatically upon demand. When starting somdsvr from the command line, the server's implementation ID or alias must be supplied as an argument. The command syntax for starting a generic SOM server is:

somdsvr [ *impl_id* | *-a alias* ]

For example, the command

```
$   somdsvr   2ad2688fb-00389c00-7f-00-10005ac900d8
``` would start a somdsvr for an implementation with the specified ID. Likewise, the command

```
$   somdsvr   -a   myServer
``` would start a somdsvr that represents an implementation of "myServer".

8 DSOM as a CORBA-compliant Object Request Broker

The Object Management Group (OMG) consortium defines the notion of an *Object Request Broker (ORB)* that supports access to remote objects in a distributed environment. Thus, Distributed SOM is an ORB. SOM and DSOM together comply with the OMG's specification of the Common Object Request Broker Architecture (CORBA).

Since the interfaces of SOM and DSOM are largely determined by the CORBA specification, the CORBA components and interfaces are highlighted in this section.

The CORBA specification defines the components and interfaces that must be present in an ORB, including the:

- Interface Definition Language (IDL) for defining classes (discussed in Chapter 4, "Implementing Classes in SOM"),

- C usage bindings (procedure-call formats) for invoking methods on remote objects,

- Dynamic Invocation Interface and an Interface Repository, which support the construction of requests (method calls) at run time (for example, for interactive desktop applications), and

- Object Request Broker run-time programming interfaces.

SOM and DSOM were developed to comply with these specifications (with only minor extensions to take advantage of SOM services). Although the capabilities of SOM are integral to the implementation of DSOM, the application programmer need not be aware of SOM as the implementation technology for the ORB.

This section assumes some familiarity with *The Common Object Request Broker: Architecture and Specification, Revision 1.1* (also referred to as "CORBA 1.1"). The specification is published jointly by the Object Management Group and x/Open ™. The mapping of some CORBA 1.1 terms and concepts to DSOM terms and concepts is described in the remainder of this section.

Mapping OMG CORBA terminology onto DSOM

This section discusses how various CORBA concepts and terms are defined in terms of DSOM's implementation of the CORBA 1.1 standard.

Object Request Broker run-time interfaces

In the previous sections, the SOMDObjectMgr and SOMDServer classes were introduced. These are classes defined by DSOM to provide basic support in managing objects in a distributed application. These classes are built upon Object Request Broker interfaces defined by CORBA for building and dispatching requests on objects. The ORB interfaces, SOMDObjectMgr and SOMDServer, together provide the support for implementing distributed applications in DSOM.

CORBA 1.1 defines the interfaces to the ORB components in IDL. In DSOM, the ORB components are implemented as SOM classes whose interfaces are expressed using the same CORBA 1.1 IDL. Thus, an application can make calls to the DSOM run time using the SOM language bindings of its choice.

Interfaces for the following ORB run-time components are defined in CORBA 1.1, and are implemented in DSOM. They are introduced briefly here, and discussed in more detail throughout this chapter. (See the *SOMobjects Developer Toolkit: Programmers Reference Manual* for the complete interface definitions.)

| | |
|---|---|
| Object | — The Object interface defines operations on an "object reference", which is the information needed to specify an object within the ORB. |
| | In DSOM, the class SOMDObject implements the CORBA 1.1 Object interface. (The "SOMD" prefix was added to distinguish this class from SOMObject.) The subclass SOMDClientProxy extends SOMDObject with support for proxy objects. |
| ORB | — (Object Request Broker) The ORB interface defines utility routines for building requests and saving references to distributed objects. The global variable SOMD_ORBObject is initialized by SOMD_Init and provides the reference to the ORB object. |
| ImplementationDef | — An ImplementationDef object is used to describe an object's implementation. Typically, the ImplementationDef describes the program that implements an object's server, how the program is activated, and so on. |
| | (CORBA 1.1 introduces ImplementationDef as the name of the interface, but leaves the remainder of the IDL specification to the particular ORB. DSOM defines an interface for ImplementationDef.) |
| | ImplementationDef objects are stored in the *Implementation Repository* (defined in DSOM by the ImplRepository class). |
| InterfaceDef | — An InterfaceDef object is used to describe an IDL interface in a manner that can be queried and manipulated at run time when building requests dynamically, for example. |
| | InterfaceDef objects are stored in the *Interface Repository* |
| Request | — A Request object represents a specific request on an object, constructed at run–time. The Request object contains the target object reference, operation (method) name, a list of input and output arguments. A Request can be invoked synchronously (wait for the response), asynchronously (initiate the call, and later, get the response), or as a "one-way" call (no response expected). |
| NVList | — An NVList is a list of NamedValue structures, used primarily in building Request objects. A NamedValue structure consists of a name, typed value, and some flags indicating how to interpret the value, how to allocate/free the value's memory, and so on. |
| Context | — A Context object contains a list of "properties" that represent information about an application process's environment. Each Context property consists of a <name,string_value> pair, and is used by application programs or methods much like the "environment variables" commonly found in operating systems like AIX and OS/2. |

| | |
|---|---|
| Principal | — A Principal object identifies the principal ("user") on whose behalf a request is being performed. |
| | (CORBA 1.1 introduces the name of the interface, Principal, but leaves the remainder of the IDL specification to the particular ORB. DSOM defines an interface for Principal.) |
| BOA | — (Basic Object Adapter) An Object Adapter provides the primary interface between an implementation and the ORB "core". An ORB may have a number of Object Adapters, with interfaces that are appropriate for specific kinds of objects. |

IDL method interfaces can explicitly list which properties are queried by a method, and the ORB will pass those property values to a remote target object when making a request.

The Basic Object Adapter is intended to be a general-purpose Object Adapter available on all CORBA-compliant Object Request Brokers. The BOA interface provides support for generation of object references, identification of the principal making a call, activation and deactivation of objects and implementations, and method invocation on objects.

In DSOM, BOA is defined as an abstract class. The SOMOA (SOM Object Adapter) class, derived from BOA, is DSOM's primary Object Adapter implementation. The SOMOA interface extends the BOA interface with several of its own methods that are *not* defined by CORBA 1.1.

Object references and proxy objects

CORBA 1.1 defines the notion of an *object reference*, which is the information needed to specify an object in the ORB. An object is defined by its ImplementationDef, InterfaceDef, and application-specific "reference data" used to identify or describe the object. An object reference is used as a handle to a remote object in method calls. When a server wants to export a reference to an object it implements, it supplies the object's ImplementationDef, InterfaceDef, and reference data to the Object Adapter, which returns the reference.

The structure of an object reference is opaque to the application, leaving its representation up to the ORB.

In DSOM, an object reference is represented as an object that can simply be used to identify the object on that server. The DSOM class that implements simple object references is called SOMDObject (corresponding to Object in CORBA 1.1.) However, in a client's address space, DSOM represents the remote object with a *proxy object* in order to allow the client to invoke methods on the target object as if it were local. When an object reference is passed from a server to a client, DSOM *dynamically* and *automatically* creates a proxy in the client for the remote object. Proxies are specialized forms of SOMDObject; accordingly, the base proxy class in DSOM, SOMDClientProxy, is derived from SOMDObject.

In order to create a proxy object, DSOM must first build a proxy class. It does so automatically using SOM facilities for building classes at run time. The proxy class is constructed using multiple inheritance: the proxy object functionality is inherited from SOMDClientProxy, while just the *interface* of the target class is inherited. (See the illustration below.)

51

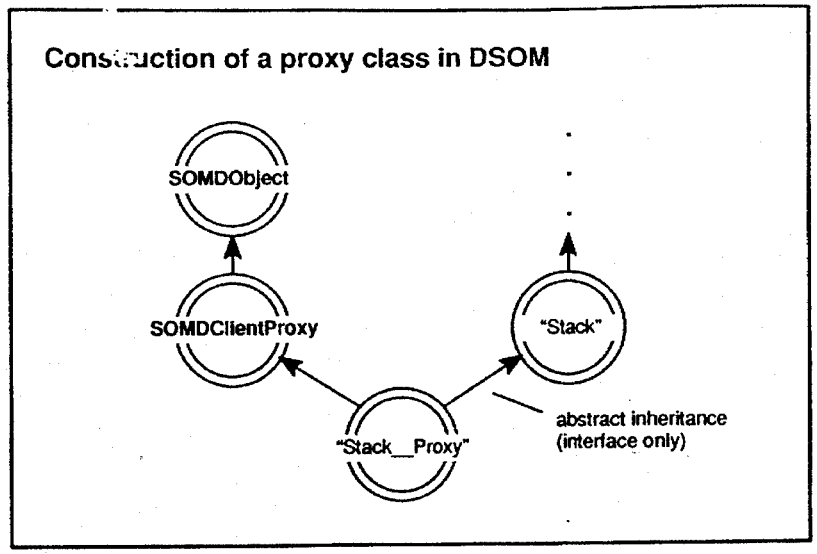

Construction of a proxy class in DSOM

In the newly derived proxy class, DSOM overrides each method inherited from the target class with a "remote dispatch" method that forwards an invocation request to the remote object. Consequently, the proxy object provides location transparency, and the client code invokes operations (methods) on the remote object using the same language bindings as if it were a local target object.

For example, recall the "Stack" class used in the tutorial example given earlier. When a server returns a reference to a remote "Stack" object to the client, DSOM builds a "Stack__Proxy" class (note two underscores in the name), derived from SOMDClientProxy and "Stack", and creates a proxy object from that class. When the client invokes the "push" method on the proxy,

```
_push(stk, ev, 100);
``` the method is redispatched using the remote-dispatch method of the SOMDClientProxy class, and the method is forwarded to the target object.

CORBA defines several special operations on object references that operate on the local references (proxies) themselves, rather than on the remote objects. These operations are defined by the classes SOMOA (SOM Object Adapter), SOMDObject (which is DSOM's implementation of CORBA's Object "pseudo-class") and ORB (Object Request Broker class). Some of these operations are listed below, expressed in terms of their IDL definitions.

SOMOA methods (inherited from BOA):

```
sequence <octet,1024> ReferenceData;
SOMDObject  create (in ReferenceData id, in InterfaceDef intf,
                    in ImplementationDef impl);
```

— Creates and returns an object reference.

SOMDObject methods:

```
SOMDObject  duplicate ( );
```
— Creates and returns a duplicate object reference.

```
void  release ( );
```
— Destroys an object reference.

```
boolean  is_nil ( );
```
— Tests to see if the object reference is NULL.

ORB methods:

```
string  object_to_string ( SOMDObject obj );
```
— Converts an object reference to a (storable) string form.

```
SOMDObject  string_to_object ( string str );
```
— Converts a string form back to the original object reference.

*Creation of remote objects*

The CORBA specification addresses only the execution of requests on remote objects. It does *not* address the creation of new remote objects. In the OMG's Object Management Architecture, creation and deletion of remote objects is considered an *object lifecycle service*, built on top of the ORB.

The OMG plans to standardize the framework and programming interfaces for the object lifecycle service, but that development is still early in the process. In the meantime, DSOM provides its own programming interfaces that allow a client application to create new objects in a remote server. These are discussed in the section entitled "Basic Client Programming."

*Interface definition language*

The CORBA specification defines an Interface Definition Language, IDL, for defining object interfaces. The SOM Compiler compiles standard IDL interface specifications, but it also allows the class implementor to include implementation information that will be used in the implementation bindings for a particular language.

Note:  Before IDL, SOM (version 1.0) had its own Object Interface Definition Language (OIDL). SOM classes specified using OIDL must be converted to IDL before they can be used with DSOM. The SOMobjects Developer Toolkit provides a migration tool for this purpose. (See Appendix B of this User's Guide.)

*C language mapping*

The CORBA specification defines the mapping of method interface definitions to C language procedure prototypes, hence SOM defines the same mapping. This mapping requires passing a reference to the target object and a reference to an implementation-specific Environment structure as the first and second parameters, respectively, in any method call.

The Environment structure is primarily used for passing error information from a method back to its caller.

*Dynamic Invocation Interface (DII)*

The CORBA specification defines a Dynamic Invocation Interface (DII) that can be used to dynamically build requests on remote objects. This interface is described in section 6 (page 105) of the CORBA 1.1 document, and is implemented in DSOM. The DSOM implementation of the DII is described later in this chapter, in the section entitled "Advanced Topics." Note that, in DSOM, somDispatch is overridden so that method invocations on proxy objects are forwarded to the remote target object. SOM applications can use the SOM somDispatch method for dynamic method calls whether the object is local or remote.

*Implementations and servers*

The CORBA specification defines the term *implementation* as the code that implements an object. The implementation usually consists of a program and class libraries.

*Servers* are processes that execute object implementations. CORBA 1.1 defines four activation policies for server implementations: shared, unshared, server-per-method, and persistent, as follows.

- A *shared* server implements multiple objects (of arbitrary classes) at the same time, and allows multiple methods to be invoked at the same time.

- An *unshared* server, conversely, implements only a single object, and handles one request at a time.

- The *server-per-method* policy requires a separate process to be created for each request on an object and, usually, a separate program implements each method.

Under the shared, unshared, and server-per-method activation policies, servers are activated automatically (on demand).

- A *persistent* server, by contrast, is a shared server that is activated "by hand" (for example, from the command shell or from a startup script), vs. being activated automatically when the first method is dispatched to it.

The term "persistent server" refers to the relative lifetime of the server: it is "always running" when DSOM is running. (CORBA implies that persistent servers are usually started at ORB boot time.) It should not be assumed, however, that a "persistent" server necessarily implements persistent objects (that persist between ORB reboots).

In DSOM, specific process models are implemented by the server program. That is, DSOM simply starts a specified program when a client attempts to connect to a server. The four CORBA activation policies, or any other policies, can be implemented by the application as necessary. For example,

- an object that requires a server-per-method implementation could itself spawn a process at the beginning of each method execution. Alternatively, the server object in the "main" server can spawn a process before each method dispatch.

- a dedicated server could be registered for each object that requires an unshared server implementation (separate process). This may be done dynamically (see the topic "Programmatic interface to the Implementation Repository" earlier in this chapter).

An ImplementationDef object, as defined by the CORBA specification, describes the characteristics of a particular implementation. In DSOM, an ImplementationDef identifies an implementation's unique ID, the program name, its location, and so forth. The ImplementationDef objects are stored in an *Implementation Repository*, which is represented in DSOM by an ImplRepository object.

A CORBA-compliant ORB must provide the mechanisms for a server program to register itself with the ORB. To "register itself with the ORB" simply means to tell the ORB enough information about the server process so that the ORB will be able to locate, activate, deactivate, and dispatch methods to the server process. DSOM supports these mechanisms, so that server programs written in arbitrary languages can be used with DSOM. (See also the next topic, "Object Adapters.")

In addition to the generic registration mechanisms provided by all CORBA-compliant ORBs, DSOM provides extra support for using SOM-class DLLs. DSOM provides a *generic server* program that automatically registers itself with DSOM, loads SOM-class DLLs on demand, and dispatches incoming requests on SOM objects. Thus, by using the generic server program (when appropriate), a user may be able to avoid writing any server program code.

Object Adapters

An *Object Adapter* (OA) provides the mechanisms that a server process uses to interact with DSOM, and vice versa. That is, an Object Adapter is responsible for server activation and deactivation, dispatching methods, activation and deactivation of individual objects, and providing the interface for authentication of the principal making a call.

DSOM defines a *Basic Object Adapter* (BOA) interface, described in the CORBA specification, as an abstract class (a class having no implementation, only an interface specification). The BOA interface represents generic Object Adapter methods that a server written in an arbitrary language can use to register itself and its objects with the ORB. Because it is an abstract class having no implementation, however, the BOA class should not be directly instantiated.

DSOM provides a SOM Object Adapter, SOMOA, derived from the BOA interface, that uses SOM Compiler and run-time support to accomplish dispatching of methods (that is, accepting messages, turning them into method invocations, and routing the invocations to the target object in the server process). SOMOA can be used to dispatch methods on either SOM or non-SOM object implementations, as described in the sections "Developing Class Libraries" and "Basic Server Programming." It is possible to use non-SOM based implementations with SOMOA, and often there is no additional programming required to use implementations (class libraries) already developed using SOM.

The SOMOA works in conjunction with the application–defined *server object* to map between objects and object references, and to dispatch methods on objects. By partitioning out these mapping and dispatching functions into the server object, the application can more easily customize them, without having to build object adapter subclasses.

SOMOA introduces two methods that handle execution of requests received by the server:

execute_request_loop
   execute_next_request

Typically, execute_request_loop is used to receive and execute requests, continuously, in the server's main thread. The execute_next_request method allows a single request to be executed. Both methods have a non-blocking option: when there are no messages pending, the method call will return instead of wait.

On OS/2, if the server implementation has been registered as "multi-threaded" (via an IMPL-DEF_MULTI_THREAD flag in the ImplementationDef), SOMOA will *automatically* run each request in a separate thread. If the "multi-thread" flag is not set, the server implementation can still choose to manage its own threads.

The generic server program provided by DSOM (described in the preceding topic) uses execute_request_loop to receive and execute requests on SOM objects.

Extensions and limitations

The DSOM implementation has the following extensions and limitations in its implementation of the CORBA specification:

- As just described, the current release of DSOM supports a simple server activation policy, which is equivalent to the "shared" and "persistent" policies defined by CORBA. DSOM does not explicitly support the "unshared" or "server–per–method" server activation policies. Policies other than the basic activation scheme must be implemented by the application.

- DSOM provides null implementations for the object_is_ready or deactivate_obj methods, defined by the BOA interface for the unshared server activation policy.

- DSOM does not support the change_implementation method, defined by the BOA interface to allow an application to change the implementation definition associated with an object. In DSOM, the ImplementationDef identifies the server which implements an object. In these terms, changing an object's ImplementationDef would result in a change in the object's server id. Any existing object references that have the old server id would be rendered invalid.

It *is* possible, however, to change the program which implements an object's server, or change the class library which implements an object's class. To modify the program associated with an ImplementationDef, use the update_impldef method defined on ImplRepository. To change the implementation of an object's class, replace the corresponding class library with a new (upward–compatible) one.

- The SOM Object Adapter (SOMOA) provides a method (change_id) to update the ReferenceData associated with an object reference created by the create call. This is useful if the information which describes the object must be changed without invalidating copies of the existing object reference. CORBA defines no such method; change_id is an extension to the standard BOA methods.

- The SOMOA provides some specialized object reference types which, in certain situations, are more efficient or easier–to–use than standard object references.

- DSOM supports the SOM extension to IDL that allows method parameters that are pointers. Structure, sequence, and array parameters may only contain pointers to *objects* (not arbitrary types).

9 Advanced Topics

Peer vs. client-server processes

The client-server model of distributed computing is appropriate when it is convenient (or necessary) to centralize the implementation and management of a set of shared objects in one or more servers. However, some applications require more flexibility in the distribution of objects among processes. Specifically, it is often useful to allow processes to manage and export some of their objects, as well as access remote objects owned by other processes. In these cases, the application processes do not adhere to a strict client-server relationship — instead, they cooperate as "peers", behaving both as clients and as servers.

Peer applications must be written to respond to incoming asynchronous requests, in addition to performing their normal processing. In a multi-threaded system (like OS/2), this is best accomplished by dedicating a separate process thread that handles DSOM communications and dispatching. In systems that do not currently support multi-threading (like AIX), peer applications must be structured as event-driven programs.

Multi-threaded DSOM programs

In a system that supports multi-threading, like OS/2, the easiest way to write a peer DSOM program is to dedicate a separate thread to perform the usual "server" processing. This body of this thread would contain the same code as the simple servers described in section 4, "Basic Server Programming."

```
DSOM_thread(void *params)
{
    Environment ev;
    SOM_InitEnvironment(&ev);

/* Initialize the DSOM run-time environment */
    SOMD_Init(&ev);

/* Retrieve its ImplementationDef from the Implementation
   Repository by passing its implementation ID as a key */
    SOMD_ImplDefObject =
        _find_impldef(SOMD_ImplRepObject, &ev, *(ImplId *)params);

/* Create SOM Object Adapter and begin executing requests */
    SOMD_SOMOAObject = SOMOANew();
    _impl_is_ready(SOMD_SOMOAObject, &ev, SOMD_ImplDefObject);
    _execute_request_loop(SOMD_SOMOAObject, &ev, SOMD_WAIT);
}
```

Note: The DSOM run time is "thread safe"; that is, DSOM protects its *own* data structures and objects from race conditions and update conflicts. However, it is the application's responsibility to implement its own concurrency control for concurrent thread access to local shared application objects.

Event-driven DSOM programs using EMan

EMan is not a replacement for threads, but it supports processing of asynchronous requests. EMan allows a program to handle events from multiple input sources — but the handlers run on a single thread, under control of EMan's main loop.

DSOM provides a runtime function, SOMD_RegisterCallback, which is used by DSOM to associate user-supplied event handlers with DSOM's communications sockets and message queues with EMan. Example code is shown below.

DSOM server programs which use EMan must be very careful not to get into deadlock situations. This is quite easy to do with DSOM, since method calls are synchronous. If two cooperating processes simultaneously make calls on each other, a deadlock could result. Likewise, if a method call on remote object B from A requires a method call back to A, a deadlock cycle will exist. (Of course, the number of processes and objects which create the cyclic dependency could be greater than two.) To illustrate:

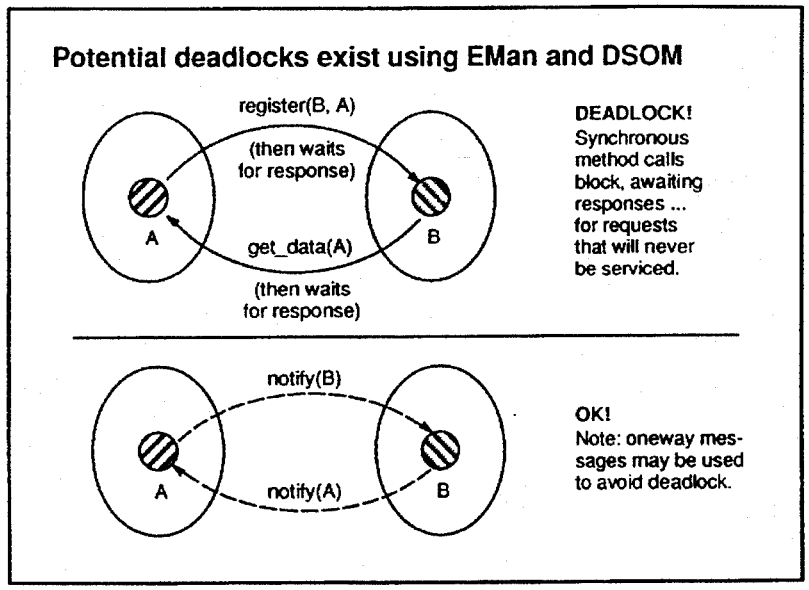

The application developer must be careful to avoid situations where cooperating processes are likely to make calls upon each other, creating a cyclic dependency. Some applications may find it appropriate to use *oneway messages* to avoid deadlock cycles, since oneway messages do not cause a process to block. It may also be possible for an application to *defer* the actual processing of a method that may "call back" an originating process, by scheduling work using EMan client events.

*Sample server using EMan*

The following server code has been distilled from one of the DSOM sample applications provided with SOMobjects Developer Toolkit. It is an example of a server which has an interval timer that signals another server (via DSOM) whenever its timer "pops". Thus, it is both a client (of the server it signals) and a server (because it can receive timer notifications from other servers).

The IDL for the server object class to be used by this server program is as follows. Note that the "noteTimeout" method is *oneway*, in order to avoid deadlock.

```
interface PeerServer : SOMDServer
{ oneway void noteTimeout(in string serverName);
    // Notification that a timer event occurred in server serverName
};
```

The example server program is outlined as follows. It is assumed that "eman.h" has been included by the program.

- Perform DSOM initialization up to, but not including, asking SOMOA to start handling requests.

```
  MyEMan = SOMEEManNew();
  SOM_InitEnvironment(&ev);
  SOM_InitEnvironment(&peerEv);
  SOMD_Init(&ev);

somPrintf("What is the alias for this server? ");
  gets(thisServer);

SOMD_ImplDefObject = _find_impldef_by_alias(SOMD_ImplRepObject,
                                              &ev, thisServer);
  SOMD_SOMOAObject = SOMOANew();
  _impl_is_ready(SOMD_SOMOAObject, &ev, SOMD_ImplDefObject);
  ```

- Register a "DSOM event" with EMan, having EMan callback to a procedure that asks the SOMOA to process any pending DSOM requests.

```
  void SOMD_RegisterCallback(SOMEEman emanObj, EMRegProc *func);

void DSOMEventCallBack (SOMEEvent event, void *eventData)
  {   Environment ev;
      SOM_InitEnvironment(&ev);
      _execute_request_loop(SOMD_SOMOAObject, &ev, SOMD_NO_WAIT);
  }

SOMD_RegisterCallback (MyEMan, DSOMEventCallBack);
  ```

- Ask user to provide "target server's alias", where the target server is that this server will signal when its timer "pops". Then get a proxy for that server.

```
  somPrintf("What is the alias for the target server? ");
  gets(inbuf);
  RemotePeer = _somdFindServerByName(SOMD_ObjectMgr, &ev, inbuf);
  ```

- Ask user to provide the timer's interval (in milliseconds)

```
  somPrintf("What is the timer interval, in millseconds? ");
  gets(inbuf);
  Interval = atoi(inbuf);
  ```

- Register a timer event with EMan, having EMan call back a procedure that will invoke the notification method on the target server.

```
  void TimerEventCallBack (SOMEEvent event, void *eventData)
  { Environment ev;
    SOM_InitEnvironment(&ev);
    /* call the peer, with a oneway message */
    _noteTimeout(RemotePeer, &ev, thisServer);
  } data = SOMEEMRegisterDataNew();
  _someClearRegData(data, &ev);
  _someSetRegDataEventMask(data, &ev, EMTimerEvent, NULL);
  _someSetRegDataTimerInterval(data, &ev, Interval);
  somPrintf("Type <Enter> key when ready to go: ");
  gets(inbuf);
  regId = _someRegisterProc(MyEMan, &ev, data, TimerEventCallBack,
                            NULL);
  ```

Important: Do *not* use someRegister or someRegisterEv to register "callback methods" that would be executed on proxy objects. Instead, write a callback routine that invokes the desired method on the proxy, like the one shown above, and register that routine using the method someRegisterProc.

Note: EMan currently uses the methods someRegister and someRegisterEv to obtain the *address* of a method-procedure to call when a specified event occurs. If EMan directly calls the method-procedure versus somDispatch, the method call will not be forwarded to the remote object as desired.

- Start the EMan event processing loop.

```
_someProcessEvents(MyEMan, &ev);
```

Before the sample is run, two server implementations should be registered with regimpl. The implementations are identical except for their aliases. One may be called "peerServer1" and the other "peerServer2". The "PeerServer" class should be specified as their server-object class.

Whenever peerServer1's timer pops, the Event Manager causes a method, "noteTimeout", to be sent to the server object in peerServer2. PeerServer2's server object executes this method by displaying a message on its window. Whenever peerServer2's timer pops, a similar sequence occurs with peerServer1. The two servers will run continuously until interrupted.

Dynamic Invocation Interface

DSOM supports the CORBA dynamic invocation interface (DII), which clients can use to dynamically build and invoke requests on objects. This section describes how to use the DSOM DII. Currently, DSOM supports dynamic request invocation only on objects outside the address space of the request initiator, via proxies. The somDispatch method (non–CORBA) can be used to invoke methods dynamically on either local or remote objects, however.

To invoke a request on an object using the DII, the client must explicitly construct and initiate the request. A request is comprised of an object reference, an operation, a list of arguments for the operation, and a return value from the operation. A key to proper construction of the request is the correct usage of the NamedValue structure and the NVList object. The return value for an operation is supplied to the request in the form of a NamedValue structure. In addition, it is usually most convenient to supply the arguments for a request in the form of an NVList object, which is an ordered set of NamedValues. This section begins with a description of NamedValues and NVLists and then details the procedure for building and initiating requests.

The *NamedValue* structure

The NamedValue structure is defined in C as:

```
typedef unsigned long Flags;

struct NamedValue {
        Identifier    name;         // argument name
        any           argument;     // argument
        long          len;          // length/count of arg value
        Flags         arg_modes;    // argument mode flags
};
``` where:

*name* is an Identifier string as defined in the CORBA specification, and
*arg* is an any structure with the following declaration:

```
struct any {
        TypeCode    _type;
        void*       _value;
};
```

_type is a TypeCode, which has an opaque representation with operations defined on it to allow access to its constituent parts. Essentially the Typecode is composed of a field specifying the CORBA type represented and possibly additional fields needed to fully describe the type. See Chapter 7 of this manual for a complete explanation of TypeCodes.

_value is a pointer to the value of the *any* structure. Important: The contents of "_value" should always be a *pointer* to the value, regardless of whether the value is a primitive, a structure, or is itself a pointer (as in the case of object references, strings and arrays). For object references, strings and arrays, _value should contain *a pointer to the pointer* that references the value. For example:

```
string      testString;
any         testAny;

testAny._value = &testString;
```

*len* is the number of bytes that the argument value occupies. The following table gives the length of data values for the C language bindings. The value of *len* must be consistent with the TypeCode.

| Data type | Length |
| --- | --- |
| short | sizeof(short) |
| unsigned short | sizeof(unsigned short) |
| long | sizeof(long) |
| unsigned long | sizeof(unsigned long) |
| float | sizeof(float) |
| double | sizeof(double) |
| char | sizeof(char) |
| boolean | sizeof(boolean) |
| octet | sizeof(octet) |
| string | strlen(string) - does not include '\0' byte |
| enum E{} | sizeof(unsigned long) |
| union U | sizeof(U) |
| struct S{} | sizeof(S) |
| Object | 1 |
| array N of type T1 | Length(T1)*N |
| sequence V of type T2 | Length(T2)*V - V is the actual # of elements |

The *arg_modes* field is a bitmask (unsigned long) and may contain the following flag values:

| | |
| --- | --- |
| ARG_IN | the associated value is an input-only argument |
| ARG_OUT | the associated value is an output-only argument |
| ARG_INOUT | the associated argument is an in/out argument |

These flag values identify the parameter passing mode for the arguments. Additional flag values have specific meanings for Request and NVList methods and are listed with their associated methods.

The *NVList* class

An NVList contains an ordered set of NamedValues. The CORBA specification defines several operations that the NVList supports. The IDL prototypes for these methods are as follows:

```
// get the number of elements in the NVList
ORBStatus get_count(
            out    long         count );

// add an element to an NVList
ORBStatus add_item(
            in    Identifier   item_name,
            in    TypeCode     item_type,
            in    void*        value,
            in    Flags        item_flags );

// frees the NVList and any associated memory
ORBStatus free();

// frees dynamically allocated memory associated with the list
ORBStatus free_memory();
```

In DSOM, the NVList is a full-fledged object with methods for getting and setting elements:

```
//set the contents of an element in an NVList
ORBStatus set_item(
            in    long         item_number, /* element # to set */
            in    Identifier   item_name,
            in    TypeCode     item_type,
            in    void*        item_value,
            in    long         value_len,
            in    Flags        item_flags );

// get the contents of an element in an NVList
ORBStatus get_item(
            in    long                      item_number, /* element # to get */
            out   Identifier   item_name,
            out   TypeCode     item_type,
            out   void*        item_value,
            out   long         value_len,
            out   Flags        item_flags );
```

See the *SOMobjects Developer Toolkit: Programmers Reference Manual* for a detailed description of the methods defined on the NVList object.

*Creating argument lists*

A very important use of the NVList is to pass the argument list for an operation when creating a request. CORBA 1.1 specifies two methods, defined in the ORB class, to build an argument list: create_list and create_operation_list. The IDL prototypes for these methods are as follows:

```
ORBStatus create_list(
            in    long         count,   /* # of items */
            out   NVList       new_list );

ORBStatus create_operation_list(
            in    OperationDef oper,
            out   NVList       new_list );
```

The create_list method returns an NVList with the specified number of elements. Each of the elements is empty. It is the client's responsibility to fill the elements in the list with the correct information using the set_item method. Elements in the NVList must contain the arguments in the same order as they were defined for the operation. Elements are numbered from 0 to count–1.

The create_operation_list method returns an NVList initialized with the argument descriptions for a given operation (specified by the OperationDef). The arguments are returned in the same order as they were defined for the operation. The client only needs to fill in the *item_value* and *value_len* in the elements of the NVList.

In addition to these CORBA-defined methods, DSOM provides a third version, defined in the SOMDObject class. The IDL prototype for this method is as follows:

```
ORBStatus create_request_args(
                in Identifier operation,
                out NVList arg_list,
                out NamedValue result );
```

Like create_operation_list, the create_request_args method creates the appropriate NVList for the specified operation. In addition, create_request_args initializes the NamedValue that will hold the result with the expected return type. The create_request_args method is defined as a companion to the create_request method, and has the advantage that the InterfaceDef for the operation does not have to be retrieved from the Interface Repository.

Note: The create_request_args method is *not* defined in CORBA 1.1. Hence, the create_operation_list method, defined on the ORB class, should be used instead when writing portable CORBA-compliant programs.

Building a Request

There are two ways to build a Request object. Both begin by calling the create_request method defined by the SOMDObject class. The IDL prototype for create_request is as follows:

```
ORBStatus create_request(
                in    Context      ctx,
                in    Identifier   operation,
                in    NVList       arg_list,
                inout NamedValue   result,
                out   Request      request,
                in    Flags        req_flags );
```

The *arg_list* can be constructed using the procedures described above and is passed to the Request object in the create_request call. Alternatively, *arg_list* can be specified as NULL and repetitive calls to add_arg can be used to specify the argument list. The add_arg method, defined by the Request class, has the following IDL prototype:

```
ORBStatus add_arg(
                in Identifier name,
                in TypeCode   arg_type,
                in void*      value,
                in long       len,
                in Flags      arg_flags );
```

Initiating a Request

There are two ways to initiate a request, using either the invoke or send method defined by the Request class. The IDL prototypes for these two operations are as follows:

```
ORBStatus invoke(
                in Flags      invoke_flags );

ORBStatus send(
                in Flags      send_flags );
```

The invoke method calls the ORB, which handles the remote method invocation and returns the result. This method will block while awaiting return of the result.

The send method calls the ORB but does not wait for the operation to complete before returning. To determine when the operation is complete, the client must call the get_response method (also defined by the Request class), which has this IDL prototype:

```
ORBStatus get_response(
            in Flags        response_flags );
```

The following flag is defined for get_response:

RESP_NO_WAIT            Means that the caller does not want to wait for a response.

get_response determines whether a request has competed. If the RESP_NO_WAIT flag is set, get_response returns immediately even if the request is still in progress. If RESP_NO_WAIT is not set, get_response waits until the request is done before returning.

*Example code*

Below is an incomplete example showing how to use the DII to invoke a request having the following method procedure prototype:

```
string _testMethod( testObject      obj,
                    Environment     *ev,
                    long            input_value,
);
```

```
main()
{
   ORBStatus rc;
   Environment ev;
   SOMDObject obj;
   NVList arglist;
   NamedValue result;
   Context ctx;
   Request reqObj;
   OperationDef opdef;
   Description desc;
   OperationDescription opdesc;
   static long input_value = 999;

SOM_InitEnvironment(&ev);
   SOMD_Init(&ev);

/* create the argument list */
/* get the operation description from the interface repository */
   opdef = _lookup_id(SOM_InterfaceRepository, *ev,
                      "testObject::testMethod");
   desc = _describe(opdef, &ev);
   opdesc = (OperationDescription *) desc.value._value;

/* fill in the TypeCode field for the result */
   result.argument._type = opdesc->result;

/* Initialize the argument list */
   rc = _create_operation_list(SOMD_ORBObject, &ev, opdef,
                               &arglist);

/* get default context */
   rc = _get_default_context(SOMD_ORBObject, &ev, &ctx);

/* put value and length into the NVList */
   _get_item(arglist, &ev, 0, &name, &tc, &dummy, &dummylen,
             &flags);

_set_item(arglist, &ev, 0, name, tc, &input_value,
             sizeof(input_value),flags);
   ...
/* create the request - assume the object reference came from
   somewhere -- from a file or returned by a previous request*/
   rc = _create_request(obj, &ev, ctx,
                        "testMethod", arglist, &result, &reqObj,
                        (Flags)0);

/* invoke request */
   rc = invoke(reqObj, &ev, (Flags)0);

/* print result */
   printf("result: %s\n",*(string*)(result.argument._value));
   return(0);
}
```

Building client-only "stub" DLLs

When developing a DSOM client program that invokes methods on a remote object without having a local copy of the DLL for the object's class, the developer must create a local "stub" DLL for the remote object. This DLL is needed because it contains the *class data structure* for the object's class, and that data structure is needed in order to create the local proxy object for the remote object, and to use the static language bindings. Instead of complete method functions, stub DLLs contain only stub method functions. Stub DLLs, unlike the full-implementation DLLs, can be generated automatically by a developer having only the IDL specification of a class; only the server of the remote object needs to have the object's full implementation.

Client-side stub DLLs can be constructed by performing the following steps:

- Run the SOM Compiler on the IDL class interface specification, using the h emitter, the ih emitter, and the c emitter. (Alternatively, the xh, xih, and xc emitters can be used.)

- Compile these files together to yield a client-side "stub" DLL, in the same way that regular class DLLs are compiled.

Note that a stub DLL <u>cannot be used to invoke methods on a local object</u>. It is sufficient, however, for the creation of a local proxy for a remote object, and provides the necessary support to allow methods to be invoked on the remote object via the proxy.

Creating user-supplied proxies

DSOM uses a proxy object in the client's address space to represent the remote object. As mentioned earlier in this chapter, the proxy object encapsulates the operations necessary to forward and invoke methods on the remote object and return the results. By default, proxy generation is done automatically by the DSOM run time. However, if desired, the programmer can cause a user-supplied proxy class to be loaded instead of letting the run time dynamically generate a default proxy class. User-supplied proxies can be useful in specialized circumstances when local processing or data caching is desired.

To build a user-supplied proxy class, it is necessary to understand a bit about how dynamic proxy classes are constructed by the DSOM run time. The DSOM run time constructs a proxy class by creating an instance of a class that inherits the interface and implementation of SOMDClientProxy, and the interface (but not the implementation) of the target class. The methods in the interface of the target object are all overridden to call the somDispatch method. (For more details, see "Object references and proxy objects" in section ‐ 8.)

Every SOM object contains the somDispatch method, inherited from SOMObject. This method is used to dynamically dispatch a method on an object, and can be overridden with application-specific dispatching mechanisms.
In SOMDClientProxy, the somDispatch method is overridden to forward method calls to the corresponding remote target object.

So, in effect, when a method is called on a default proxy object created by the DSOM run time, it redispatches the method to the remote object using DSOM's version of somDispatch.

Below is a simple example of a user-supplied proxy class. In this particular example, the proxy object maintains a local, unshared copy of an attribute ("attribute_long") defined in the remote object ("Foo"), while forwarding method invocations ("method1") on to the remote object. The result is that, when multiple clients are talking to the same remote "Foo" object, each client has a local copy of the attribute but all clients share the "Foo" object's implementation of "method1".

Note: It is important to understand that simply setting the attribute in one client's proxy does *not* affect the value of the attribute in other proxies. Maintaining consistency of the cached data values, if desired, is the responsibility of the user-supplied proxy class.

Following is the IDL file for the "Foo" class:

```
// foo.idl include <somdtype.idl>
include <somobj.idl> interface Foo : SOMObject
{
        string  method1(out string a, inout long b,
                        in ReferenceData c);
        attribute long attribute_long;

implementation
   {
      releaseorder: method1, _set_attribute_long,
                    _get_attribute_long;
      dllname="foo.dll";
      somInit: override;
   };
};
```

The user-supplied proxy class is created by using multiple inheritance between SOMDClientProxy and the target object (in this case "Foo"). Thus, the IDL file for the user-supplied proxy class "Foo__Proxy" (note the two underscores) is as follows:

```
// fooproxy.idl include <somdcprx.idl>
include <foo.idl> interface Foo__Proxy : SOMDClientProxy, Foo
{
   implementation
   {
      dllname="fooproxy.dll";
      method1: override;
   };
};
```

When a dynamic proxy class is created by the DSOM run time, the methods inherited from the target class are automatically overridden to use somDispatch. When you build a user-supplied proxy, you need to do this explicitly. This is why "method1" is overridden in the implementation section of the "fooproxy.idl" file.

The implementation of "method1", which was added to the template produced by the SOM Compiler, simply calls the somDispatch method on "somSelf". Because "Foo__Proxy" has inherited the implementation of SOMDClientProxy, calling somDispatch within "method1" sends the method to the remote "Foo" object.

```
/* foo.c */ include <somdtype.h>
include <fooproxy.ih>

SOM_Scope string  SOMLINK method1(Foo__Proxy somSelf,
                                  Environment *ev,
                                  string* a, long* b,
                                  ReferenceData* c)
{
    string ret_str;
    somId  methodId;
```

```
/*  Foo__ProxyData *somThis = Foo__ProxyGetData(somSelf); */
    Foo__ProxyMethodDebug("Foo__Proxy","method1");

/* redispatch method, remotely */
    methodId = somIdFromString("method1");
    _somDispatch(somSelf, (void**)&ret_str,
                 methodId, somSelf, ev, a, b, c);
    SOMFree(methodId);

return ret_str;
}
```

In summary, to build a user-supplied proxy class:

- Create the .idl file with the proxy class inheriting from both SOMDClientProxy and from the target class.
  Important: The user-supplied proxy class *must be named "<targetClassName>__Proxy"* (with two underscores in the name) and SOMDClientProxy *must be the first class* in the list of parent classes; for example, interface Foo__Proxy : SOMDClientProxy, Foo Putting SOMDClientProxy first ensures that its version of somDispatch will be used to dispatch remote method calls.

In the implementation section of the .idl file, override all methods that are to be invoked on the target class. Do not override methods that are to be invoked on the local proxy.

- Compile the .idl file. Be sure the Interface Repository gets updated with the .idl file. In the .c or .C file, for each overridden method, call somDispatch with the method name and parameters passed into the overridden method.

- Build the DLL and place it the LIBPATH. Before creating the default proxy, the DSOM run time checks the LIBPATH for a DLL containing the class named "*<targetClassName>*__Proxy". If such a DLL is found, DSOM loads it instead of dynamically generating a proxy class.

Sockets class

To aid in portability, DSOM has been written to use a *common communications interface*, which is implemented by one or more available local protocols.

The common communications interface is represented as an abstract class, called Sockets, and is based on the familiar "sockets" interface. Several protocol implementations are supported as Sockets subclasses: TCPIPSockets for TCP/IP, the class NBSockets for Netbios, and the class IPXSockets for Netware IPX/SPX. (The libraries included in a particular SOMobjects run–time package will vary.)

There is one case where a Sockets subclass is not required: the DSOM Workstation run–time package uses shared memory to pass messages within a single machine, and bypasses the use of a Sockets subclass. (The SOMSOCKETS environment variable is ignored.)

When the Event Management Framework (EMan) is used with DSOM, a Sockets subclass will be needed to support EMan, whether or not the application runs completely within a single machine.

What is claimed is:

1. A method for activating and executing objects containing data and procedures in a computer system, wherein said objects exist in an object oriented environment, comprising the steps of:

determining by a process in a second address space that a target object is not available in the second address space;

generating by said process a call to a manager object in said second address space to locate the target object in a first address space;

locating by said manager object a second object in the first address space for said target object and creating a proxy server object in the second address space for said second object;

automatically relaying, by a first object in the first address space in said object-oriented environment, a communication from the process in the second address space to said second object in the first address space;

automatically activating, by the second object in said object oriented environment, a third object in the first address space containing data and procedures in response to the relayed communication from the process in said second address space; and automatically executing, by the activated third object in said object oriented environment, an operation in response to the relayed communication from the process in said second address space.

2. The method of claim 1 wherein the step of relaying includes relaying a communication across a network from the process through a proxy server object located on a remote host system.

3. The method of claim 1 further comprising a step of subclassing said second object to modify the activation and calling processes of said proxy server object.

4. The method of claim 1 further comprising a step of returning results of the executed operation to the second object.

5. The method of claim 4 further comprising a step of relaying, by said first object, the returned results from the second object to the process.

6. The method of claim 1 wherein the step of locating includes the step of querying an implementation repository for a class in said target object.

7. The method of claim 1 wherein the step of locating further comprises the steps of:

querying said process to determine if the proxy server object already exist in the process;

using said proxy server object that already exist in the process; and building in the process the proxy server object associated with a server containing the target object when said proxy server object does not exist.

8. An apparatus for activating and executing remote objects in an object oriented environment containing data and procedures in a computer system comprising:

means for determining by a process in a second address space that a target object is not available in the second address space;

means for generating by said process a call to a manager object in said second address space to locate the target object in a first address space;

means for locating by said manager object a second object in the first address space for said target object and creating a proxy server object in the second address space for said second object;

a first object in the first address space in said object oriented environment for automatically relaying a communication from the process in the second address space to the second object in the first address space;

means for automatically activating, in the second object, a third object in said object oriented environment containing data and procedures in response to the relayed communication; and means for automatically executing, in the activated third object, an operation in response to the relayed communication.

9. The apparatus of claim 8 wherein the first object includes means for relaying a communication across a network from the process through the proxy server object located on a remote host system.

10. The apparatus of claim 8 further comprising means for subclassing said second object to modify the activation and calling processes of said proxy server object.

11. The apparatus of claim 8 further comprising means for returning results of the executed operation to the second object.

12. The apparatus of claim 11 further comprising means for said first object to relay the returned results from the second object to the process.

13. A data processing system for activating and executing remote objects in an object oriented environment containing data and procedures comprising:

means for determining by a process in a second address space that a target object is not available in the second address space;

means for generating by said process a call to a manager object in said second address space to locate the target object in a first address space;

means for locating by said manager object a second object in the first address space for said target object and creating a proxy server object in the second address space for said second object;

means for storing data to be processed;

means for processing data;

a first object in the first address space in said object oriented environment for automatically relaying a communication from the process in the second address space in said object oriented environment to the second object in the first address space;

means for automatically activating, in the second object, a third object containing data and procedures in said object oriented environment in response to the relayed communication; and means for automatically executing, in the activated third object, an operation in response to the relayed communication.

14. The data processing system of claim 13 wherein the first object includes means for relaying a communication across a network from the process through the proxy server object located on a remote host system.

15. The data processing system of claim 13 further comprising means for subclassing said second object to modify the activation and calling processes of said proxy server object.

16. The data processing system of claim 13 further comprising means for returning results of the executed operation to the second object.

17. The data processing system of claim 16 further comprising means for said first object to relay the returned results from the second object to the process.

18. A computer program product stored in computer memory executable by a processor in a computer system for activating and executing remote objects containing data and procedures in an object oriented environment comprising:

means for determining by a process in a second address space that a target object is not available in the second address space;

means for generating by said process a call to a manager object in said second address space to locate the target object in a first address space;

means for locating by said manager object a second object in the first address space for said target object and creating a proxy server object in the second address space for said second object;

a first object in the first address space in said object oriented environment of said computer system for automatically relaying a communication from the process in the second address space of said computer system to the second object in the first address space;

means for automatically activating, in the second object, a third object containing data and procedures in said object oriented environment in response to the relayed communication; and means for automatically executing, in the activated third object, an operation in response to the relayed communication.

19. The computer program product of claim 18 wherein the first object includes means for relaying a communication across a network from the process through the proxy server object located on a remote host system.

20. The computer program product of claim 18 further comprising means for subclassing said second object to modify the activation and calling processes of said proxy server object.

21. The computer program product of claim 18 further comprising means for returning results of the executed operation to the second object.

22. The computer program product of claim 21 further comprising means for said first object to relay the returned results from the second object to the process.

\* \* \* \* \*